United States Patent
Nakatsugawa et al.

(10) Patent No.: US 12,333,520 B2
(45) Date of Patent: Jun. 17, 2025

(54) COMMUNICATION PROCESSING DEVICE, COMMUNICATION PROCESSING SYSTEM, COMMUNICATION CONTROL METHOD, AND PROGRAM

(71) Applicant: Sony Group Corporation, Tokyo (JP)

(72) Inventors: Yasumasa Nakatsugawa, Kanagawa (JP); Takashi Suzuki, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 169 days.

(21) Appl. No.: 18/021,695

(22) PCT Filed: Aug. 6, 2021

(86) PCT No.: PCT/JP2021/029311
§ 371 (c)(1),
(2) Date: Feb. 16, 2023

(87) PCT Pub. No.: WO2022/064878
PCT Pub. Date: Mar. 31, 2022

(65) Prior Publication Data
US 2023/0360020 A1    Nov. 9, 2023

(30) Foreign Application Priority Data

Sep. 28, 2020   (JP) ................................ 2020-161779

(51) Int. Cl.
*G06Q 20/32*        (2012.01)
*H04W 72/00*       (2023.01)
(52) U.S. Cl.
CPC ........ *G06Q 20/3278* (2013.01); *H04W 72/00* (2013.01)
(58) Field of Classification Search
CPC ..... G06Q 20/3278; H04L 69/18; H04L 69/08; H04W 72/00

(Continued)

(56) References Cited

U.S. PATENT DOCUMENTS

| 8,856,045 B1 | 10/2014 | Patel et al. | |
| 2012/0143707 A1* | 6/2012 | Jain | G07F 7/0893 455/552.1 |

(Continued)

FOREIGN PATENT DOCUMENTS

| JP | 2007183780 A | * | 7/2007 | ........... G06Q 20/045 |
| JP | 2011118837 A | * | 6/2011 | ............. G06F 9/455 |

(Continued)

OTHER PUBLICATIONS

Machine translation (English) of JP 2011118837 A (Year: 2011).*

(Continued)

*Primary Examiner* — Ruolei Zong
(74) *Attorney, Agent, or Firm* — Paratus Law Group, PLLC

(57) ABSTRACT

A user terminal having a plurality of IC card applications performs payment processing using communication data of UWB communication with a payment device, and the user terminal selects an IC card application corresponding to the payment device used for the payment processing. The user terminal receives data from the payment device, performs search processing as to whether or not the user terminal has a specific communication scheme-compatible IC card application capable of processing communication data according to a specific communication scheme such as UWB communication on the basis of the received data, acquires an identifier (AID) of the detected application, and transmits the acquired identifier to the payment device. The payment device transmits a select command storing the AID received from the user terminal to the user terminal, and the user terminal starts the IC card application according to the select command.

20 Claims, 42 Drawing Sheets

(58) Field of Classification Search
USPC .......................................................... 709/227
See application file for complete search history.

(56) References Cited

U.S. PATENT DOCUMENTS

| | | | |
|---|---|---|---|
| 2012/0233618 A1* | 9/2012 | Takeuchi | G06K 19/0723 |
| | | | 718/102 |
| 2014/0339315 A1* | 11/2014 | Ko | G06F 1/1628 |
| | | | 235/492 |
| 2017/0171689 A1* | 6/2017 | Takeuchi | H04W 4/50 |

FOREIGN PATENT DOCUMENTS

| | | | |
|---|---|---|---|
| JP | 2012-190454 A | 10/2012 | |
| WO | WO 2019/049623 A1 | 3/2019 | |
| WO | WO-2020031428 A1 * | 2/2020 | ............ G06Q 20/02 |

OTHER PUBLICATIONS

NTT Docomo et al., Started demonstration experiment of "touchless support for wallet mobile phone", Dec. 5, 2019, pp. 1-3, retrieved from: https:// www.ntt.docomo.co.jp/binary/pdf/corporate/technology/rd/topics/2019/topics_191205_00.pdf (see International Search Report below for concise relevance).

Sugiyama et al., Mobile FeliCa technology that combines mobile phones and FeliCa, Jun. 6, 2007, pp. 561-566, vol. 48, No. 6, retrieved from: http://id.nii.ac.jp/1001/00065926 (see International Search Report below for concise relevance).

Oct. 12, 2021, International Search Report issued for related PCT application No. PCT/JP2021/029311.

* cited by examiner

FIG. 8

UWB-COMPATIBLE APPLICATION REGISTRATION DATA

| SERVICE ID | APPLICATION ID (AID) |
|---|---|
| SERVICE ID = 1 | AID = 12 |
| SERVICE ID = 2 | AID = 21 |
| SERVICE ID = 4 | AID = 43 |
| ·· | ·· |

IC CARD APPLICATION REGISTRATION DATA

|   | SERVICE ID | IC CARD APPLICATION UNIQUE IDENTIFIER (IDm) | APPLICATION ID (AID) | UWB COMMUNICATION COMPATIBILITY (COMPATIBLE=1, NON-COMPATIBLE=0) |
|---|---|---|---|---|
| (1) | 1 | a1 | AID=11 | 0 |
|  |  | a2 | AID=12 | 1 |
| (2) | 2 | b1 | AID=21 | 1 |
| (3) | 3 | c1 | AID=31 | 0 |
|  |  | c2 | AID=32 | 0 |
| (4) | 4 | c1 | AID=41 | 0 |
|  |  | c2 | AID=42 | 0 |
|  |  | c3 | AID=43 | 1 |

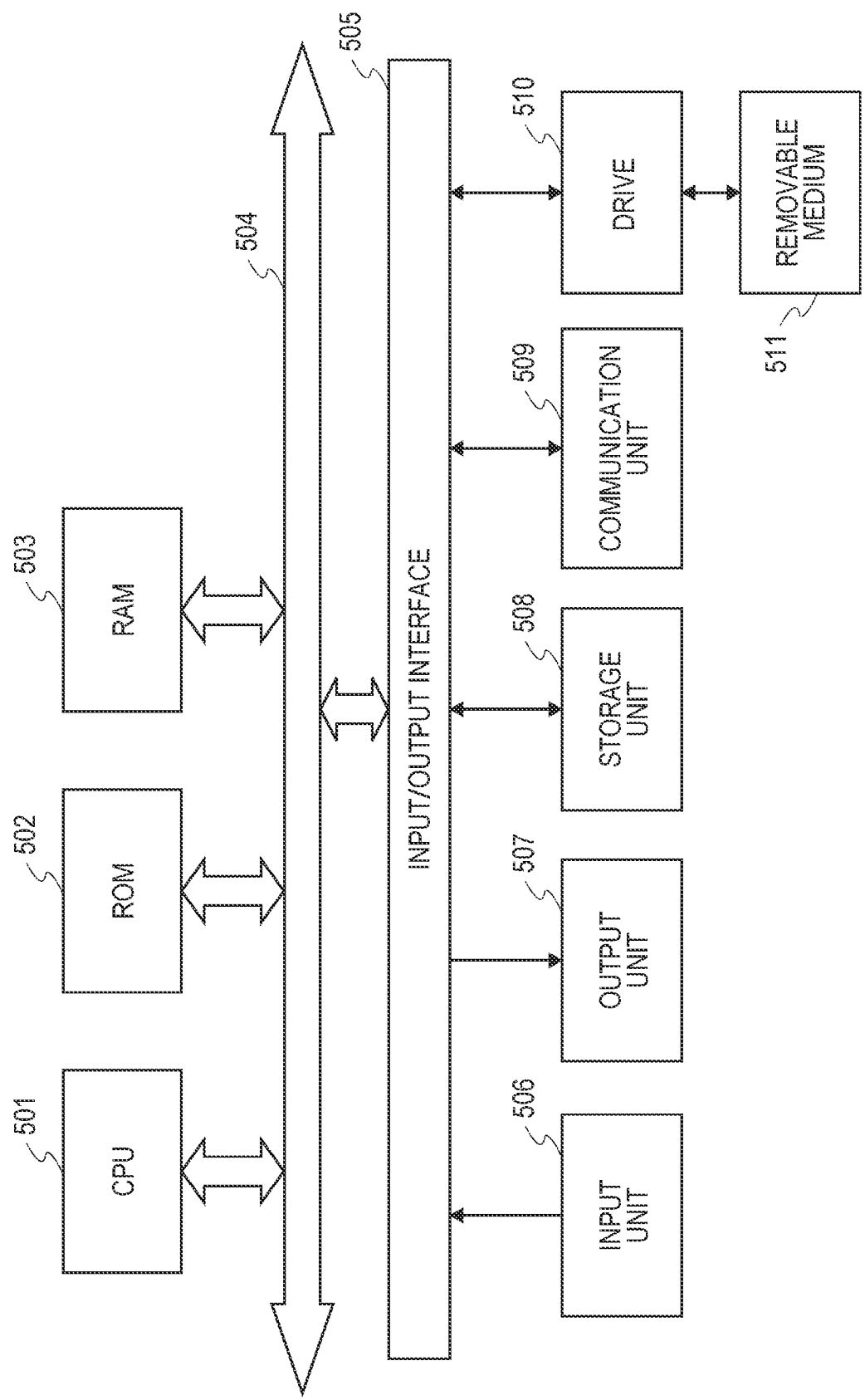

COMMUNICATION PROCESSING DEVICE, COMMUNICATION PROCESSING SYSTEM, COMMUNICATION CONTROL METHOD, AND PROGRAM

CROSS REFERENCE TO PRIOR APPLICATION

This application is a National Stage Patent Application of PCT International Patent Application No. PCT/JP2021/029311 (filed on Aug. 6, 2021) under 35 U.S.C. § 371, which claims priority to Japanese Patent Application No. 2020-161779 (filed on Sep. 28, 2020), which are all hereby incorporated by reference in their entirety.

TECHNICAL FIELD

The present disclosure relates to a communication processing device, a communication processing system, a communication control method, and a program. More specifically, the present disclosure relates to a communication processing device, a communication processing system, a communication control method, and a program capable of performing payment processing and the like by executing communication between an IC card application installed in a user terminal such as a smartphone and a payment terminal or the like via various communication paths such as UWB communication.

BACKGROUND ART

In recent years, use of a mobile terminal such as a smartphone having a cashless payment function has been expanding.

By using a mobile terminal having a cashless payment function, it is possible to easily perform payment for shopping, eating, and the like, or board a train or a bus without carrying cash.

For example, in a case where the user passes through a ticket gate of a station, the user takes out a user terminal such as a smartphone put in a pocket or a bag and holds the user terminal over a reader/writer (R/W) attached to the ticket gate, so that the user terminal and the reader/writer of the ticket gate perform proximity communication, and payment processing is performed.

Currently, most of communication between a user terminal such as a smartphone and a reader/writer (R/W) is performed according to, for example, the near field communication (NFC) standard, which is one of short-range wireless communication standards.

Note that the NFC standard includes a plurality of different standards such as Type A, Type B, and Type-F as more specific subdivided standards.

Type-F is a communication standard used in FeliCa (registered trademark), which is a contactless IC card technology system developed by Sony Corporation, and is widely used in communication between various electronic money type IC cards or a user terminal such as a smartphone having an IC card application installed therein and a reader/writer (R/W).

In the case of performing the Type-F NFC communication, a command unique to Type-F is used. By using this command unique to Type-F, for example, even in a case where a plurality of different IC card applications is installed in a user terminal such as a smartphone, it is possible to select one IC card application from the IC card applications and make a payment.

Specifically, for example, in a case where a user terminal in which two of a transportation IC card application and a distribution IC card application are installed is held close to a reader/writer (R/W) of a railway ticket gate, the reader/writer (R/W) of the railway ticket gate transmits a Type-F unique command to the user terminal.

On the basis of the command analysis result, the user terminal selects a transportation IC card application that performs payment processing necessary for passing through the railway ticket gate, and performs communication and payment processing between the selected transportation IC card application and the reader/writer (R/W) of the railway ticket gate.

In this manner, the selection and application processing of the IC card application is achieved by using the Type-F unique command.

However, the Type-F unique command is standardized as a command that can be used in NFC communication, and cannot be used in other communication schemes.

For example, in ultra wide band (UWB) communication that is ultra-wide band wireless communication or Bluetooth low energy (BLE) communication that is low power consumption Bluetooth (registered trademark) communication, the above-described Type-F unique command cannot be used.

Therefore, even if the user terminal and the payment terminal (R/W) of a ticket gate, a store, or the like attempt to perform payment processing using UWB communication or BLE communication other than NFC communication, the user terminal cannot select one correct IC card application corresponding to the payment terminal from a plurality of IC card applications installed in the user terminal and perform the payment processing.

Since UWB communication and BLE communication have a wider communicable range than NFC communication, for example, it is possible to perform wireless communication between the user terminal such as a smartphone and the ticket gate-side R/W at the timing when the user passes through the ticket gate without taking out the user terminal put in a pocket or a bag by the user. Such a payment system is called a touchless payment system.

Note that conventional technologies disclosing the touchless payment system include Patent Document 1 (WO 2019/049623 A) and Patent Document 2 (U.S. Pat. No. 8,856,045), for example.

However, as described above, since the Type-F unique command that achieves selection of one application from a plurality of IC card applications cannot be used in communication standards other than NFC communication, there is a problem that touchless payment to which UWB communication or BLE communication is applied cannot be smoothly performed.

CITATION LIST

Patent Document

Patent Document 1: WO 2019/049623 A
Patent Document 2: U.S. Pat. No. 8,856,045

SUMMARY OF THE INVENTION

Problems to be Solved by the Invention

The present disclosure has been made in view of the above-described problem, for example, and an object of the present disclosure is to provide a communication processing device, a communication processing system, a communication control method, and a program capable of performing processing such as payment by selecting an IC card application corresponding to a payment terminal even in a case where communication other than NFC communication is used.

Solutions to Problems

A first aspect of the present disclosure is
a communication processing device including a communication control unit that
executes search processing as to whether or not the own device has a specific communication scheme-compatible IC card application capable of executing data processing accompanied by communication according to a specific communication scheme on the basis of received data from an external device,
notifies the external device of a search processing result in a case where a specific communication scheme-compatible IC card application is detected as a result of the search processing, and
causes the external device and the detected specific communication scheme-compatible IC card application to execute data processing accompanied by communication according to the specific communication scheme.

Moreover, a second aspect of the present disclosure is
a communication processing system including a user terminal and a payment terminal, in which:
the user terminal
executes search processing as to whether or not the own device has a specific communication scheme-compatible IC card application capable of executing data processing accompanied by communication according to a specific communication scheme on the basis of received data from the payment terminal, and
transmits a search processing result to the payment terminal in a case where a specific communication scheme-compatible IC card application is detected as a result of the search processing;
the payment terminal
transmits a data processing request designating a specific communication scheme-compatible IC card application as a communication partner to the user terminal after receiving the search processing result; and
the user terminal
executes data processing using communication data according to the specific communication scheme between the payment terminal and the specific communication scheme-compatible IC card application in response to the data processing request from the payment terminal.

Moreover, a third aspect of the present disclosure is
a communication control method executed in a communication processing device, the communication control method including
a communication control unit
executing search processing as to whether or not the own device has a specific communication scheme-compatible IC card application capable of executing data processing accompanied by communication according to a specific communication scheme on the basis of received data from an external device,
notifying the external device of a search processing result in a case where a specific communication scheme-compatible IC card application is detected as a result of the search processing, and
causing the external device and the detected specific communication scheme-compatible IC card application to execute data processing accompanied by communication according to the specific communication scheme.

Moreover, a fourth aspect of the present disclosure is
a communication control method executed in a communication processing system including a user terminal and a payment terminal, the communication control method including:
the user terminal
executing search processing as to whether or not the own device has a specific communication scheme-compatible IC card application capable of executing data processing accompanied by communication according to a specific communication scheme on the basis of received data from the payment terminal, and
transmitting a search processing result to the payment terminal in a case where a specific communication scheme-compatible IC card application is detected as a result of the search processing;
the payment terminal
transmitting a data processing request designating a specific communication scheme-compatible IC card application as a communication partner to the user terminal after receiving the search processing result; and
the user terminal
executing data processing using communication data according to the specific communication scheme between the payment terminal and the specific communication scheme-compatible IC card application in response to the data processing request from the payment terminal.

Moreover, a fifth aspect of the present disclosure is
a program for causing a communication processing device to execute information processing, the program causing a communication control unit to execute
search processing as to whether or not the own device has a specific communication scheme-compatible IC card application capable of executing data processing accompanied by communication according to a specific communication scheme on the basis of received data from an external device,
processing of notifying the external device of a search processing result in a case where a specific communication scheme-compatible IC card application is detected as a result of the search processing, and
data processing accompanied by communication according to the specific communication scheme executed between the external device and the detected specific communication scheme-compatible IC card application.

Note that the program of the present disclosure is, for example, a program that can be provided by a storage medium or a communication medium provided in a computer readable format to an information processing device or a computer system capable of executing various program codes. By providing such a program in a computer-readable format, processing corresponding to the program is implemented on the information processing device or the computer system.

Still other objectives, features and advantages of the present disclosure will become apparent by more detailed description based on examples of the present disclosure and accompanying drawings described below. Note that in the present specification, a system is a logical set configuration of a plurality of devices, and the devices having the configurations do not necessarily have to be in the same housing.

According to the configuration of an example of the present disclosure, in a case where a user terminal such as a smartphone having a plurality of IC card applications performs payment processing using communication data of UWB communication or the like other than NFC communication with a payment device such as a ticket gate or a store terminal, a configuration is implemented in which the user terminal selects an IC card application corresponding to the payment device to be used for the payment processing.

Specifically, for example, the user terminal receives data from the payment device such as a ticket gate or a store terminal, performs search processing as to whether or not the own device has a specific communication scheme-compatible IC card application capable of processing communication data according to a specific communication scheme such as UWB communication on the basis of the received data, acquires an identifier (AID) of the detected application, and transmits the acquired identifier to the payment device. The payment device transmits a select command storing the AID received from the user terminal to the user terminal, and the user terminal starts the IC card application according to the select command.

In a case where a user terminal such as a smartphone having a plurality of IC card applications performs payment processing using communication data of UWB communication or the like other than NFC communication with a payment device such as a ticket gate or a store terminal, the user terminal selects an IC card application corresponding to the payment device used for the payment processing.

With this configuration, in a case where a user terminal such as a smartphone having a plurality of IC card applications performs payment processing using communication data of UWB communication or the like other than NFC communication with a payment device such as a ticket gate or a store terminal, a configuration in which the user terminal selects an IC card application corresponding to the payment device used for the payment processing is implemented.

Note that the effect described in the present specification is merely an illustration and is not restrictive. Hence, additional effects can be obtained.

BRIEF DESCRIPTION OF DRAWINGS

FIG. 8 is a diagram illustrating an example of UWB-compatible application registration data stored in the user terminal of the present disclosure.

FIG. 21 is a diagram illustrating an example of IC card application registration data stored in a memory by the user terminal of the present disclosure.

FIG. 42 is a diagram illustrating a hardware configuration example of a communication processing device forming a user terminal or a payment terminal.

MODES FOR CARRYING OUT THE INVENTION

Figure 1:
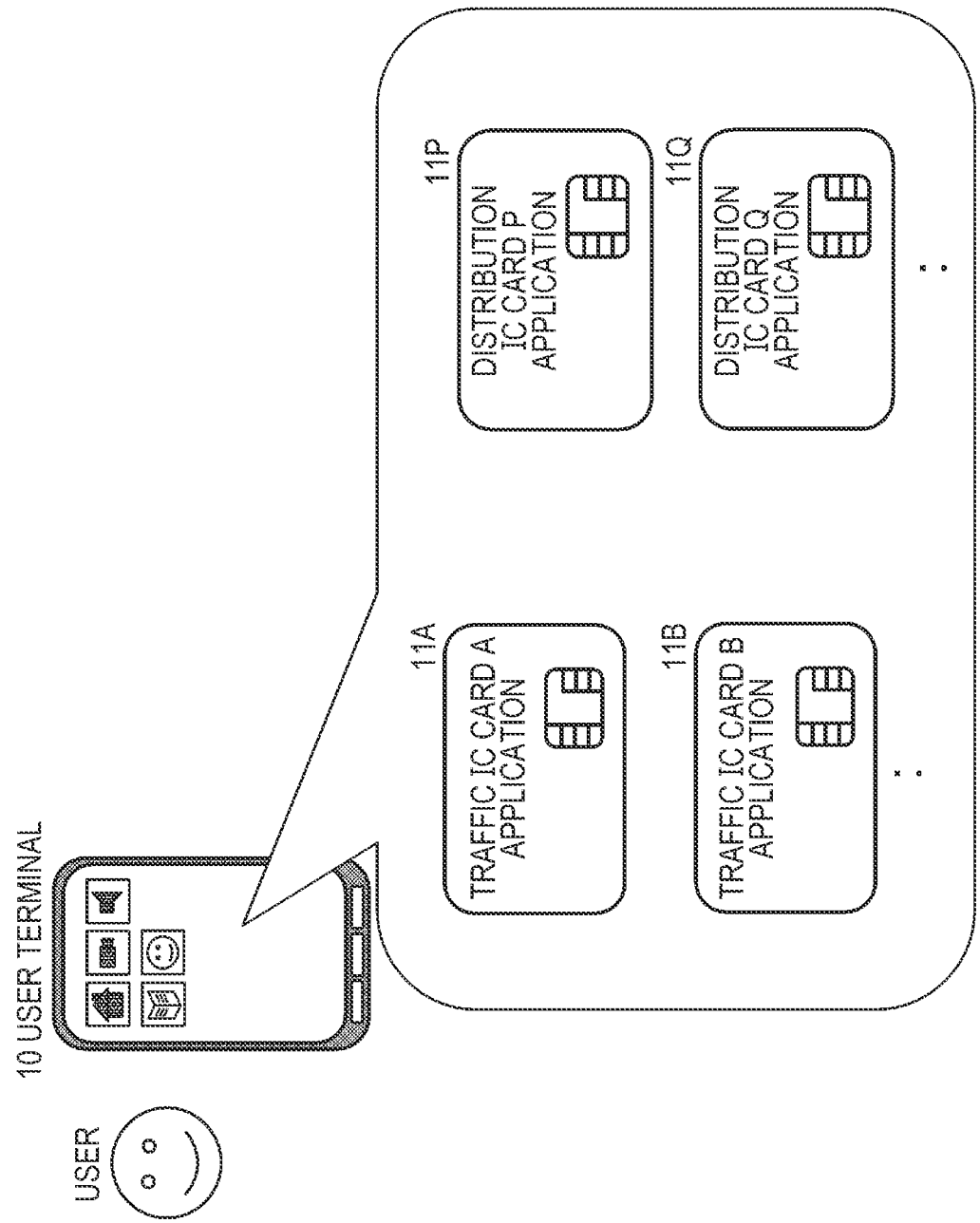
FIG. 1 is a diagram illustrating an example of an IC card application stored in a user terminal.

Hereinafter, details of a communication processing device, a communication processing system, a communication control method, and a program of the present disclosure will be described with reference to the drawings. Note that the description will be given according to the following items.

1. Usage configuration example of IC card application in user terminal
2. Outline of selection of IC card application and payment processing to which Type-F command in NFC communication is applied
3. (Example 1) Configuration and processing example of communication processing device of Example 1 of present disclosure
4. Configuration example of application in secure element of communication processing device (user terminal) of Example 1 of present disclosure
5. Sequence of processing executed by communication processing device of Example 1 of present disclosure
6. (Example 2) Configuration and processing example of communication processing device of Example 2 of present disclosure
7. Sequence of processing executed by communication processing device of Example 2
8. (Example 3) Configuration and processing example of communication processing device of Example 3 of present disclosure
9. Configuration example of communication processing device
10. Summary of configuration of present disclosure

1. Usage Configuration Example of IC Card Application in User Terminal

First, a usage configuration example of an IC card application in a user terminal will be described.

Recently, various IC card applications are installed and used in a user terminal such as a smartphone.

There are various types of IC card applications, such as an electronic money application, a transportation IC card application, and a distribution IC card application issued by a supermarket and the like.

FIG. 1 is a diagram illustrating examples of IC card applications installed in a user terminal 10 of a certain user.

As illustrated in FIG. 1, a plurality of different IC card applications is installed in the user terminal 10 such as a smartphone.

FIG. 1 illustrates an example in which the following four types of IC card applications are installed.

Traffic IC card A application 11A
Traffic IC card B application 11B
Distribution IC card P application 11P
Distribution IC card Q application 11Q

These are IC card applications provided by different service providers. The user brings the user terminal 10 such as a smartphone close to a reader/writer provided in a store or a ticket gate managed by each service provider to perform proximity communication. The reader/writer performs processing of subtracting a predetermined fee from a balance recorded in a memory in the user terminal 10 or from a bank account or a management account of a credit card company linked in advance. That is, rewriting of the balance and the like is executed.

For example, these IC card applications are installed in a secure element (SE) formed in the user terminal 10, records secure data such as balance information corresponding to each IC card application in a secure memory formed in the secure element (SE), and further executes processing of updating the balance information according to payment processing or the like.

Figure 2:
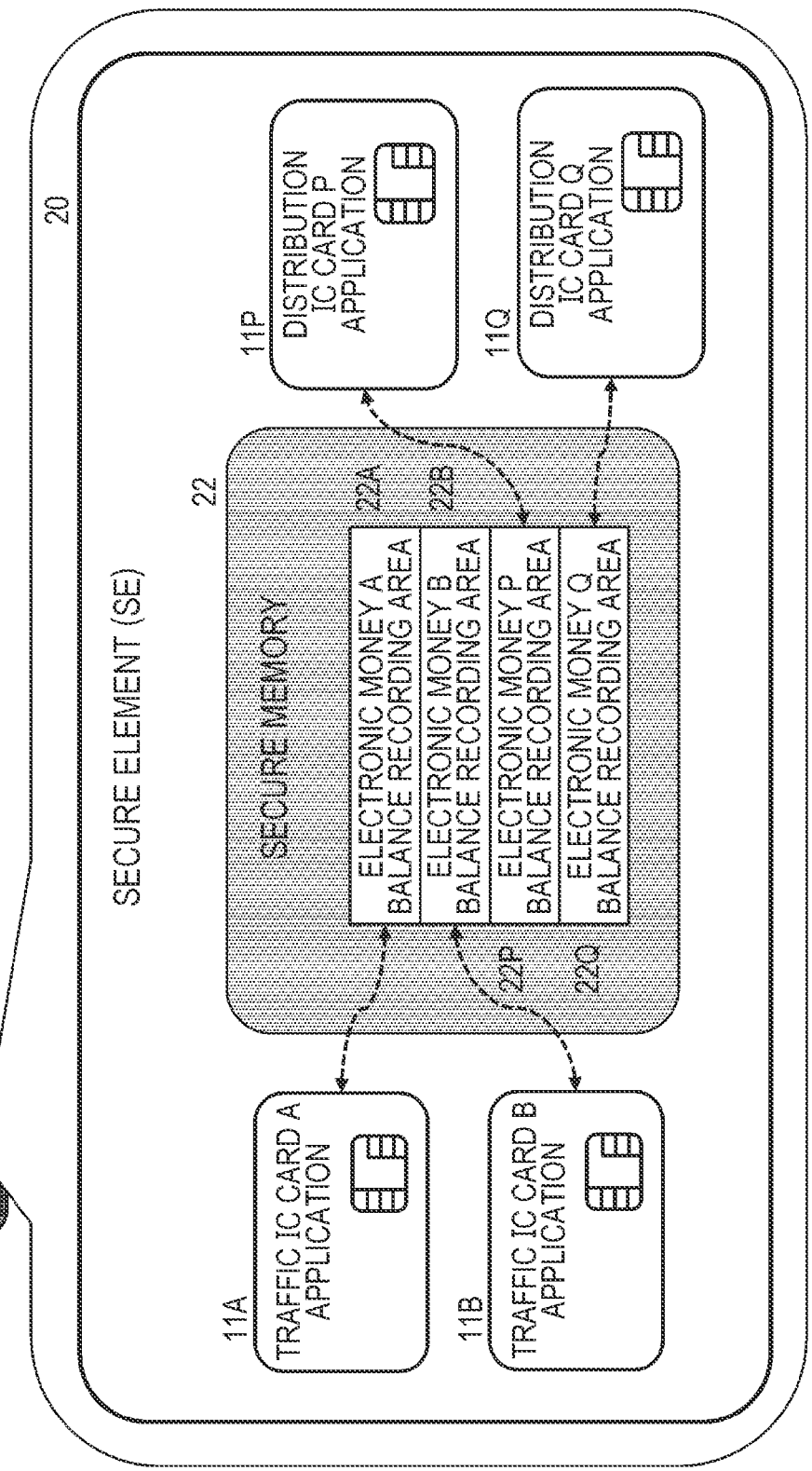
FIG. 2 is a diagram illustrating a configuration example of a secure element (SE) in the user terminal.

FIG. 2 illustrates a configuration example of a secure element (SE) 20 formed in the user terminal 10.

As illustrated in FIG. 2, the secure element (SE) 20 includes a plurality of IC card applications 11 described with reference to FIG. 1, and a secure memory 22 in which balance information and the like corresponding to each IC card application are recorded.

The example illustrated in FIG. 2 is an example of the secure memory 22 in which four electronic money balance recording areas corresponding to the four IC card applications described with reference to FIG. 1 are set.

An electronic money A balance recording area 22A is a balance information recording area corresponding to the transportation IC card A application 21A.

An electronic money B balance recording area 22B is a balance information recording area corresponding to the transportation IC card B application 21B.

The electronic money P balance recording area 22P is a balance information recording area corresponding to the distribution IC card P application 21P.

The electronic money Q balance recording area 22Q is a balance information recording area corresponding to the distribution IC card Q application 21Q.

As described above, the user terminal 10 includes the secure memory 22 in which the electronic money balance recording area in which the balance information corresponding to the IC card application provided by each service provider is individually recorded is set.

When the user terminal 20 such as a smartphone is brought close to a reader/writer provided in a store or a ticket gate managed by each service provider, the reader/writer executes processing of rewriting balance information in the balance recording area corresponding to the service provider.

With this processing, predetermined usage fee reduction processing, reload processing, and the like can be performed. The above processing is processing performed in units of service providers.

2. Outline of Selection of IC Card Application and Payment Processing to which Type-F Command in NFC Communication is Applied Next, an outline of selection of an IC card application and payment processing to which a Type-F command in NFC communication is applied, which is currently widely performed, will be described.

Figure 3:
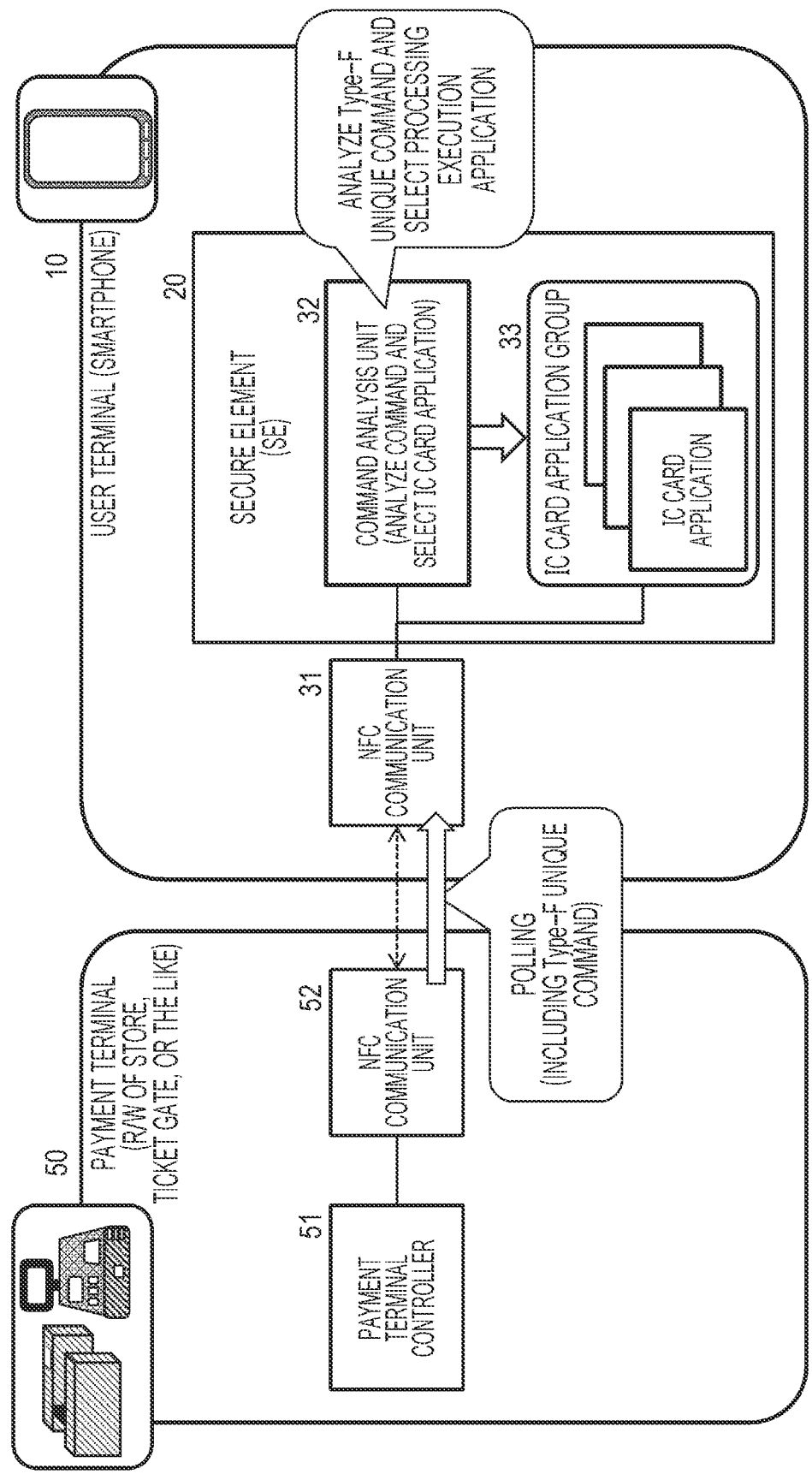
FIG. 3 is a diagram illustrating a configuration example of a user terminal and a payment terminal that perform payment processing by NFC communication.

FIG. 3 is a block diagram illustrating a configuration example of the user terminal 10 such as a smartphone and a payment terminal 50.

The payment terminal 50 is, for example, a device including a reader/writer (R/W) installed at a ticket gate of a station or a store, and performs payment processing by executing proximity communication with the user terminal 10 such as a smartphone.

The user terminal 10 such as a smartphone and the payment terminal 50 perform payment processing by executing wireless communication according to the Type-F standard of the near field communication (NFC) standard, which is one of short-range wireless communication standards.

As described above, the NFC standard includes a plurality of different standards such as Type A, Type B, and Type-F as subdivided substandards. Type-F is a communication standard used in FeliCa (registered trademark), which is a contactless IC card technology system developed by Sony Corporation.

As illustrated in FIG. 3, the user terminal 10 includes the secure element 20 and an NFC communication unit 31. The payment terminal 50 includes a payment terminal controller 51 and an NFC communication unit 52.

The secure element 20 of the user terminal 10 includes a command analysis unit 32 and an IC card application group 33. The IC card application group 33 includes a plurality of IC card applications, and includes various IC card applications such as a transportation IC card application and a distribution IC card application as described with reference to FIGS. 1 and 2.

When the NFC communication unit 31 of the user terminal 10 comes to a predetermined distance, such as several centimeters, from the NFC communication unit 52 of the payment terminal 50, for example, wireless communication is started between the communication units.

That is, wireless communication according to the NFC standard, which is one of short-range wireless communication standards, is started.

First, under the control of the payment terminal controller 51 of the payment terminal 50, a polling signal is output from the NFC communication unit 52 of the payment terminal 50. This polling signal is a signal for detecting a communication terminal to be a communication partner.

The polling signal includes a Type-F unique command defined in the above-described Type-F standard.

When receiving the polling signal including the Type-F unique command, the NFC communication unit 31 of the user terminal 10 inputs the received signal to the command analysis unit 32 in the secure element 20.

The command analysis unit 32 in the secure element 20 analyzes the polling signal including the Type-F unique command received from the payment terminal 50.

The command analysis unit 32 analyzes the Type-F unique command included in the polling signal, and generates IC card application designation information (application ID (AID)) according to the type of the payment terminal. For example, in a case where it is analyzed that the payment terminal 50 is a device of a ticket gate of a railroad company A by analysis of the Type-F unique command, IC card application designation information (AID) of an IC card application that can be used for payment processing of the railroad company A is generated. According to the analysis result of the command analysis unit 32, one IC card application is selected from the IC card application group 33 and started.

Thereafter, the selected one IC card application executes NFC communication with the payment terminal 50 via the NFC communication unit 31, and executes a series of processing required for payment processing such as authentication processing, balance confirmation processing, usage fee withdrawal processing, and balance update processing.

Figure 4:
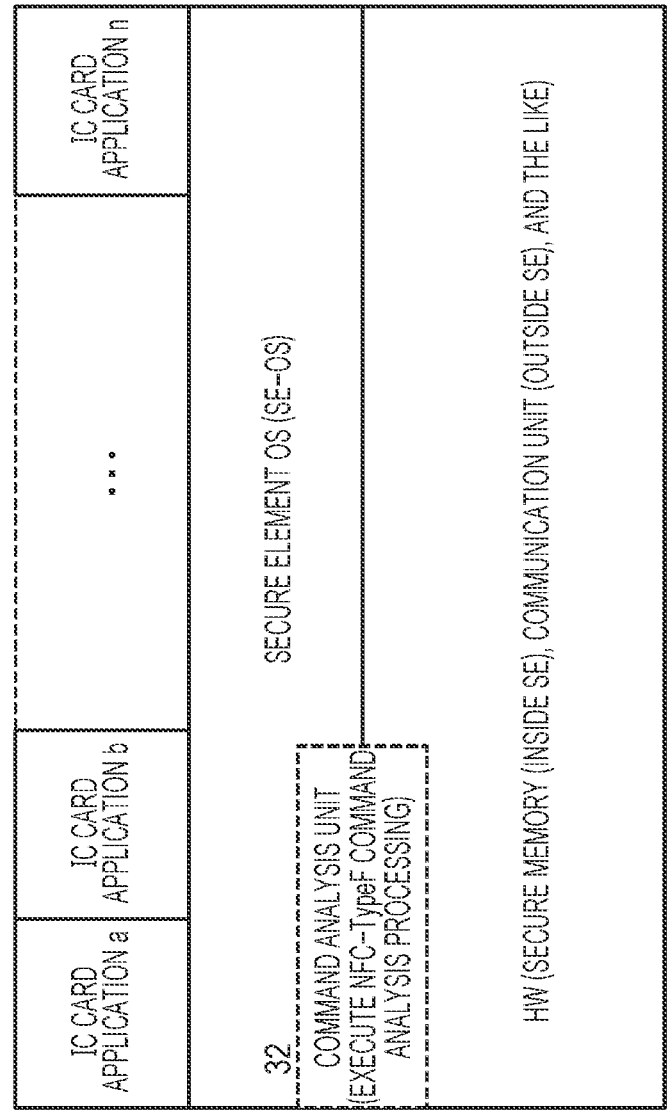
FIG. 4 is a diagram illustrating an example of a software stack of a secure element of the user terminal.

FIG. 4 is a diagram illustrating an example of a software stack of the secure element (SE) 20.

As illustrated in FIG. 4, the software stack of the secure element (SE) 20 has a configuration in which a hardware (HW) layer is set as a lowermost layer, a secure element OS (SE-OS) layer is set as an upper layer thereof, and an application layer including various applications is set as an uppermost layer.

The lowermost hardware (HW) layer includes, for example, a secure memory in the secure element and a communication unit outside the secure element, that is, the NFC communication unit 31 illustrated in FIG. 3.

The command analysis unit 32 of the secure element 20 illustrated in FIG. 3 is located between a lowermost hardware (HW) layer and a secure element OS (SE-OS) layer. That is, a part of the processing of the command analysis unit 32 is executed in the hardware (HW) layer, and a part thereof is executed in the secure element OS (SE-OS) layer.

The uppermost application layer includes various IC card applications a to n included in the IC card application group 33 illustrated in FIG. 3.

The IC card applications a to n in the uppermost application layer access the secure memory inside the secure element and the communication unit outside the secure element via the secure element OS (SE-OS) layer, and execute memory data update processing and communication processing with an external device.

As described above, the command analysis unit 32 receives and analyzes a polling signal including the Type-F unique command transmitted by the payment terminal 50 via the NFC communication unit 31.

The command analysis unit 32 analyzes the Type-F unique command included in the polling signal and generates IC card application designation information (application ID (AID)).

The IC card application designation information (AID) generated by the command analysis unit 32 is passed to the secure element OS (SE-OS), and the secure element OS (SE-OS) selects and starts one IC card application corresponding to the IC card application designation information (AID) generated by the command analysis unit 32 from the application layer which is the uppermost layer.

Thereafter, the selected one IC card application executes NFC communication with the payment terminal 50 via the secure element OS (SE-OS) and the NFC communication unit 31, and executes a series of processing required for payment processing such as authentication processing, balance confirmation processing, usage fee withdrawal processing, and balance update processing.

As described above, Type-F is a lower standard of the NFC standard used in FeliCa (registered trademark), which is a contactless IC card technology system developed by Sony Corporation, and is widely used in communication between various electronic money type IC cards or a user terminal such as a smartphone having an IC card application installed therein and a reader/writer (R/W).

By performing the Type-F NFC communication, it is possible to perform IC application selection processing by analyzing a polling signal including a Type-F unique command.

For example, in a case where a user terminal in which two of a transportation IC card application and a distribution IC card application are installed is held close to a reader/writer (R/W) of a railway ticket gate, the command analysis unit 32 illustrated in FIG. 3 analyzes a polling signal including a Type-F unique command transmitted from the reader/writer (R/W) of the railway ticket gate to the user terminal. On the basis of the analysis result, the transportation IC card application that performs payment processing necessary for passing through the railway ticket gate is selected, and communication and payment processing between the selected transportation IC card application and the reader/writer (R/W) of the railway ticket gate can be performed.

However, the command analysis unit 32 described with reference to FIGS. 3 and 4 can analyze a communication packet according to a communication packet format defined in the Type-F communication standard, which is a lower standard of the NFC communication standard, but cannot analyze a packet having a different format.

That is, the command analysis unit 32 cannot analyze communication packets in a packet format different from the NFC-Type-F standard.

For example, in ultra wide band (UWB) communication that is ultra-wide band wireless communication and Bluetooth low energy (BLE) communication that is low power consumption type Bluetooth (registered trademark) communication, communication packets in a format different from the packet format defined by the NFC Type-F communication standard are used.

The command analysis unit 32 illustrated in FIG. 3 cannot analyze such packets in different formats.

Therefore, even if the user terminal and the payment terminal (R/W) of a ticket gate, a store, or the like perform communication using UWB communication or BLE communication other than NFC communication, it is not possible to select one IC card application corresponding to the type of the payment terminal from among a plurality of IC card applications installed in the user terminal and perform processing.

Note that since UWB communication and BLE communication have a wider communicable range than NFC communication, for example, it is possible to perform wireless communication between the user terminal such as a smartphone and the ticket gate-side R/W at the timing when the user passes through the ticket gate without taking out the user terminal put in a pocket or a bag by the user.

The configuration of the present disclosure enables processing to be performed by selecting one IC card application from a plurality of IC card applications installed in a user terminal even when UWB communication or BLE communication other than NFC communication is used.

Hereinafter, the configuration and processing of the present disclosure will be described.

3. (Example 1) Configuration and Processing Example of Communication Processing Device of Example 1 of Present Disclosure Next, the configuration and a processing example of the communication processing device of Example 1 of the present disclosure will be described.

Figure 5:
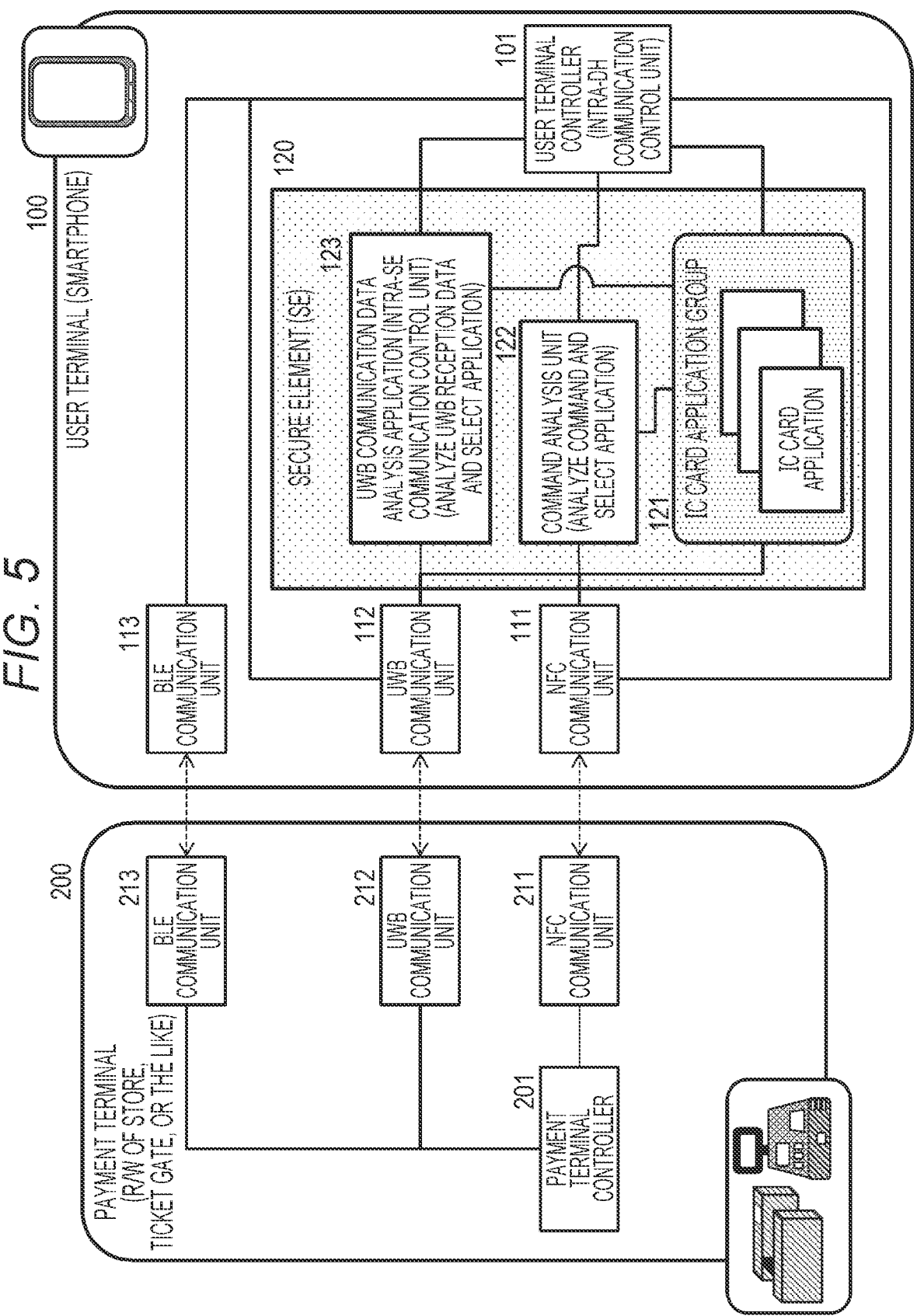
FIG. 5 is a diagram illustrating a configuration example of the user terminal and the payment terminal of the present disclosure.

FIG. 5 is a block diagram illustrating a configuration example of a user terminal 100 which is the communication processing device of Example 1 of the present disclosure and a payment terminal 200 which communicates with the user terminal 100.

The payment terminal 200 is, for example, a device including a reader/writer (R/W) installed at a ticket gate of a station or a store, and performs payment processing by executing proximity communication with the user terminal 100 such as a smartphone.

The user terminal 100 such as a smartphone and the payment terminal 200 each include three different communication units. That is, the user terminal 100 illustrated in FIG. 5 includes an NFC communication unit 111, a UWB communication unit 112, and a BLE communication unit 113. Similarly, the payment terminal 200 also includes an NFC communication unit 211, a UWB communication unit 212, and a BLE communication unit 213.

The NFC communication unit 111 of the user terminal 100 and the NFC communication unit 211 of the payment terminal 200 execute wireless communication according to the Type-F standard of the near field communication (NFC) standard, which is one of short-range wireless communication standards as described with reference to FIG. 3.

The UWB communication unit 112 of the user terminal 100 and the UWB communication unit 212 of the payment terminal 200 execute ultra wide band (UWB) communication, which is ultra-wide band wireless communication.

UWB communication is a communication standard defined in IEEE 802.15.4z, and the communication allowable distance is about 10 m. Furthermore, the UWB communication standard includes a regulation on a "secure ranging" method for analyzing a device position while maintaining security.

"Secure ranging" is a technology that enables secure measurement of a distance and an angle between communication devices by transmitting and receiving encrypted data using a common key.

When the user terminal 100 comes to the UWB communicable distance (about 10 m), the payment terminal 200 detects the user terminal 100 by UWB communication, starts secure ranging of the user terminal 100, and then, performs processing of continuously analyzing the position of the user terminal 100. A specific processing sequence will be described later.

Bluetooth low energy (BLE) communication, which is low power consumption Bluetooth (registered trademark) communication, is performed between the BLE communication unit 113 of the user terminal 100 and the BLE communication unit 213 of the payment terminal 200.

While the allowable communication distance of BLE communication slightly varies depending on the class, it is about several tens of meters.

BLE communication is communication means suitable for device detection, establishment of communication connection, and data communication within a range of several tens of meters.

In the BLE communication standard, an ADV_IND packet (general advertising indication packet) is defined as a broadcast packet for device detection.

When the user terminal 100 comes to the BLE communicable distance (several tens of meters), the payment terminal 200 can detect the user terminal 100 by BLE communication and establish BLE communication with the user terminal 100.

As illustrated in FIG. 5, the user terminal 100 includes a user terminal controller (device host (DH)) 101 and a secure element 120 in addition to the three communication units of the NFC communication unit 111, the UWB communication unit 112, and the BLE communication unit 113.

The payment terminal 200 includes a payment terminal controller 201 in addition to the three communication units of the NFC communication unit 211, the UWB communication unit 212, and the BLE communication unit 213.

The secure element 120 of the user terminal 100 includes an IC card application group 121 including a plurality of IC card applications, a command analysis unit 122, and a UWB communication data analysis application (intra-SE communication control unit) 123.

The IC card application group 121 includes various IC card applications such as the transportation IC card application and the distribution IC card application described with reference to FIGS. 1 and 2.

NFC communication performed between the NFC communication unit 111 of the user terminal 100 and the NFC communication unit 211 of the payment terminal 200 is similar to the processing described above with reference to FIG. 3.

That is, when the NFC communication unit 111 of the user terminal 100 comes to a predetermined distance, such as several centimeters, from the NFC communication unit 211 of the payment terminal 200, wireless communication according to the NFC standard is started.

The user terminal 100 and the payment terminal 200 illustrated in FIG. 5 include a BLE communication unit and a UWB communication unit other than the NFC communication unit, and when the distance between the user terminal 100 and the payment terminal 200 is within several meters to several tens of meters, communication via these communication units becomes possible.

Using UWB communication, the user terminal 100 achieves processing similar to the IC card application selection processing by the Type-F unique command used in NFC communication described with reference to FIG. 3.

The UWB communication data analysis application (intra-SE communication control unit) 123 in the secure element 120 of the user terminal 100 illustrated in FIG. 5 analyzes UWB communication data transmitted from the payment terminal 200 and executes IC card application selection processing.

Figure 6:
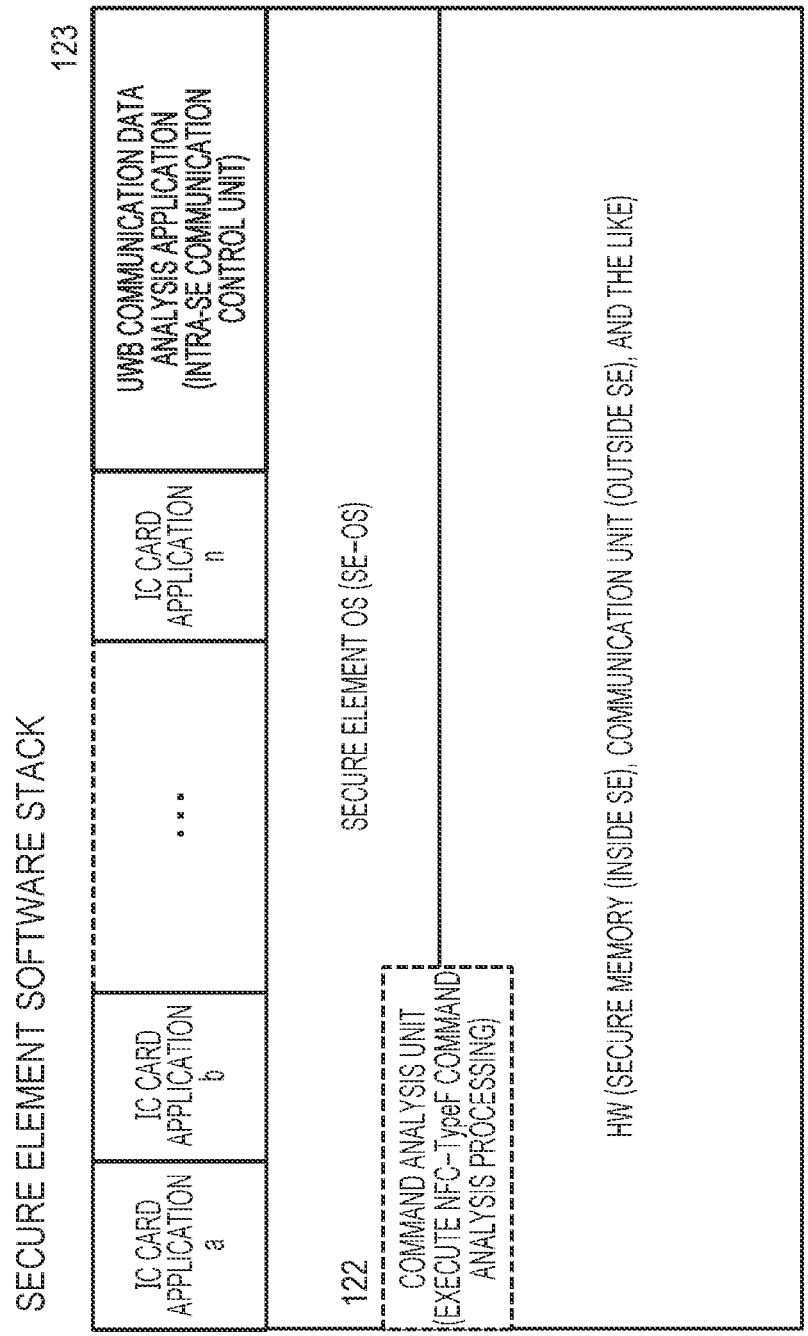
FIG. 6 is a diagram illustrating an example of a software stack of a secure element of the user terminal of the present disclosure.

FIG. 6 is a diagram illustrating an example of a software stack of the secure element (SE) 120 of the user terminal 100 illustrated in FIG. 5.

As illustrated in FIG. 6, the software stack of the secure element (SE) 120 has a configuration in which a hardware (HW) layer is set as a lowermost layer, a secure element OS (SE-OS) layer is set as an upper layer thereof, and an application layer including various applications is set as an uppermost layer.

The lowermost hardware (HW) layer includes, for example, a secure memory in the secure element and a communication unit outside the secure element, that is, the NFC communication unit 111 and the UWB communication unit 112 illustrated in FIG. 5.

The command analysis unit 122 of the secure element 120 illustrated in FIG. 5 is located between a lowermost hardware (HW) layer and a secure element OS (SE-OS) layer. That is, a part of the processing of the command analysis unit 122 is executed in the hardware (HW) layer, and a part thereof is executed in the secure element OS (SE-OS) layer.

The uppermost application layer includes various IC card applications a to n included in the IC card application group 121 illustrated in FIG. 5 and the UWB communication data analysis application (intra-SE communication control unit) 123.

The IC card applications a to n in the uppermost application layer and the UWB communication data analysis application (intra-SE communication control unit) 123 access the secure memory inside the secure element and the communication unit outside the secure element via the secure element OS (SE-OS) layer, and execute memory data update processing and communication processing with an external device.

The command analysis unit 122 of the secure element 120 illustrated in FIG. 5 analyzes a polling signal including a Type-F unique command received from the payment terminal 200 via the NFC communication unit 111, extracts IC card application designation information of the Type-F unique command, and selects and starts one IC card application from the plurality of IC card applications stored in the secure element 120. This processing is similar to that of the conventional configuration illustrated in FIG. 3.

In the user terminal 100 illustrated in FIG. 5, the UWB communication data analysis application (intra-SE communication control unit) 123 of the secure element 120 further analyzes UWB communication data transmitted from the payment terminal 200, and executes IC card application selection processing.

By performing this processing, it is possible to perform payment processing by UWB communication before NFC communication can be started.

An outline of a communication sequence executed between the user terminal 100 and the payment terminal 200 illustrated in FIG. 5 will be described.

Note that the payment terminal controller 201 of the payment terminal 200 performs communication control of each communication unit of the NFC communication unit 211, the UWB communication unit 212, and the BLE communication unit 213 of the payment terminal 200.

First, the payment terminal controller 201 broadcasts an advertise packet, which is a user terminal detection and BLE communication connection establishment request packet, from the BLE communication unit 213. In the BLE communication standard, an ADV_IND packet (general advertising indication packet) is defined as a broadcast packet for device detection.

When receiving the advertise packet transmitted by the payment terminal 200, the user terminal 100 that has entered the BLE communicable area transmits a response packet including a user terminal identifier to the payment terminal 200. The payment terminal 200 detects the user terminal 100 by acquiring the user terminal identifier from the response packet transmitted from the user terminal 100.

When the user terminal is detected, the payment terminal 200 next starts position identification processing of the user terminal 100.

The payment terminal controller 201 of the payment terminal 200 uses ultra wide band (UWB) communication to perform the position identification processing of the user terminal 100.

As described above, UWB communication defines a "secure ranging" method for analyzing a device position while maintaining security. "Secure ranging" is a technology that enables secure measurement of a distance and an angle between communication devices by transmitting and receiving encrypted data using a common key.

When detecting the user terminal by BLE communication, the payment terminal 200 outputs a UWB communication signal for identifying the position of the detected user terminal 100, establishes communication between the UWB communication unit 212 of the payment terminal 200 and the UWB communication unit 112 of the user terminal 100, and continuously executes position identification processing of the user terminal 100.

Note that the UWB communication unit 212 of the payment terminal 200 performs data analysis of time of arrival (ToA) and angle of arrival (AoA) in secure ranging by UWB communication.

Time of arrival (ToA) corresponds to a transmission/reception time of a UWB signal, and the payment terminal controller 201 of the payment terminal 200 analyzes the distance from the payment terminal 200 to the user terminal 100 on the basis of the time.

Angle of arrival (AoA) is angle information input from a transmission signal of the user terminal 100 to the payment terminal 200. The payment terminal controller 201 of the payment terminal 200 analyzes the direction of the user terminal 100 on the basis of this angle.

The payment terminal controller 201 of the payment terminal 200 identifies the position of the user terminal 100 by analyzing the ToA and the AoA.

Note that the payment terminal controller 201 of the payment terminal 200 continuously executes the user terminal position identification processing after the detection of the user terminal 100 until the payment processing is started or ended, such as until the user passes through the ticket gate where the payment terminal 200 is installed.

In parallel with execution of secure ranging by UWB communication, the payment terminal controller 201 of the payment terminal 200 executes selection of the IC card application and communication with the IC card application by UWB communication to perform payment processing and the like.

An outline of selection of an IC card application and a sequence of communication processing with the IC card application by UWB communication will be described. The payment terminal 200 first starts UWB communication with the UWB communication data analysis application (intra-SE communication control unit) 123 of the secure memory 120 of the user terminal 100.

If the UWB communication with the UWB communication data analysis application (intra-SE communication control unit) 123 is successful, thereafter, the payment terminal 200 transmits an inquiry packet of designation information (application ID (AID)) of the IC card application used for payment processing to the UWB communication data analysis application (intra-SE communication control unit) 123 of the user terminal 100.

In response to the inquiry packet received from the payment terminal 200, the UWB communication data analysis application (intra-SE communication control unit) 123 of the user terminal 100 generates a response packet storing designation information (AID) of the IC card application that can be used for the payment processing with the payment terminal 200, and transmits the response packet to the payment terminal 200.

Next, the payment terminal 200 transmits an IC card application selection command (SELECT command) packet storing the designation information (AID) of the IC card application received from the user terminal to the user terminal 100 by UWB communication.

When receiving the IC card application selection command (SELECT command) packet transmitted from the payment terminal 200, the UWB communication unit 112 of the user terminal 100 passes the received packet to the secure element (SE-OS) 120.

The secure element (SE-OS) 120 recognizes the SELECT command in the packet and acquires the application ID (AID) of the communication request target application stored in the packet.

The secure element (SE-OS) 120 selects and starts one application corresponding to the application ID (AID) acquired from the SELECT command, that is, a UWB communication-compatible IC card application.

Thereafter, the selected one IC card application executes UWB communication with the payment terminal 200 via the secure element OS (SE-OS) and the UWB communication unit 112, and executes a series of processing required for payment processing such as authentication processing, balance confirmation processing, usage fee withdrawal processing, and balance update processing.

As illustrated in FIG. 6, the UWB communication data analysis application (intra-SE communication control unit) 123 set in the user terminal 100 of the present disclosure is one application of the application layer, and there is no need to change hardware or the secure element OS (SE-OS). For example, there is an advantage that the UWB communication data analysis application (intra-SE communication control unit) 123 can be installed on an existing smartphone owned by the user at any time.

That is, similarly to the IC card application of the uppermost application layer illustrated in FIG. 6, the user can freely perform installation and uninstallation.

As described above, unlike NFC communication in which the communicable distance is several centimeters, UWB communication has a communicable distance of about several tens of meters and enables communication even when the user terminal 100 is not in close contact with the payment terminal 200.

Therefore, by installing the UWB communication data analysis application (intra-SE communication control unit) 123 on the smartphone (user terminal 100) of the user, the smartphone put in the user's bag can perform payment processing by UWB communication with a payment terminal provided in a ticket gate at a position several meters away from the ticket gate, and the user can pass through the ticket gate by performing the payment processing without taking out the user terminal such as the smartphone put in the bag.

Furthermore, the same applies to a case of payment using a payment terminal of a store or the like, and the user can complete payment processing while approaching and passing through the payment terminal of the store without holding the user terminal such as a smartphone over the payment terminal of the store.

4. Configuration Example of Application in Secure Element of Communication Processing Device (User Terminal) of Example 1 of Present Disclosure Next, a configuration example of an application in a secure element of the communication processing device (user terminal) of Example 1 of the present disclosure will be described.

Figure 7:
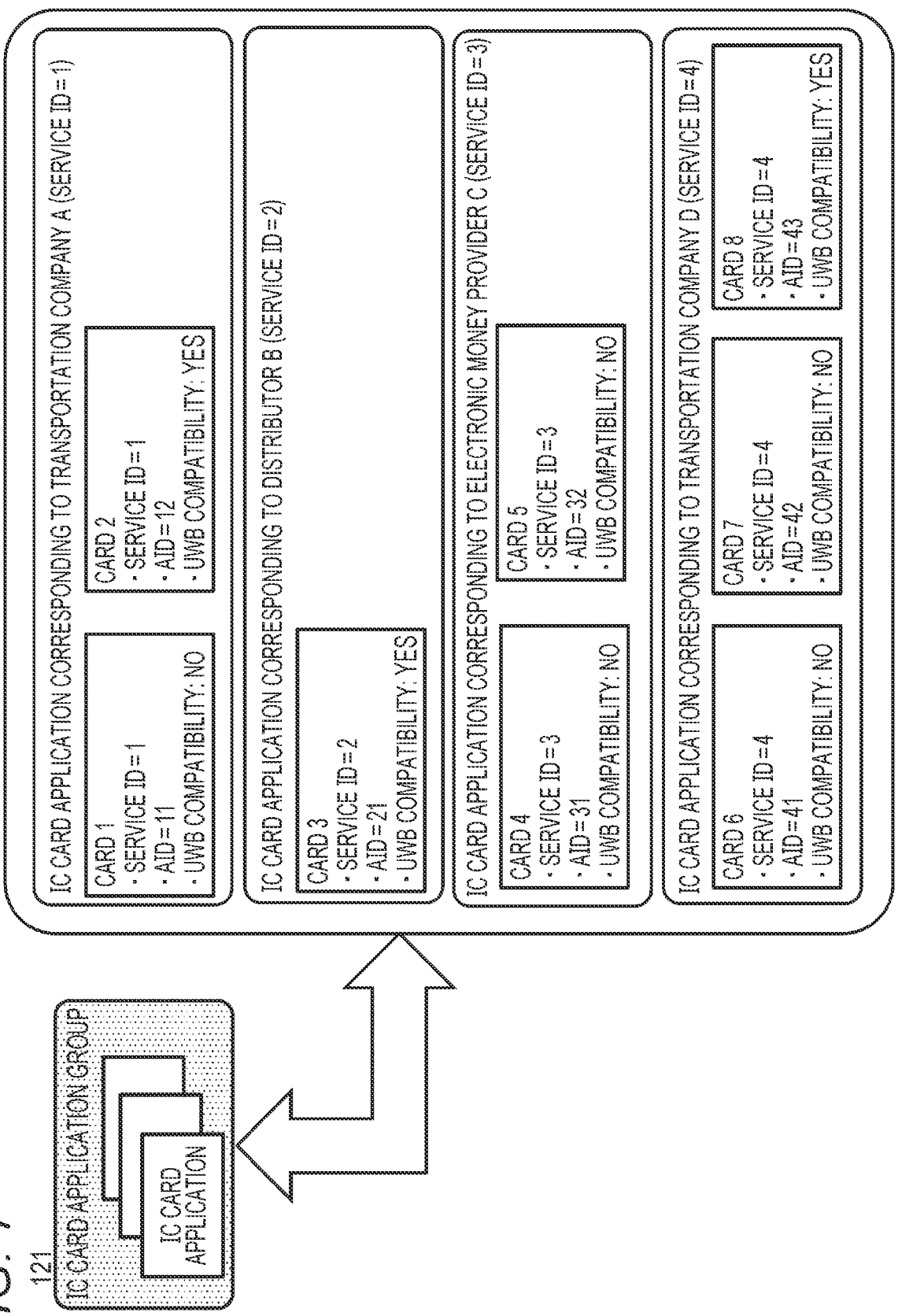
FIG. 7 is a diagram illustrating an example of an IC card application stored in the user terminal of the present disclosure and an example of attribute information of the IC card application.

FIG. 7 is a diagram illustrating an example of an IC card application in the IC card application group 121 of the secure element 120 of the user terminal 100 illustrated in FIG. 5 and attribute information set in each IC card application.

Note that the IC card application illustrated in FIG. 7 is an example, and the IC card applications stored in user terminals have different settings.

FIG. 7 illustrates an example in which the following IC card applications are stored in the IC card application group 121.
(A) IC card application corresponding to transportation company A (service ID=1)
(a1) Card 1
(a2) Card 2
(B) IC card application corresponding to distributor B (service ID=2)
(b1) Card 3
(C) IC card application corresponding to electronic money provider C (service ID=3)
(c1) Card 4
(c2) Card 5
(D) IC card application corresponding to transportation company D (service ID=4)
(d1) Card 6
(d2) Card 7
(d3) Card 8

These eight (cards 1 to 8) IC card applications are stored (installed) as IC card applications in the IC card application group 121 of the secure element 120 of the user terminal 100 illustrated in FIG. 5.

In each of the IC card applications, the following information is recorded as attribute information of each of the IC card applications.
(Attribute information 1) Service ID
(Attribute Information 2) AID (application ID)
(Attribute information 3) UWB communication compatibility information (Attribute information 1) A service ID is an identifier of a service that can be received using the IC card application. For example, in the case of the "IC card application corresponding to transportation company A", a usage service of transportation facilities such as railways and buses managed by the transportation company A can be received, and the service ID of this service is service ID=1. As illustrated in FIG. 7, the same service ID is set for two types of card applications of "IC card application corresponding to transportation company A", that is, (a1) card 1 and (a2) card 2.

(Attribute information 2) An AID (application ID) is an identifier indicating an application type of the IC card application.

Different application IDs (AIDs) are set for the two types of card applications of "IC card application corresponding to transportation company A" illustrated in FIG. 7, (a1) card 1 and (a2) card 2. This means that the two card applications (a1) card 1 and (a2) card 2 have the same available service, but have different processing programs set as applications.

Specifically, (a1) card 1 is a card application incapable of processing UWB communication data, and (a2) card 2 is a card application capable of processing UWB communication data.

The UWB communication data processability information is recorded as
(Attribute information 3) UWB communication compatibility information.
(a1) Card 1 presents UWB compatibility=No, indicating that the card application is incapable of processing UWB communication data.

On the other hand, (a2) card 2 presents UWN compatibility=Yes, indicating that the card application is capable of processing communication UWB communication data.

As described above, in each of the IC card applications, the following information is recorded as attribute information of each IC card application.
(Attribute information 1) Service ID
(Attribute Information 2) AID (application ID)
(Attribute information 3) UWB communication compatibility information At least a part of the attribute information of the IC card application is recorded as an "IC card application attribute information registration table" in a memory in the user terminal 100.

FIG. 8 illustrates an example of the "IC card application attribute information registration table".

An example of the "IC card application attribute information registration table" illustrated in FIG. 8 is "UWB-compatible application registration data", which is a table in which correspondence data between a service ID and an application ID (AID) of a UWB-compatible IC card application is registered.

For example, "UWB-compatible application registration data" as illustrated in FIG. 8 is recorded in the memory in the user terminal 100.

The UWB communication data analysis application (intra-SE communication control unit) 123 of the secure element (SE-OS) 120 of the user terminal 100 refers to, for example, the "UWB-compatible application registration data" as illustrated in FIG. 8 recorded in the memory, acquires the application ID (AID) of the IC card application capable of UWB communication, and performs processing of notifying the payment terminal 200 of the application ID (AID).

Note that the UWB communication data analysis application (intra-SE communication control unit) 123 is an application stored in the secure element (SE) 120 similarly to the IC card application, and has an application ID (AID) similarly to the IC card application.

Figure 9:
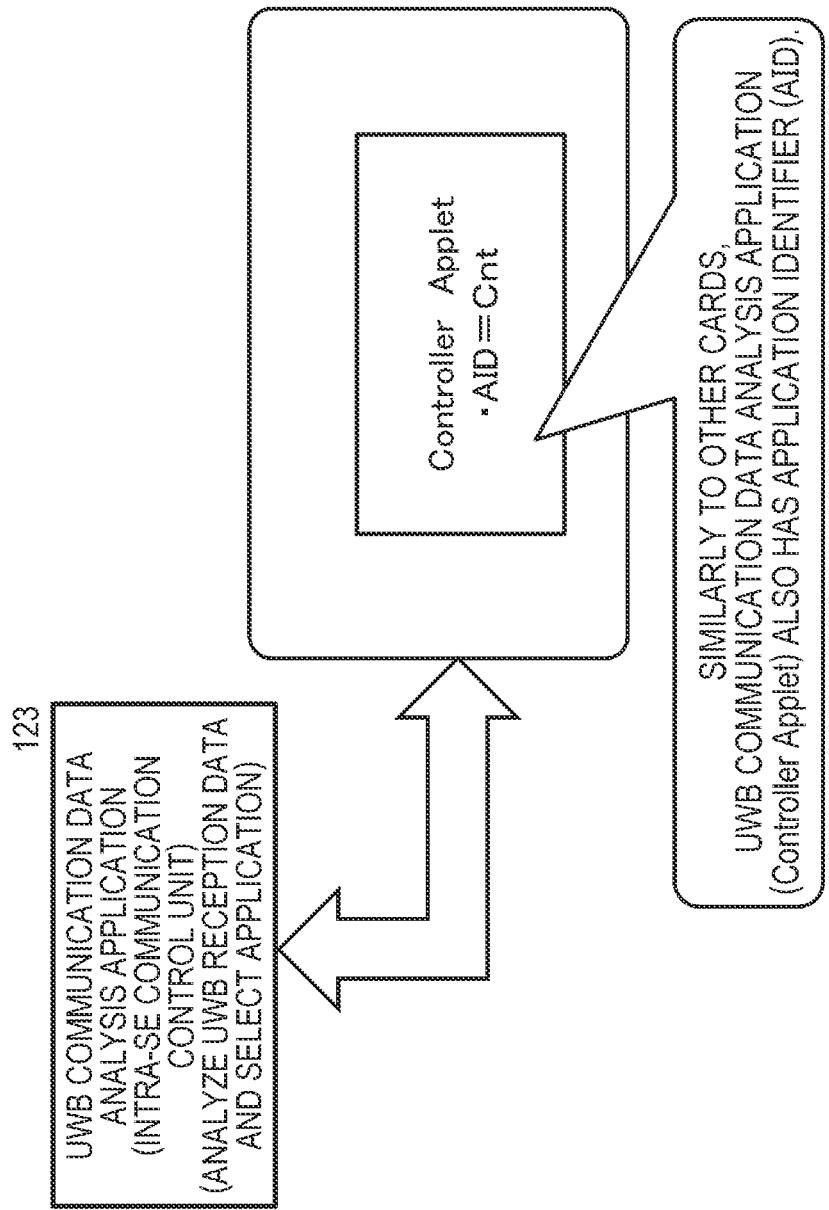
FIG. 9 is a diagram illustrating an example of attribute information of a UWB communication data analysis application in the user terminal of the present disclosure.

FIG. 9 illustrates a setting example of the application ID (AID) of the UWB communication data analysis application (intra-SE communication control unit) 123.

For example, as illustrated in FIG. 9, an application ID (AID) such as

*AID=Cnt* is set for the UWB communication data analysis application (intra-SE communication control unit) 123.

5. Sequence of Processing Executed by Communication Processing Device of Example 1 of Present Disclosure Next, a sequence of processing executed by the communication processing device of Example 1 of the present disclosure will be described.

The following processing sequences will be described in order.

(1) Processing sequence of registering UWB-compatible IC card application to user terminal by user
(2) Processing sequence of notifying payment terminal of UWB-compatible IC card application by user terminal
(3) Processing sequence of payment by UWB communication between UWB-compatible IC card application of user terminal and payment terminal (5-(1) Processing Sequence of Registering UWB-Compatible IC Card Application to User Terminal by User)

First, (1) processing sequence of registering UWB-compatible IC card application to user terminal by user will be described.

This processing is processing of recording one IC card application of the IC card application group 121 in the secure element (SE) 120 in the table described above with reference to FIG. 8, that is, the "UWB-compatible application registration data" table, and making it available as an IC card application capable of payment by UWB communication.

Note that the attribute information recording processing of the IC card application for the "UWB-compatible application registration data" may be executed by the UWB communication data analysis application (intra-SE communication control unit) 123 itself, or may be executed in response to a user request according to the sequence described with reference to FIG. 10.

Figure 10:
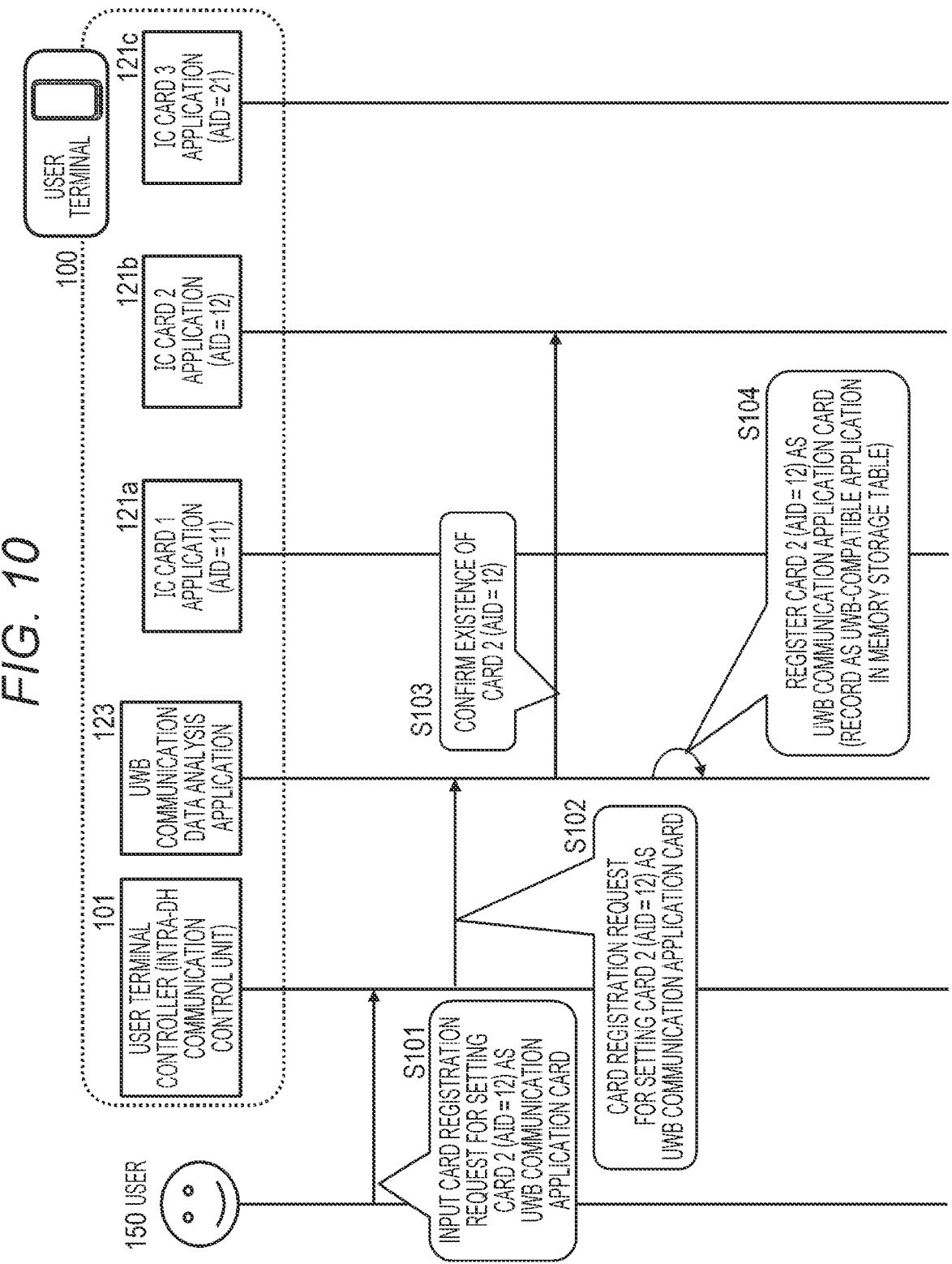
FIG. 10 is a sequence diagram illustrating a processing sequence of processing executed by the user terminal of the present disclosure.

FIG. 10 is a sequence diagram illustrating a registration processing sequence of a UWB-compatible IC card application to the user terminal by the user.

FIG. 10 illustrates a user 150 at the left end and the user terminal 100 on the right side, and illustrates, from the left, as components of the user terminal 100, the user terminal controller (intra-DH communication control unit) 101,
the UWB communication data analysis application (intra-SE communication control unit) 123,
an IC card 1 application (AID=11) 121*a*,
an IC card 2 application (AID=12) 121*b*, and
an IC card 3 application (AID=21) 121*c*.

Details of each processing of steps S101 to S104 illustrated in FIG. 10 will be sequentially described.

(Steps S101 to S102)

First, in step S101, the user 150 inputs designation information of a specific card application to be registered as a UWB-compatible IC card application.

Note that this processing is executed, for example, in a case where the user registers an IC card application newly installed on the user terminal as a UWB-compatible IC card application.

The user displays information of the newly installed IC card application on a display unit of the user terminal 100, and inputs a registration request for registering the displayed IC card application as a "UWB-compatible IC card application" on the user terminal 100.

For example, an icon with a display such as "register as UWB-compatible IC card application" is tapped.

With this tap processing, attribute information of the IC card application being displayed on the display unit of the user terminal 100 is read from the IC card application, and is input to the UWB communication data analysis application (intra-SE communication control unit) 123 via the user terminal controller (intra-DH communication control unit) 101 in step S102.

Note that here, as an example, it is assumed that the IC card 2 application (AID=12) 121*b* with the application identifier (AID)=12 is designated as a registration target.

(Step S103)

Next, in step S103, the UWB communication data analysis application (intra-SE communication control unit) 123 executes existence confirmation of the IC card 2 application (AID=12) designated by the user.

In step S103, the UWB communication data analysis application (intra-SE communication control unit) 123 refers to the IC card application group 121 of the secure element (SE) 120, and checks whether or not the IC card 2 application (AID=12) exists.

If the presence of the IC card 2 application (AID=12) is confirmed, the processing proceeds to step S104.

On the other hand, if the presence of the IC card 2 application (AID=12) is not confirmed, the processing does not proceed to step S104, but an error message is output to the display unit of the user terminal 100, and the processing is terminated.

(Step S104)

If the presence of the IC card 2 application (AID=12) which has been requested by the user to register as the UWB communication application card is confirmed, the processing proceeds to step S104.

In this case, in step S104, the UWB communication data analysis application (intra-SE communication control unit) 123 registers the IC card 2 application (AID=12) in the table described above with reference to FIG. 8, that is, the "UWB-compatible application registration data" table.

With this table registration processing, the IC card 2 application (AID=12) is validated as an IC card application capable of payment processing by UWB communication.

(5-(2) Processing Sequence of Notifying Payment Terminal of UWB-Compatible IC Card Application by User Terminal)

Next, (2) processing sequence of notifying payment terminal of UWB-compatible IC card application by user terminal will be described.

A notification processing sequence of a UWB-compatible IC card application from the user terminal to the payment terminal will be described with reference to FIGS. 11 to 13.

Figure 11:
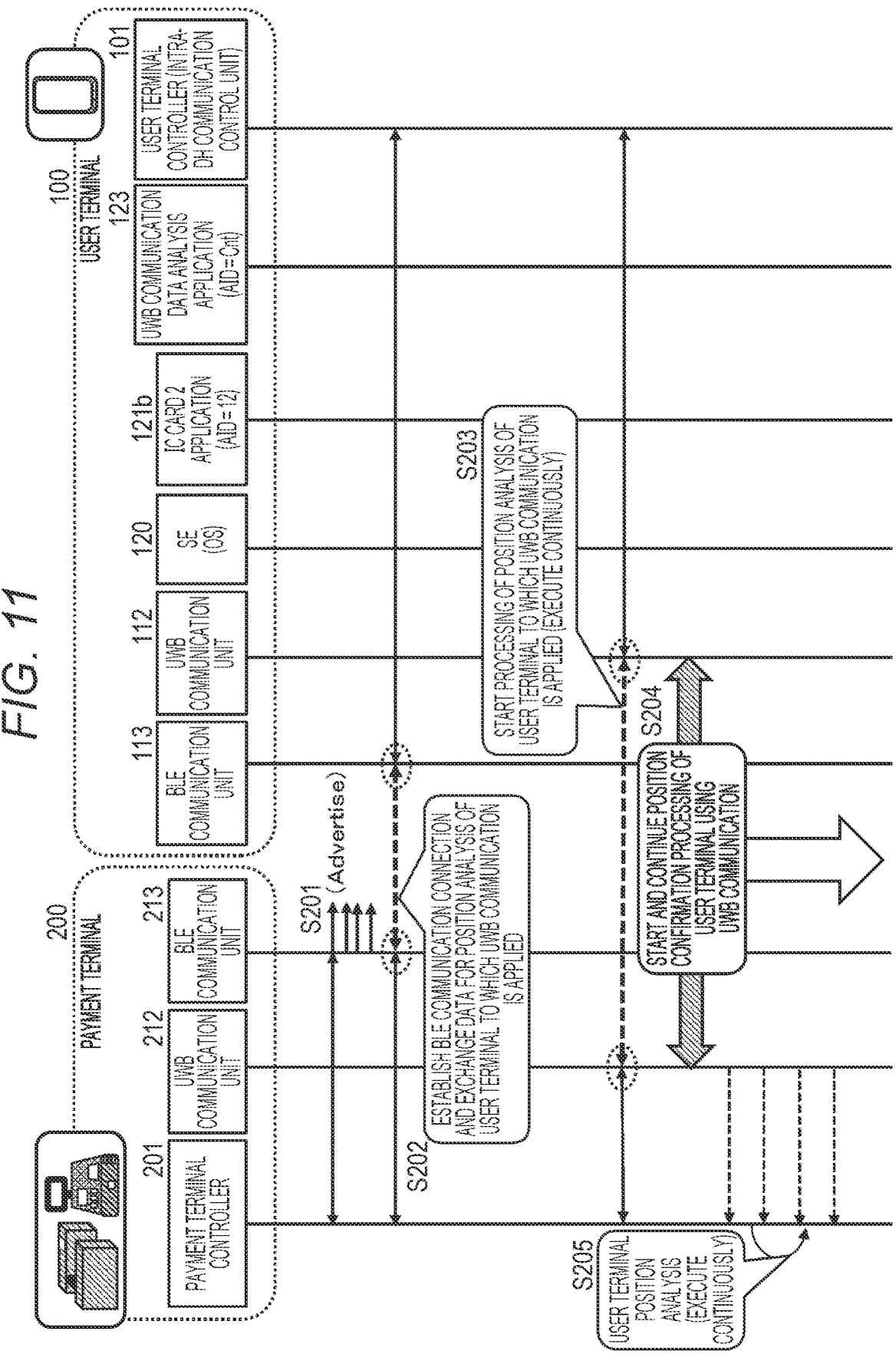
FIG. 11 is a sequence diagram illustrating a processing sequence of processing executed by the user terminal of the present disclosure.
Figure 12:
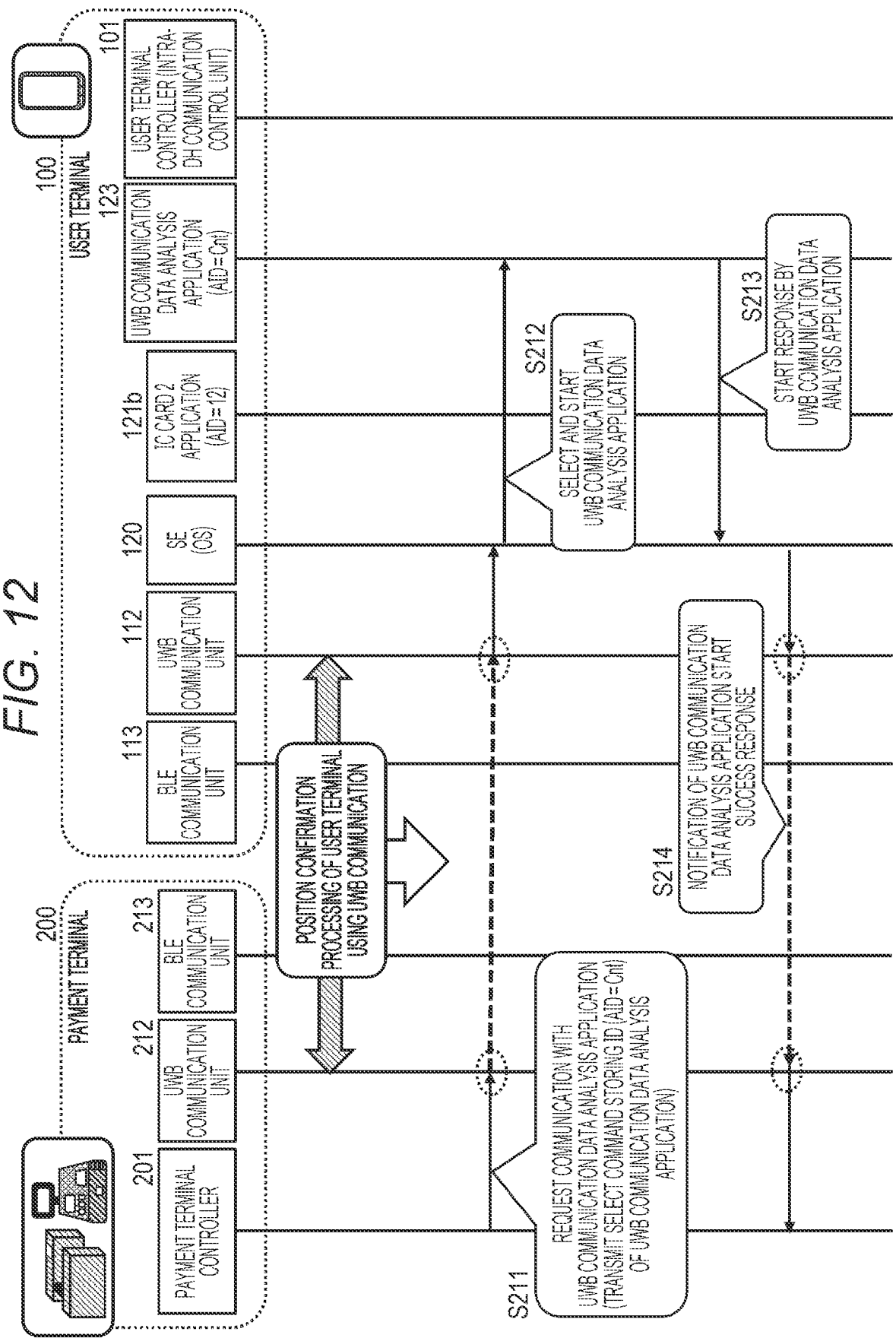
FIG. 12 is a sequence diagram illustrating a processing sequence of processing executed by the user terminal of the present disclosure.
Figure 13:
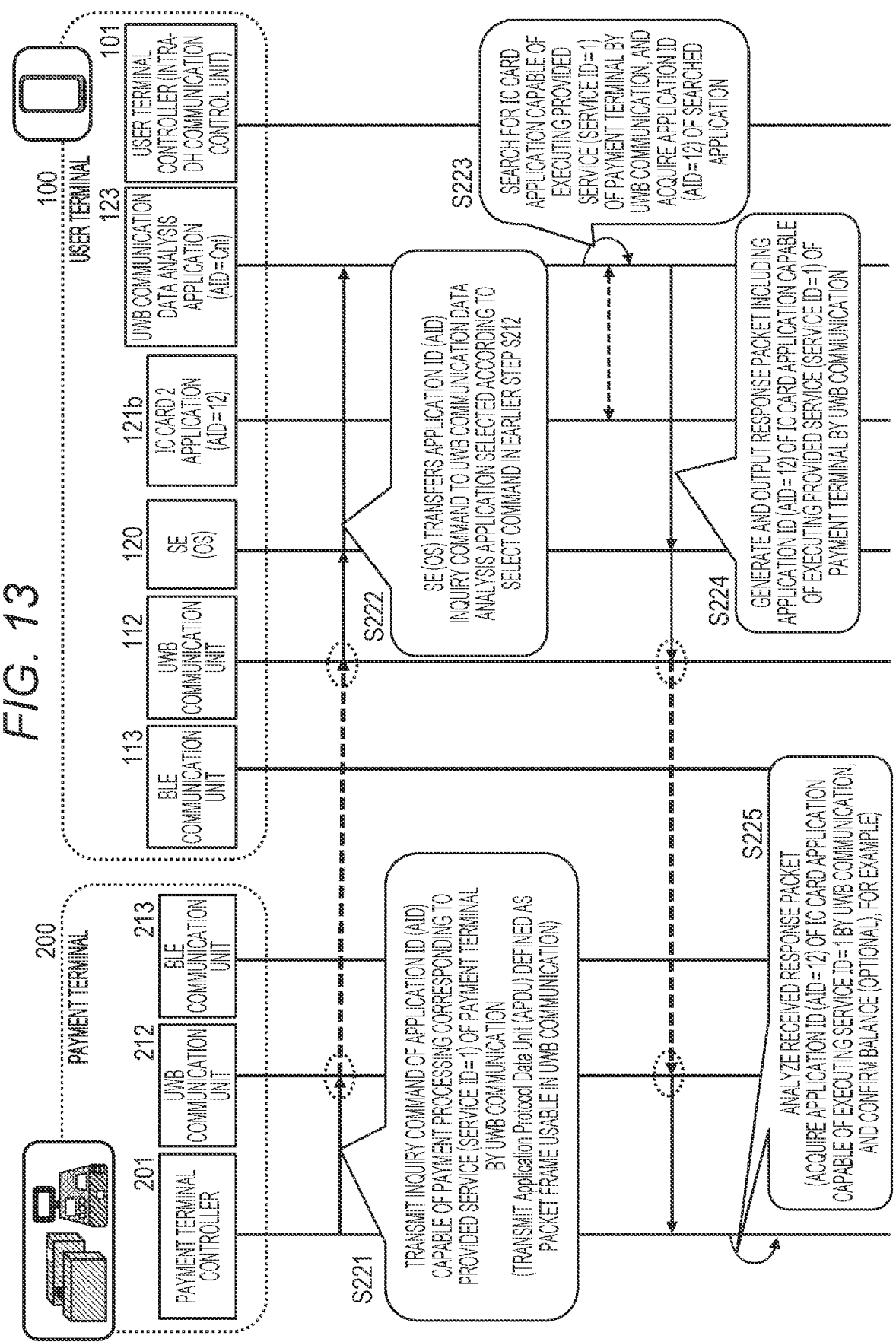
FIG. 13 is a sequence diagram illustrating a processing sequence of processing executed by the user terminal of the present disclosure.

FIGS. 11 to 13 illustrate the payment terminal 200 at the left end and the user terminal 100 on the right side.

As components of the payment terminal 200, from the left, the components of the payment terminal controller 201,
the UWB communication unit 212, and
the BLE communication unit 213 are illustrated.

On the other hand, as components of the user terminal 100, from the left, the BLE communication unit 113,
the UWB communication unit 112,
the secure element (SE-OS) 120,
the IC card 2 application (AID=12) 121*b*,
the UWB communication data analysis application (intra-SE communication control unit) 123, and
the user terminal controller (intra-DH communication control unit) 101 are illustrated.

Details of the processing of step S201 and subsequent steps illustrated in FIGS. 11 to 13 will be sequentially described.

(Step S201)

First, in step S201, the payment terminal controller 201 of the payment terminal 200 broadcasts an advertise packet, which is a user terminal detection and BLE communication connection establishment request packet, from the BLE communication unit 213.

As described above, in the BLE communication standard, an ADV_IND packet (general advertising indication packet) is defined as a broadcast packet for device detection.

In step S201, the payment terminal 200 broadcasts an advertise packet from the BLE communication unit 213.

(Step S202)

When receiving the advertise packet transmitted by the payment terminal 200, the user terminal 100 that has entered the BLE communicable area (e.g., several tens of meters) transmits a response packet including a user terminal identifier to the payment terminal 200 in step S202. The payment terminal 200 detects the user terminal 100 by acquiring the user terminal identifier from the response packet transmitted from the user terminal 100.

When the user terminal is detected, the payment terminal 200 performs processing of acquiring user terminal position analysis data from the user terminal 100 in order to start position identification processing of the user terminal 100 next.

As described above, the payment terminal controller 201 of the payment terminal 200 uses ultra wide band (UWB) communication to perform the position identification processing of the user terminal 100.

(Steps S203 to S205)

Next, in step S203, the payment terminal controller 201 of the payment terminal 200 starts user terminal position identification processing to which UWB communication is applied with the UWB communication unit 112 of the user terminal 100 via the UWB communication unit 212.

As described above, UWB communication defines a "secure ranging" method for analyzing a device position while maintaining security. "Secure ranging" is a technology that enables secure measurement of a distance and an angle between communication devices by transmitting and receiving encrypted data using a common key.

When detecting the user terminal by BLE communication in steps S201 and S202, the payment terminal 200 outputs a UWB communication signal for identifying the position of the detected user terminal 100 in step S203, establishes communication between the UWB communication unit 212 of the payment terminal 200 and the UWB communication unit 112 of the user terminal 100, starts the position identification processing of the user terminal 100, and then continuously executes the user terminal position identification processing.

Note that, as described above, the UWB communication unit 212 of the payment terminal 200 performs data analysis of time of arrival (ToA) and angle of arrival (AoA) in secure ranging by UWB communication.

Time of arrival (ToA) corresponds to a transmission/reception time of a UWB signal, and the payment terminal controller 201 of the payment terminal 200 analyzes the distance from the payment terminal 200 to the user terminal 100 on the basis of the time.

Angle of arrival (AoA) is angle information input from a transmission signal of the user terminal 100 to the payment terminal 200. The payment terminal controller 201 of the payment terminal 200 analyzes the direction of the user terminal 100 on the basis of this angle.

The payment terminal controller 201 of the payment terminal 200 identifies the position of the user terminal 100 by analyzing the ToA and the AoA.

Note that the payment terminal controller 201 of the payment terminal 200 continuously executes the user terminal position identification processing after the detection of the user terminal 100 until the payment processing is started or ended, such as until the user passes through the ticket gate where the payment terminal 200 is installed.

In parallel with execution of secure ranging by UWB communication, the payment terminal controller 201 of the payment terminal 200 executes selection of the IC card application and communication with the IC card application by UWB communication to perform payment processing and the like.

(Step S211)

Next, processing in step S211 illustrated in FIG. 12 will be described.

In step S211, the payment terminal controller 201 of the payment terminal 200 outputs a communication request packet to communicate with the UWB communication data analysis application (intra-SE communication control unit) 123 of the user terminal 100 by UWB communication via the UWB communication unit 212.

This communication request packet is a UWB communication packet storing a SELECT command in which the application ID (AID=Cnt) of the UWB communication data analysis application (intra-SE communication control unit) 123 is recorded. Note that a SELECT command is a command defined by ISO 7816-4, and is a command that stores an application ID (AID) of a communication request target application in a packet and requests a designated application as a communication partner.

(Step S212)

When receiving the SELECT command packet transmitted from the payment terminal 200 in step S211, the UWB communication unit 112 of the user terminal 100 passes the received packet to the secure element (SE-OS) 120.

The secure element (SE-OS) 120 recognizes the SELECT command in the packet and acquires the application ID (AID=Cnt) of the communication request target application stored in the packet.

The AID is an application ID (AID=Cnt) of the UWB communication data analysis application (intra-SE communication control unit) 123.

The secure element (SE-OS) 120 selects and starts an application corresponding to the AID=Cnt, that is, the UWB communication data analysis application (intra-SE communication control unit) 123.

(Step S213)

The UWB communication data analysis application (intra-SE communication control unit) 123 started by the application selection and start processing by the secure element (SE-OS) 120 in step S212 outputs a start response indicating the start to the secure element (SE-OS) 120 in step S213.

(Step S214)

In step S214, the secure element (SE-OS) 120 that has received the start response from the UWB communication data analysis application (intra-SE communication control unit) 123 notifies the payment terminal 200 via the UWB communication unit 112 that the start processing of the UWB communication data analysis application (intra-SE communication control unit) 123 has succeeded.

This notification data is input to the payment terminal controller 201 via the UWB communication unit 212 of the payment terminal 200, and the payment terminal controller 201 confirms that UWB communication with the UWB communication data analysis application (intra-SE communication control unit) 123 of the user terminal 100 is enabled.

(Step S221)

When the payment terminal controller 201 confirms that UWB communication with the UWB communication data analysis application (intra-SE communication control unit) 123 of the user terminal 100 has been enabled, the payment terminal controller 201 performs the following processing in step S221.

The payment terminal controller 201 transmits an inquiry command of the IC card application ID (AID) to the user terminal 100 via the UWB communication unit 212.

In other words, a command for inquiring an application ID (AID) capable of executing payment processing corresponding to provided service (service ID=1) of the payment terminal 200 by UWB communication is transmitted.

Note that the AID inquiry command of the IC card application is transmitted using an application protocol data unit (APDU) defined as a packet frame usable in UWB communication.

The APDU is a packet frame configuration defined in ISO 7816-4, and is a packet frame configuration usable in UWB communication.

(Step S222)

In step S222, the UWB communication unit 112 of the user terminal 100 receives the IC card application ID (AID) inquiry command transmitted by the payment terminal 200, and inputs the received command to the UWB communication data analysis application (intra-SE communication control unit) 123 via the secure element OS (SE-OS) 120.

The secure element OS (SE-OS) 120 inputs an IC card application ID (AID) inquiry command to the started UWB communication data analysis application (intra-SE communication control unit) 123 according to the application ID (AID=Cnt) in the SELECT command received from the payment terminal 200 in step S211.

(Step S223)

The UWB communication data analysis application (intra-SE communication control unit) 123 that has received the IC card application ID (AID) inquiry command transmitted by the payment terminal 200 executes the following processing in step S223.

The UWB communication data analysis application (intra-SE communication control unit) 123 searches for an IC card application capable of executing a provided service (service ID=1) of the payment terminal 200 by UWB communication, and acquires an application ID (AID=12) of the searched application.

For example, the application ID (AID) of the IC card application capable of executing the provided service (service ID=1) of the payment terminal 200 by UWB communication is searched with reference to the UWB-compatible application registration data described above with reference to FIG. 8.

In the example illustrated in FIG. 8, the application ID (AID) of the IC card application capable of executing the service ID=1 by UWB communication is AID=12, and the UWB communication data analysis application (intra-SE communication control unit) 123 acquires this application ID (AID=12).

(Step S224)

Next, in step S224, the UWB communication data analysis application (intra-SE communication control unit) 123 generates a response packet storing the application ID (AID=12) acquired in step S223, and transmits the response packet to the payment terminal 200.

The response packet is transmitted from the UWB communication data analysis application (intra-SE communication control unit) 123 via the secure element OS (SE-OS) 120 and the UWB communication unit 112, received by the UWB communication unit 212 of the payment terminal 200, and input to the payment terminal controller 201.

Figure 14:
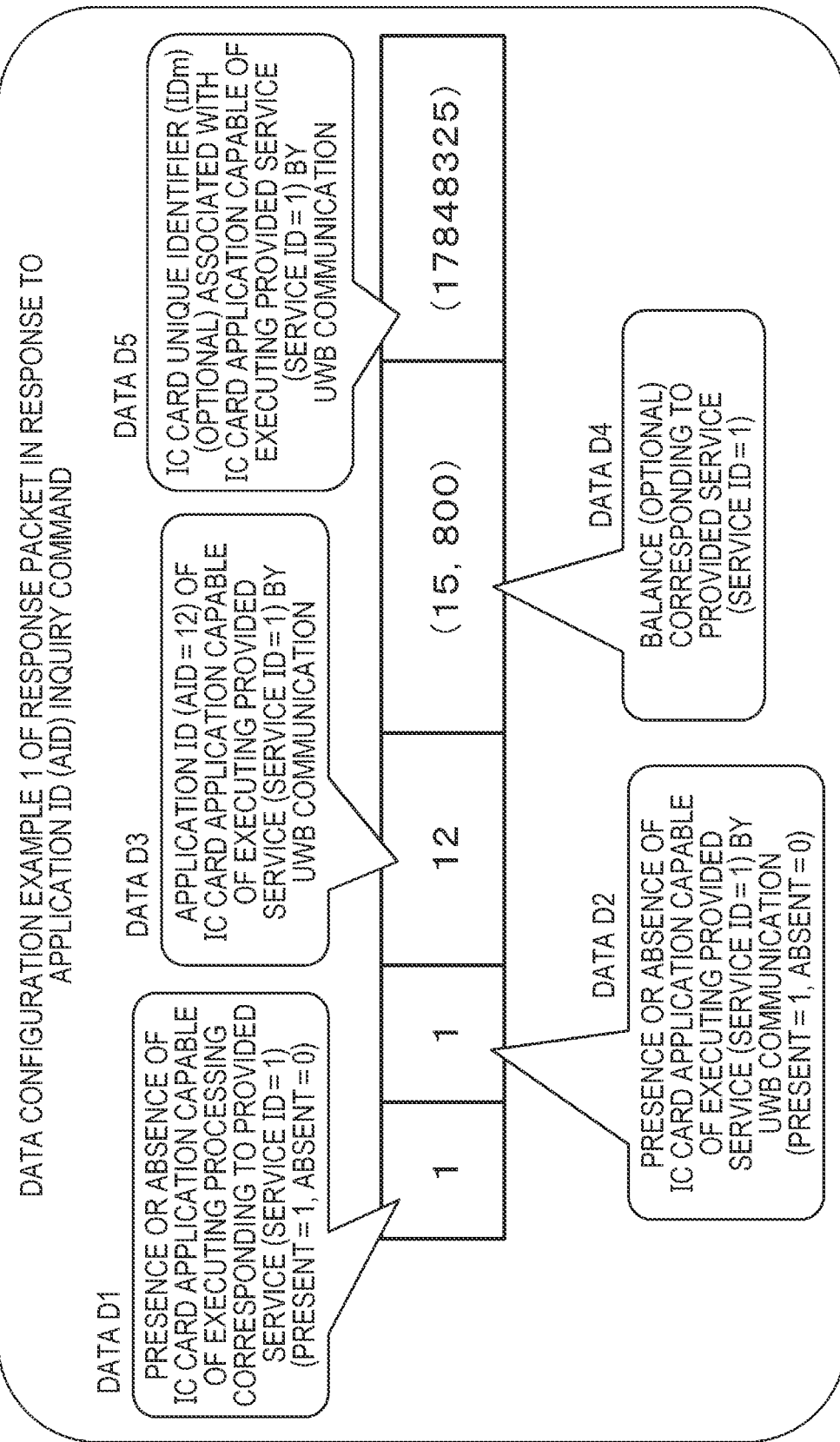
FIG. 14 is a diagram illustrating a data configuration example of a response packet transmitted from the user terminal of the present disclosure to the payment terminal.

FIG. 14 illustrates an example of a data configuration of a response packet generated by the UWB communication data analysis application (intra-SE communication control unit) 123 of the user terminal 100 in response to an IC card application ID (AID) inquiry command from the payment terminal 200.

As illustrated in FIG. 14, the response packet is configured as, for example, a packet storing the following data.

(Data D1) Presence or absence of an IC card application capable of executing processing corresponding to a service (service ID=1) provided by the payment terminal 200 (present=1, absent=0)

(Data D2) Presence or absence of an IC card application capable of executing the provided service (service ID=1) of the payment terminal 200 by UWB communication (present=1, absent=0)

(Data D3) An application ID (AID=12) of an IC card application capable of executing the provided service (service ID=1) of the payment terminal 200 by UWB communication.

(Data D4) Balance (optional) corresponding to the service (service ID=1) provided by the payment terminal 200

(Data D5) An IC card unique identifier (IDm) (optional) associated with an IC card application capable of executing the provided service (service ID=1) of the payment terminal 200 by UWB communication (Data D1) is data indicating the presence or absence of an IC card application capable of executing processing corresponding to the provided service (service ID=1) of the payment terminal 200 regardless of whether it is executed by UWB communication, and one of values of present=1 and absent=0 is set.

(Data D2) is data indicating the presence or absence of an IC card application capable of executing the provided service (service ID=1) of the payment terminal 200 by UWB communication, and one of values of present=1 and absent=0 is set.

In (Data D3), an application ID of an IC card application capable of executing the provided service (service ID=1) of the payment terminal 200 by UWB communication is recorded. In this example, an application ID (AID=12) is recorded.

(Data D4) and (Data D5) are optional data and are not essential.

(Data D4) is the balance corresponding to the provided service (service ID=1) of the payment terminal 200.

(Data D5) is an IC card unique identifier (IDm) associated with an IC card application capable of executing the provided service (service ID=1) of the payment terminal 200 by UWB communication.

Note that an IC card unique identifier (IDm) is a unique identifier of the IC card application installed in the user terminal 100, and is an identifier different for each application installed in the user terminal even for applications of the same type.

On the other hand, an application ID (AID) is an ID set according to the type of application, and the same ID (AID) is set in a case where applications are of the same type even if the user terminals 100 are different.

Balance information of (Data D4), that is, the balance corresponding to the provided service (service ID=1) of the payment terminal 200 is recorded in the secure memory in the secure element (SE) 200, and the UWB communication data analysis application (intra-SE communication control unit) 123 reads the balance from the secure memory and records the balance in a response packet.

As the IC card unique identifier (IDm) of (Data D5), that is, the IC card unique identifier (IDm) associated with the IC card application capable of executing the provided service (service ID=1) of the payment terminal 200 by UWB communication, the UWB communication data analysis application (intra-SE communication control unit) 123 reads attribute information of the IC card application of AID=12 in the IC card application group 121 of the secure memory 200 and records the attribute information in a response packet.

The data example of a response packet illustrated in FIG. 14 is an example of a response packet in a case where the user terminal 100 has an IC card application capable of executing the provided service (service ID=1) of the payment terminal 200 by UWB communication.

A response packet in a case where the user terminal 100 does not have an IC card application capable of executing the provided service (service ID=1) of the payment terminal 200 by UWB communication has a different data configuration.

A data configuration example of a response packet in a case where the user terminal 100 does not have an IC card application capable of executing the provided service (service ID=1) of the payment terminal 200 by UWB communication will be described with reference to FIGS. 15 and 16.

Figure 15:
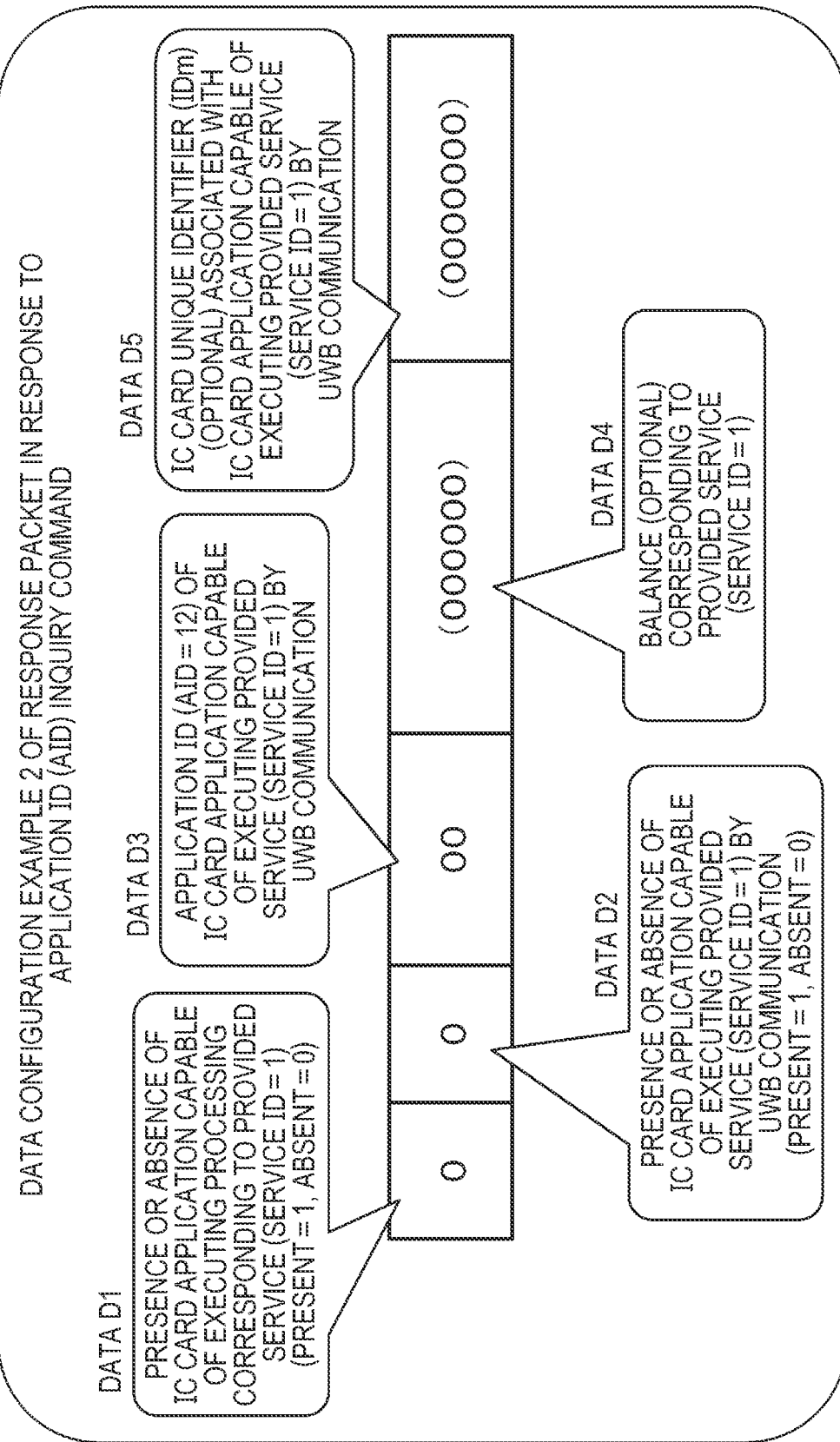
FIG. 15 is a diagram illustrating a data configuration example of a response packet transmitted from the user terminal of the present disclosure to the payment terminal.

FIG. 15 illustrates a data configuration example of a response packet in a case where there is no IC card application capable of executing the provided service (service ID=1) of the payment terminal 200 regardless of whether it is executed by UWB communication.

Figure 16:
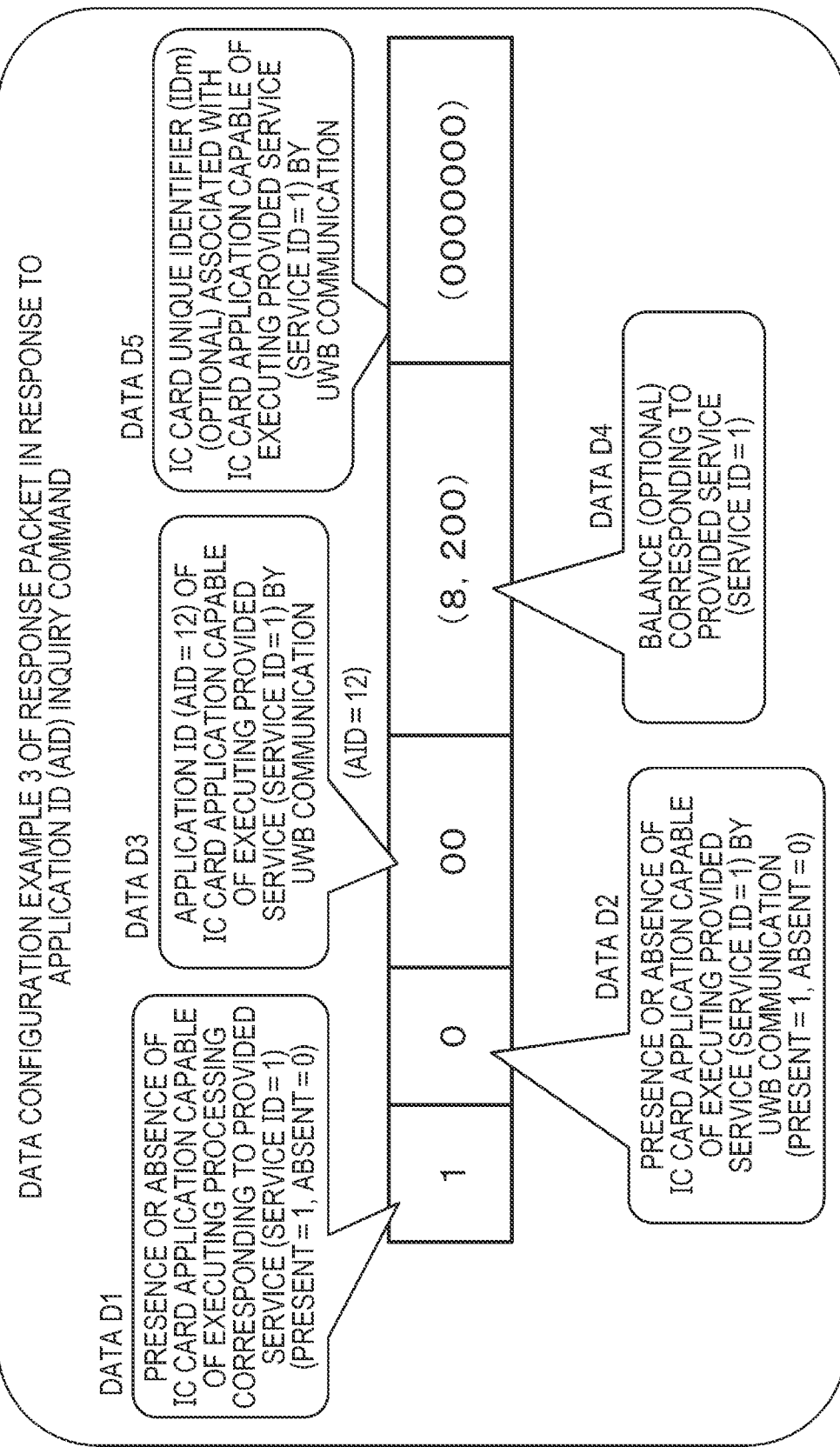
FIG. 16 is a diagram illustrating a data configuration example of a response packet transmitted from the user terminal of the present disclosure to the payment terminal.

FIG. 16 illustrates a data configuration example of a response packet in a case where there is no IC card application capable of executing the provided service (service ID=1) of the payment terminal 200 by UWB communication, but there is an IC card application capable of executing the service by another type of communication, such as NFC communication.

The packet example illustrated in FIG. 15 indicates that (Data D1)=0 and that there is no IC card application capable of executing the provided service (service ID=1) of the payment terminal 200 regardless of whether it is executed by UWB communication.

In this packet, 0 is set to all of the Data D1 to D5.

On the other hand, the packet example illustrated in FIG. 16 indicates that (Data D1)=1 and (Data D2)=0, and that there is no IC card application capable of executing the provided service (service ID=1) of the payment terminal 200 by UWB communication, but there is an IC card application capable of executing the service by another type of communication, such as NFC communication.

In this case, the AID and the IDm are not recorded in (Data D3) which is a setting part of the AID of the UWB communication-compatible IC card application and (Data D5) which is a setting part of the IC card unique identifier (IDm).

(Data D4)=[0] is also recorded in the balance corresponding to the provided service (service ID=1) of the payment terminal 200. Alternatively, for example, the balance of the NFC-compatible IC card application may be recorded.

As described above, in step S224, the UWB communication data analysis application (intra-SE communication control unit) 123 generates a response packet storing the application ID (AID=12) acquired in step S223, and transmits the response packet to the payment terminal 200.

In a case where the user terminal 100 has an IC card application capable of executing the provided service (service ID=1) of the payment terminal 200 by UWB communication, the response packet illustrated in FIG. 14 is generated, and in a case where the user terminal 100 does not have such an IC card application, the response packet illustrated in FIG. 15 or 16 is generated and transmitted to the payment terminal 200.

(Step S225)

In step S225, the payment terminal controller 201 of the payment terminal 200 that has received the response packet from the user terminal 100 executes analysis processing of the received response packet. Specifically, processing of acquiring an application ID (AID=12) of an IC card application capable of executing the service ID=1 by UWB communication is executed.

Note that in a case where balance information is recorded in the response packet, balance confirmation processing or the like is also executed.

(5-(3) Processing Sequence of Payment by UWB Communication Between UWB-Compatible IC Card Application of User Terminal and Payment Terminal)

Next, (3) processing sequence of payment by UWB communication between UWB-compatible IC card application of user terminal and payment terminal will be described.

A payment processing sequence by UWB communication between the UWB-compatible IC card application of the user terminal and the payment terminal will be described with reference to FIGS. 17 and 18.

Figure 17:
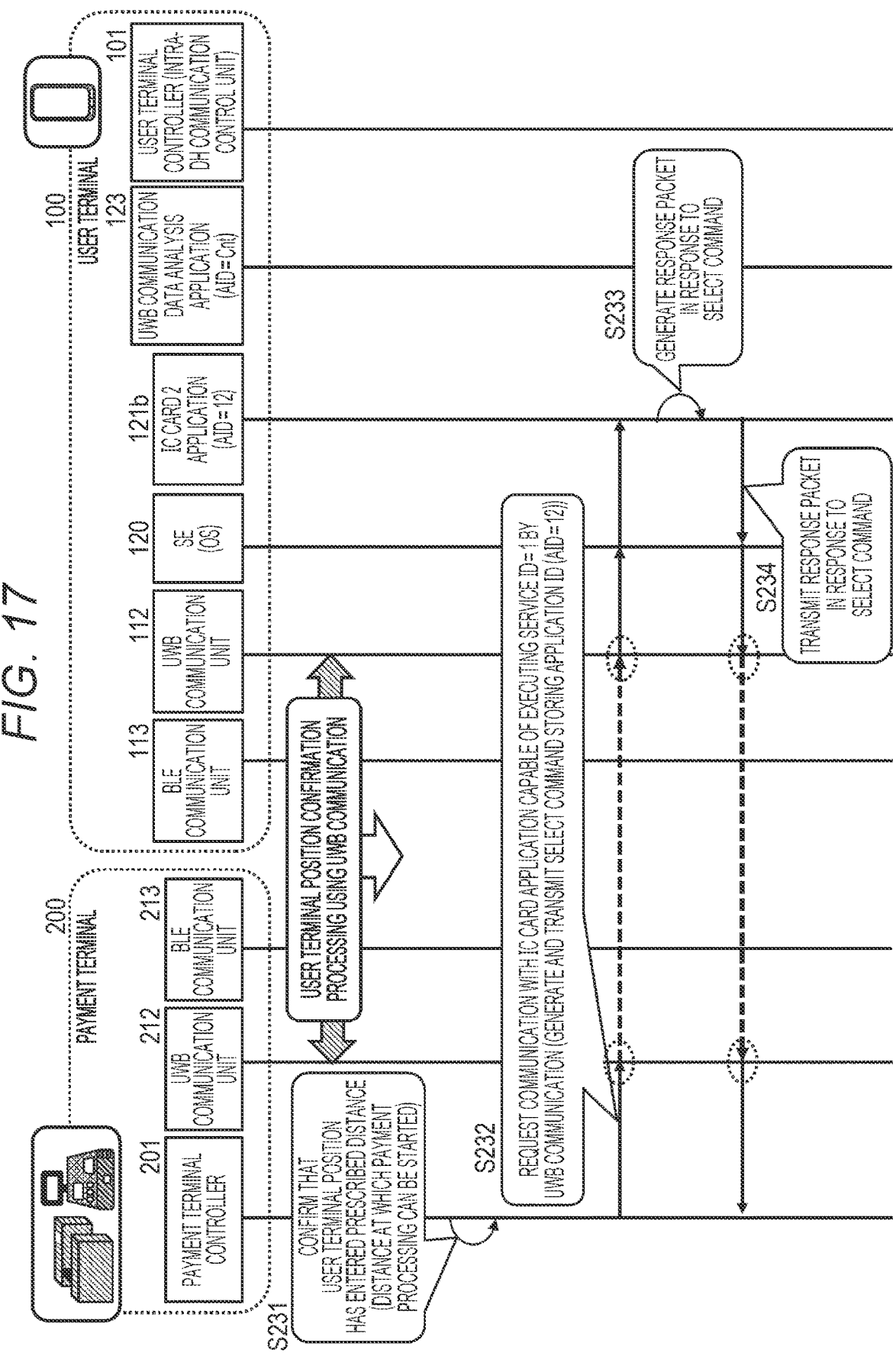
FIG. 17 is a sequence diagram illustrating a processing sequence of processing executed by the user terminal of the present disclosure.
Figure 18:
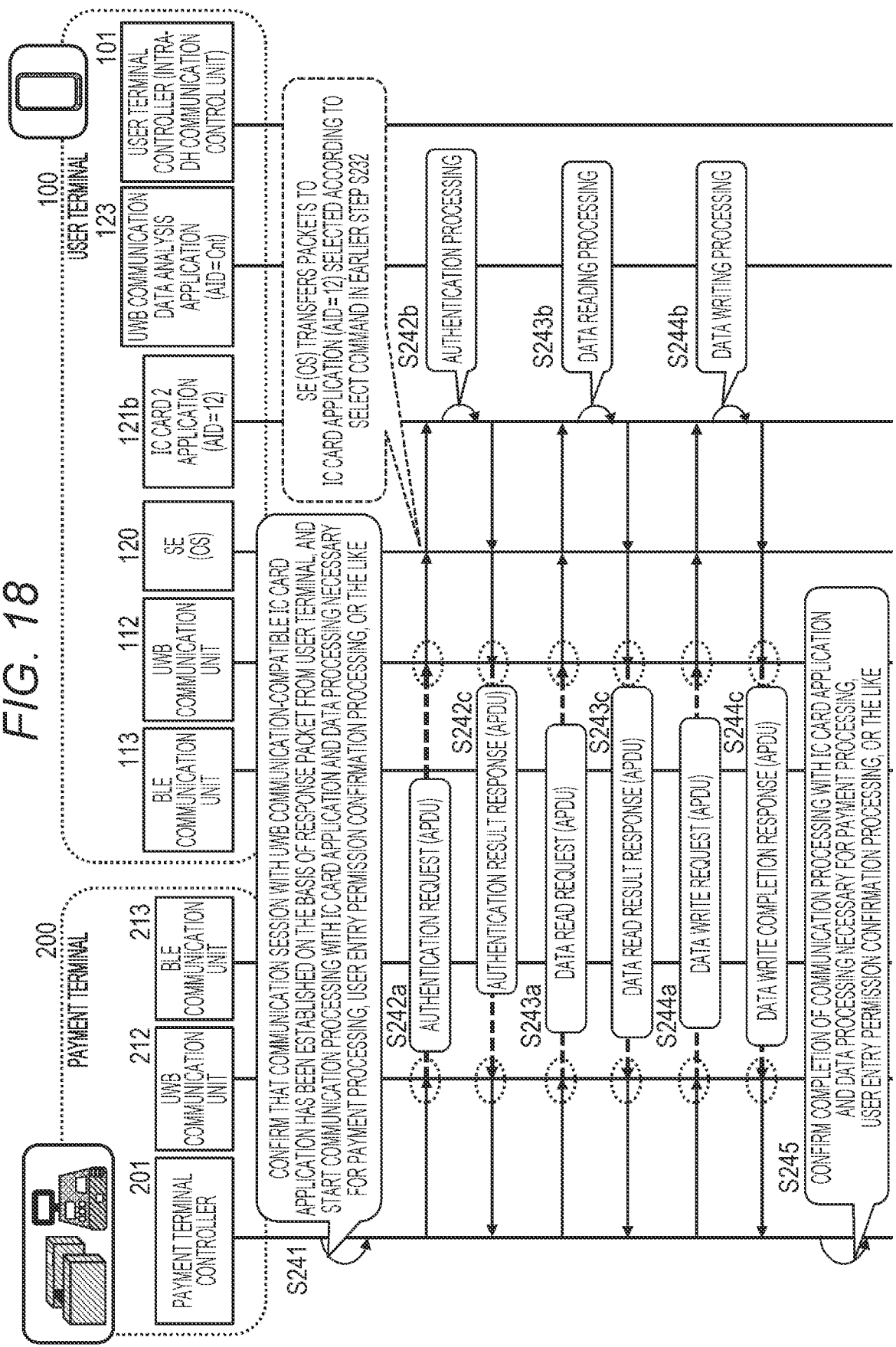
FIG. 18 is a sequence diagram illustrating a processing sequence of processing executed by the user terminal of the present disclosure.

FIGS. 17 and 18 illustrate the payment terminal 200 at the left end and the user terminal 100 on the right side.

As components of the payment terminal 200, from the left, the components of the payment terminal controller 201,
the UWB communication unit 212, and
the BLE communication unit 213 are illustrated.

On the other hand, as components of the user terminal 100, from the left, the BLE communication unit 113,
the UWB communication unit 112,
the secure element (SE-OS) 120,
the IC card 2 application (AID=12) 121*b*,
the UWB communication data analysis application (intra-SE communication control unit) 123, and
the user terminal controller (intra-DH communication control unit) 101 are illustrated.

Details of the processing of step S231 and subsequent steps illustrated in FIGS. 17 and 18 will be sequentially described.

Note that at the start of step S231, the payment terminal 200 and the user terminal 100 have established a UWB communication session, and the payment terminal 200 is continuing the user terminal position confirmation processing to which UWB communication is applied.

(Step S231)

First, in step S231, the payment terminal controller 201 of the payment terminal 200 refers to the result of user terminal position confirmation by UWB communication to confirm whether or not the user terminal 100 has entered a prescribed distance defined in advance, such as the inside of a ticket gate, and upon confirmation, the processing of step S232 and subsequent steps (payment processing) is started.
(Step S232)

When it is confirmed that the user terminal 100 has entered a prescribed distance defined in advance, such as the inside of a ticket gate, in step S232, the payment terminal controller 201 of the payment terminal 200 first transmits a request for communication with the IC card application capable of executing the service ID=1 by UWB communication to the user terminal 100 via the UWB communication unit 212.

Specifically, a SELECT command storing an application ID (AID=12) is generated and transmitted.
(Step S233)

When receiving the SELECT command packet transmitted from the payment terminal 200 in step S232, the UWB communication unit 112 of the user terminal 100 passes the received packet to the secure element (SE-OS) 120.

The secure element (SE-OS) 120 recognizes the SELECT command in the packet and acquires the application ID (AID=12) of the communication request target application stored in the packet.

This AID is the AID of the UWB communication-compatible IC card application acquired by the UWB communication data analysis application of the user terminal 100 and of which the payment terminal 200 is notified in steps S223 and S224 described above.

The secure element (SE-OS) 120 selectively starts an application corresponding to the AID=12, that is, the UWB communication-compatible IC card application (IC card 2 application (AID=12) 121*b*).
(Steps S233 and S234)

The IC card 2 application (AID=12) 121*b* started by the application selection and start processing by the secure element (SE-OS) 120 in step S232 generates a start response packet indicating that the IC card 2 application itself has been started in step S233, and transmits the start response packet to the payment terminal 200 via the secure element (SE-OS) 120 and the UWB communication unit 112 in step S234.

This transmission data is input to the payment terminal controller 201 via the UWB communication unit 212 of the payment terminal 200, and the payment terminal controller 201 confirms that UWB communication with the IC card 2 application (AID=12) 121*b* of the user terminal 100 has been enabled.
(Step S241)

In step S241, the payment terminal controller 201 of the payment terminal 200 confirms that a communication session with the UWB communication-compatible IC card application has been established on the basis of the response packet from the user terminal 100, and starts communication processing with the IC card application and data processing necessary for payment processing, user entry permission confirmation processing, or the like.
(Steps S242 to S244)

The processing of steps S242 to S244 is a sequence of authentication and payment processing to which the UWB communication between the payment terminal controller 201 of the payment terminal 200 and the UWB communication-compatible IC card 2 application (AID=12) of the user terminal 100 is applied.

For example, a series of processing of authentication processing in steps S242*a* to S242*c*, data reading processing from the user terminal 100 in steps S243*a* to S243*c*, and data writing processing to the user terminal 100 in steps S244*a* to S244*c* is performed.

Note that the series of processing is executed using UWB communication. For example, transmission is performed using an application protocol data unit (APDU) defined as a packet frame usable in UWB communication. As described above, the APDU is a packet frame configuration defined in ISO 7816-4 and is a packet frame configuration usable in UWB communication.

In the data reading processing from the user terminal 100 in steps S243*a* to S243*c*, for example, balance information corresponding to the IC card 2 application (AID=12) 121*b* is read from the secure memory in the secure element 120 of the user terminal 100.

In the data writing processing to the user terminal 100 in steps S244*a* to S244*c*, for example, processing of updating balance information corresponding to the IC card 2 application (AID=12) 121*b* of the secure memory in the secure element 120 of the user terminal 100, that is, processing of writing an updated amount obtained by subtracting the payment amount is executed.
(Step S245)

When the series of processing in steps S242 to S244 is completed, in step S245, the payment terminal controller 201 of the payment terminal 200 confirms completion of communication processing with the IC card application and data processing necessary for the payment processing, the user entry permission confirmation processing, or the like, and ends the processing.

Note that in the case of a ticket gate, for example, when the series of processing in steps S242 to S244 is completed, processing of opening the door of the gate or the like is executed to allow passage of the user.

An example has been described above in which not only the application ID (AID), but also (IDm), which is a unique identifier of the IC card application, is stored in the packet recording the AID of the UWB communication-compatible IC card application transmitted from the user terminal 100 to the payment terminal 200 as described with reference to FIG. 14 and other drawings.

By notifying the payment terminal 200 of the IC card application unique identifier (IDm), for example, it is possible to reduce a processing load when the UWB communication between the user terminal 100 and the payment terminal 200 is interrupted in the middle of steps S242 to S244 illustrated in FIG. 18.

Hereinafter, a specific example will be described with reference to FIG. 19.

Figure 19:
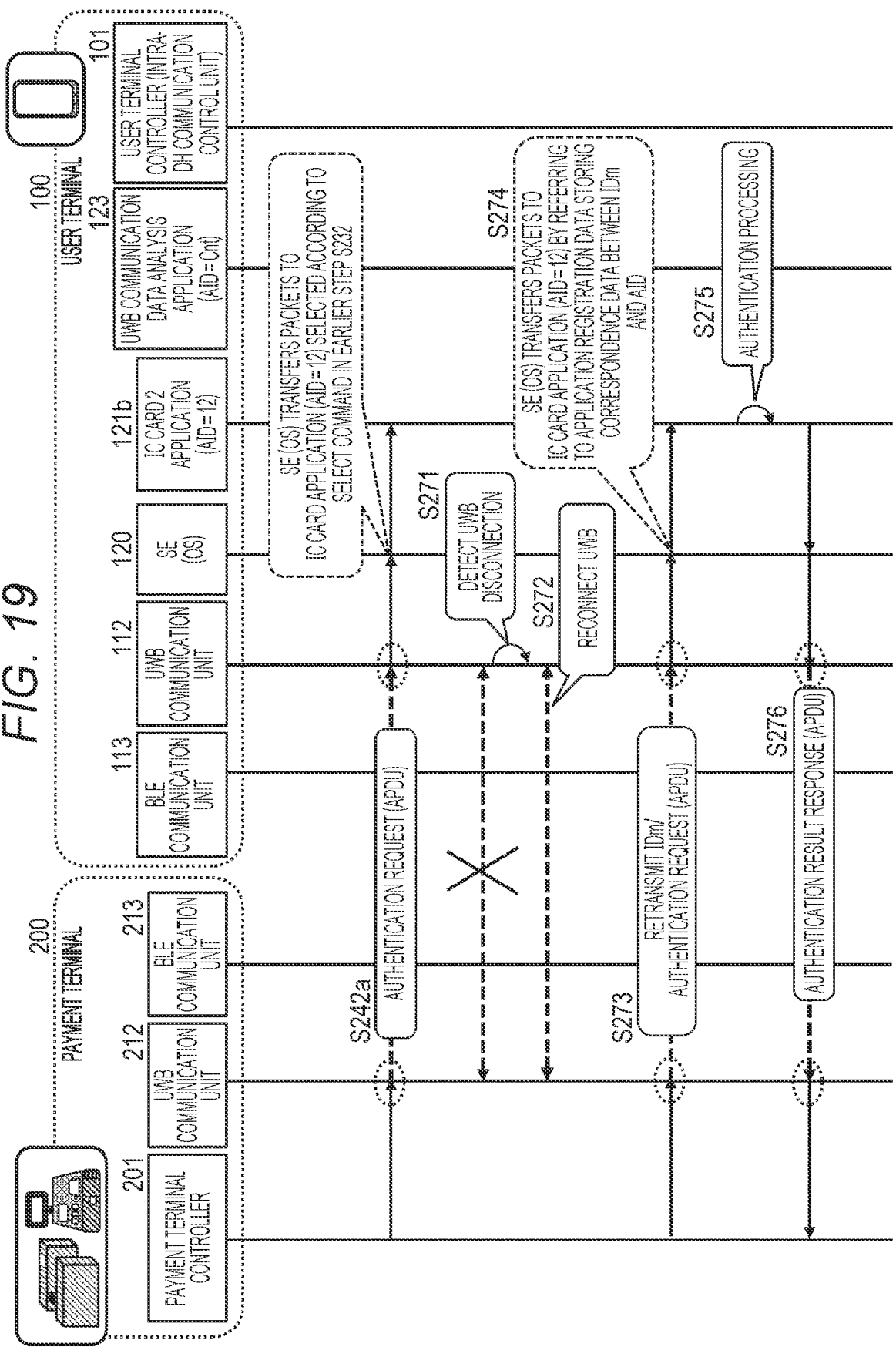
FIG. 19 is a sequence diagram illustrating a processing sequence of processing executed by the user terminal of the present disclosure.

FIG. 19 illustrates processing of step S242*a* and subsequent steps described above with reference to FIG. 18, that is, processing of step S242*a* and subsequent steps which are execution steps of the authentication processing and the payment processing.

Assume that after the payment terminal 200 transmits the authenticated paid packet to the user terminal 100 in step S242*a*, the UWB communication between the payment terminal 200 and the user terminal 100 is interrupted.

In this case, when detecting disconnection of the UWB communication in step S271, the user terminal 100 reconnects the UWB communication with the payment terminal 200 in step S272.

When the UWB communication is reconnected, in step S273, the payment terminal controller 201 of the payment terminal 200 transmits an authentication request storing the IC card application unique identifier (IDm) stored in the response packet received from the user terminal 100 in step S224 described above.

Figure 20:
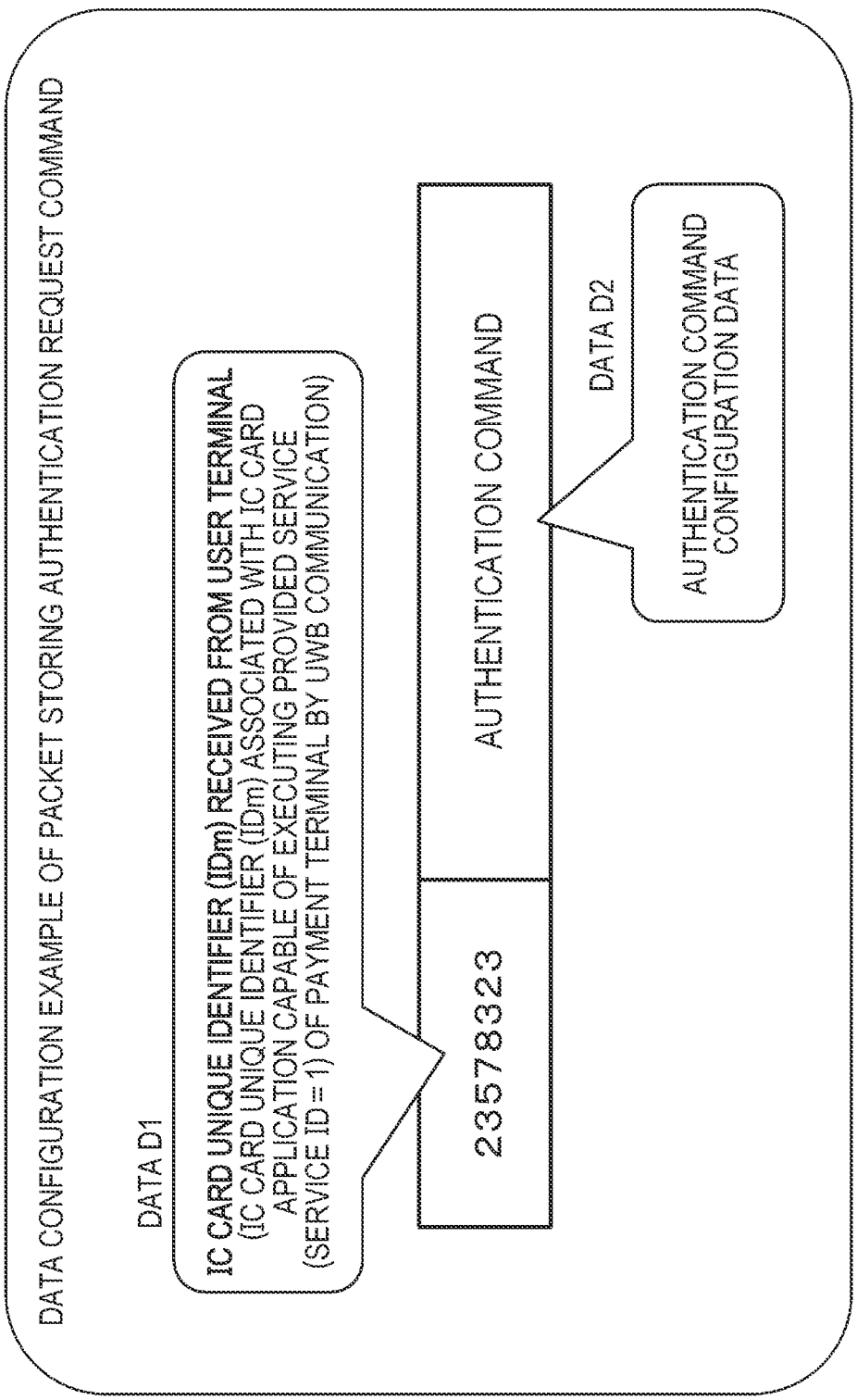
FIG. 20 is a diagram illustrating a data configuration example of a packet that the user terminal of the present disclosure receives from a payment terminal.

For example, a packet (APDU packet) as illustrated in FIG. 20 is transmitted.

As illustrated in FIG. 20, the packet is a packet including an IC card application unique identifier (IDm) and an authentication command.

The UWB communication unit 112 of the user terminal 100 outputs this packet to the secure element OS (SE-OS) 120.

The secure element OS (SE-OS) 120 acquires the IC card application unique identifier (IDm) in the packet, refers to the correspondence data between the IC card application unique identifier (IDm) and the application ID (AID) stored in the memory of the user terminal 100, and acquires an application ID (AID) corresponding to the IC card application unique identifier (IDm) stored in the received packet.

FIG. 21 illustrates a specific example of correspondence data between the IC card application unique identifier (IDm) and the application ID (AID) stored in the memory of the user terminal 100.

As illustrated in FIG. 21, the memory of the user terminal 100 records, for example, IC card application registration data in which a service ID, an IC card application unique identifier (IDm), an application ID (AID), and UWB communication compatibility (compatible=1, non-compatible=0) are associated with each other.

The secure element OS (SE-OS) 120 of the user terminal 100 can acquire an application ID (AID) corresponding to the IC card application unique identifier (IDm) stored in the packet received from the payment terminal 200 with reference to the correspondence data, pass the authentication request retransmitted from the payment terminal 200 to the IC card application having the acquired application ID (AID), and continue the subsequent authentication processing and payment processing.

That is, it is possible to omit processing in which the payment terminal 200 restarts the IC card application by retransmitting the select command storing the IC card application ID (AID) again.

Figure 22:
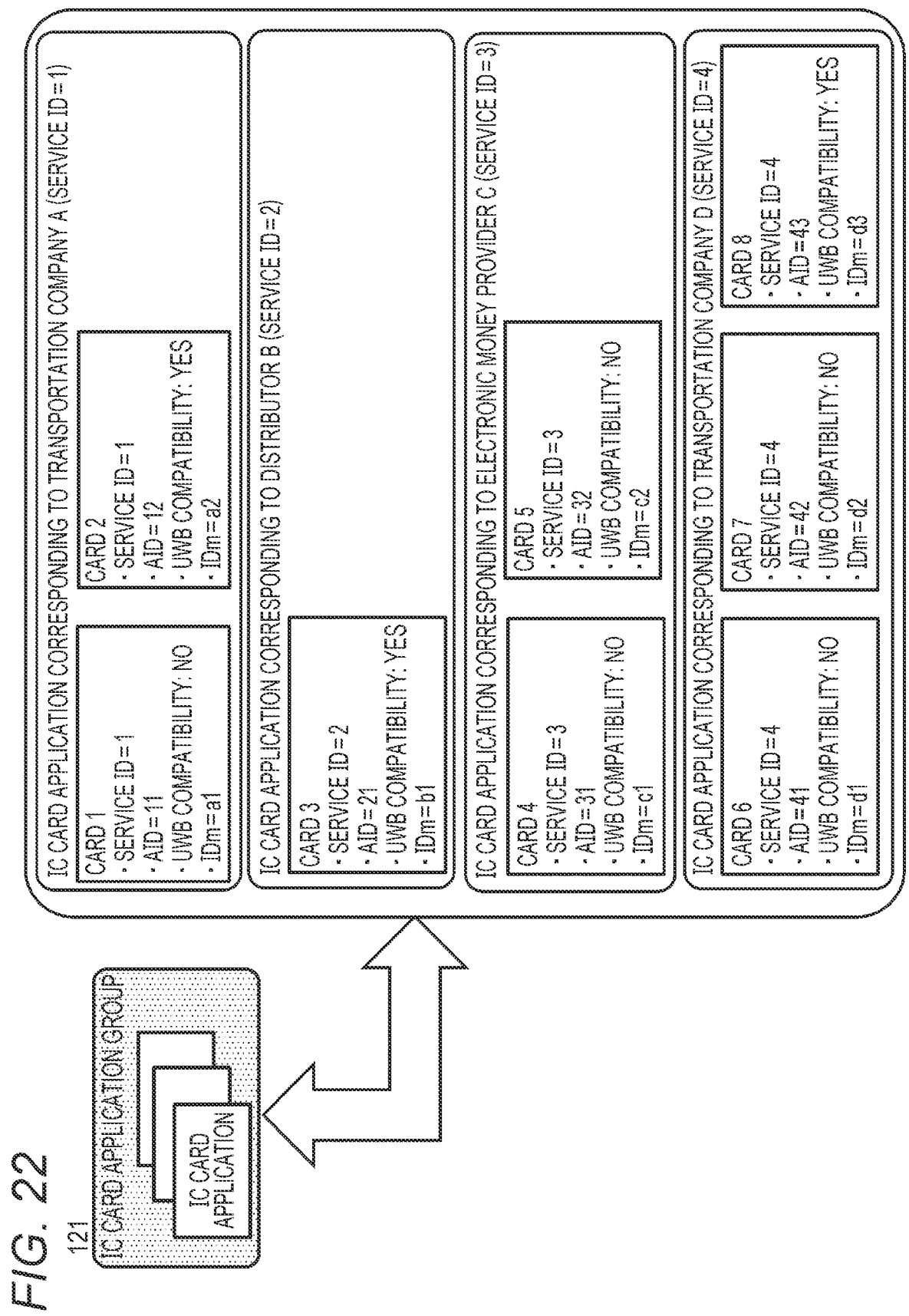
FIG. 22 is a diagram illustrating an example of an IC card application stored in the user terminal of the present disclosure and an example of attribute information of the IC card application.

Note that as illustrated in FIG. 22, the IC card application unique identifier (IDm) is information recorded as attribute information of an IC card application stored in the IC card application group 121 of the secure element (SE) 120 of the user terminal 100.

Next, a sequence of processing executed by the UWB communication data analysis application of the user terminal 100 in response to an inquiry about the application ID (AID) of the UWB communication-compatible IC card application from the payment terminal 200 will be described with reference to a flowchart illustrated in FIG. 23.

Figure 23:
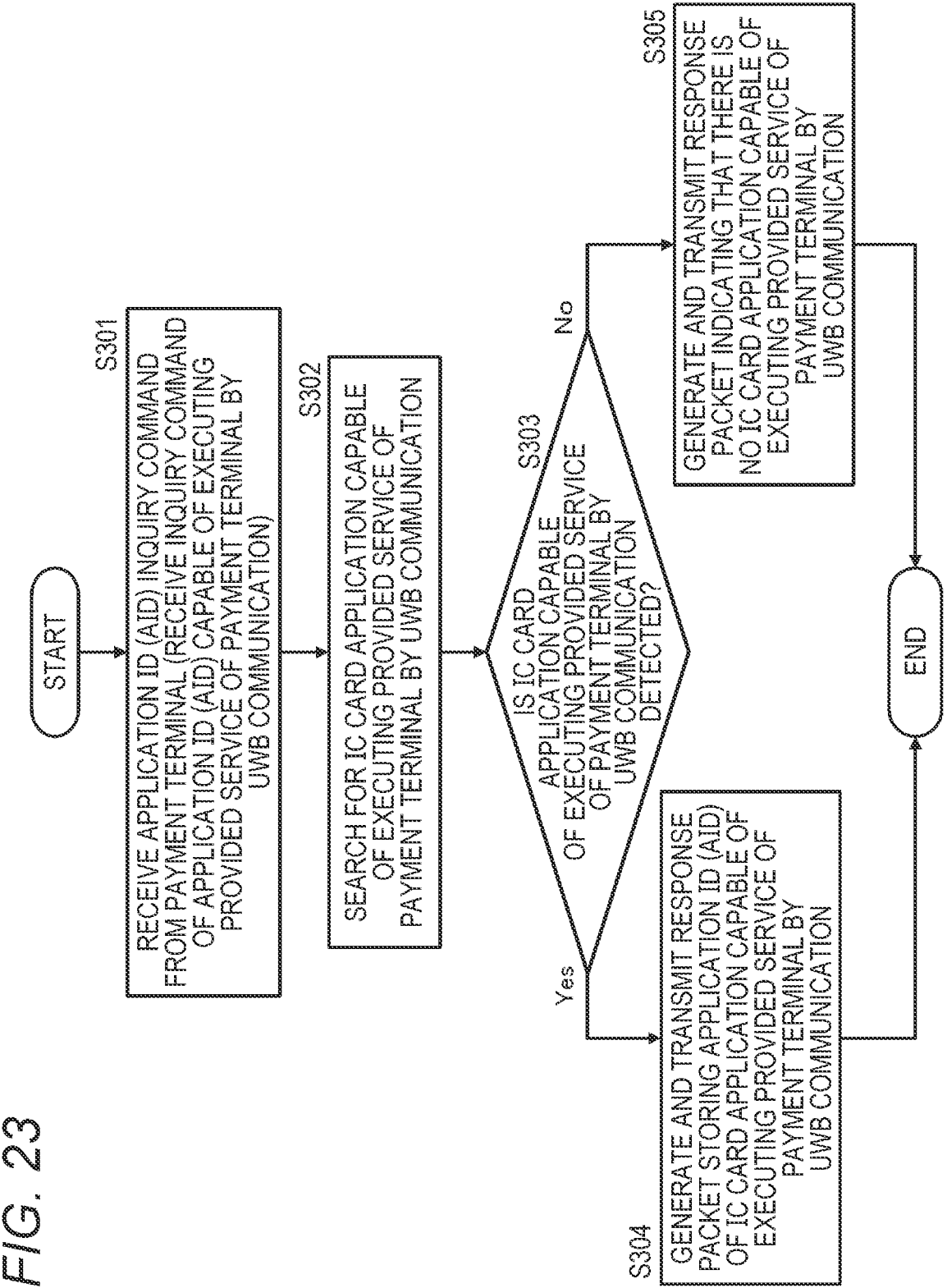
FIG. 23 is a flowchart illustrating a processing sequence of processing executed by the user terminal of the present disclosure.

That is, the flowchart illustrated in FIG. 23 is a detailed sequence of processing executed in steps S222 to S224 illustrated in FIG. 13.

Figure 24:
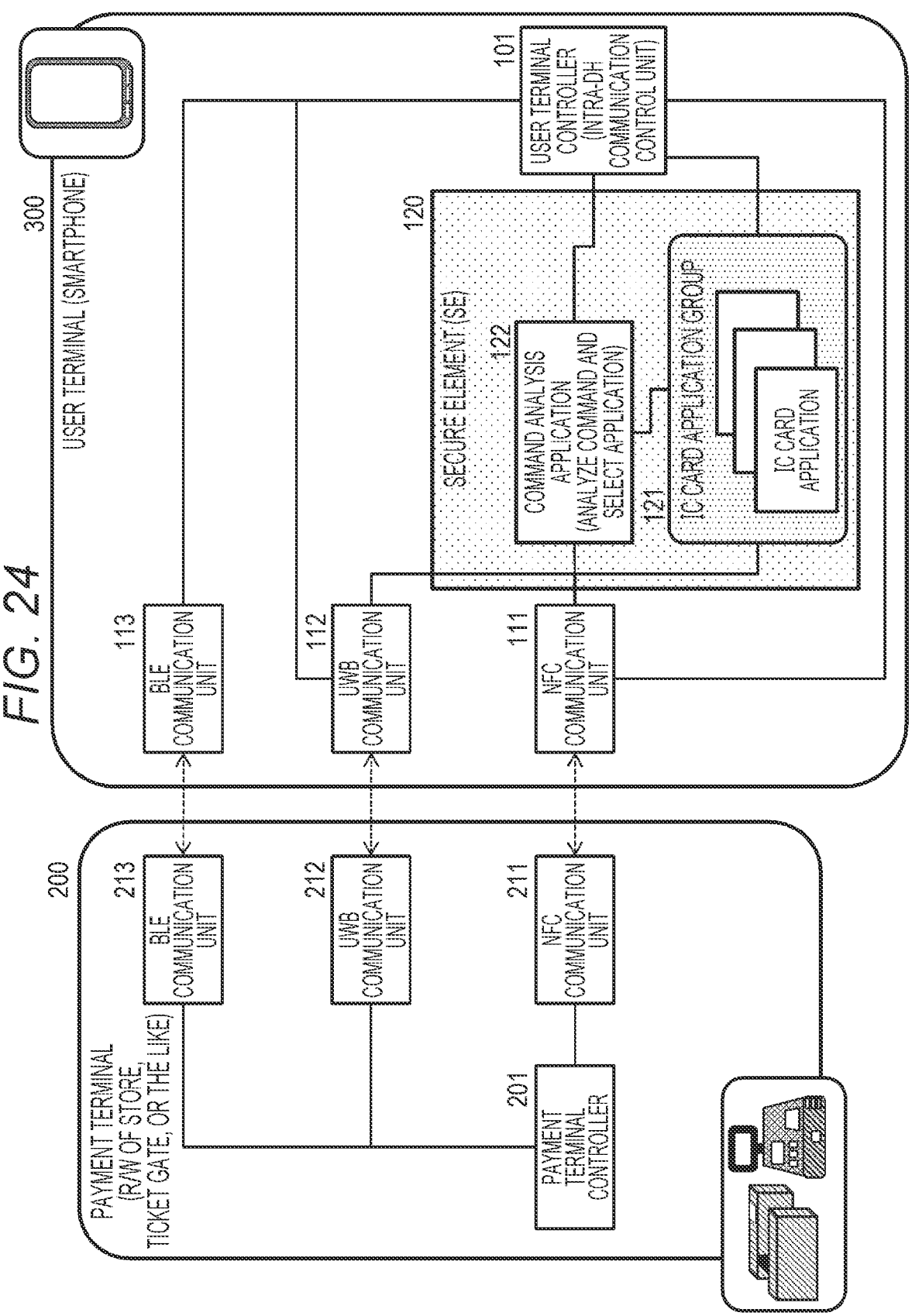
FIG. 24 is a diagram illustrating a configuration example of a user terminal and a payment terminal of Example 2 of the present disclosure.

The processing of each step of the flowchart illustrated in FIG. 24 will be sequentially described.
(Step S301)
First, in step S301, the UWB communication data analysis application (intra-SE communication control unit) 123 of the user terminal 100 receives an IC card application ID (AID) inquiry command transmitted by the payment terminal 200.

Note that the IC card application ID (AID) inquiry command transmitted by the payment terminal 200 is input to the UWB communication data analysis application (intra-SE communication control unit) 123 via the UWB communication unit 112 and the secure element OS (SE-OS) 120 of the user terminal 100.
(Step S302)
In step S302, the UWB communication data analysis application (intra-SE communication control unit) 123 that has received the IC card application ID (AID) inquiry command transmitted by the payment terminal 200 searches for an IC card application capable of executing the provided service of the payment terminal 200 by UWB communication.

For example, the application ID (AID) of the IC card application capable of executing the provided service of the payment terminal 200 by UWB communication is searched with reference to the UWB-compatible application registration data described above with reference to FIG. 8.
(Step S303)
Step S303 is a determination step.

If an IC card application capable of executing the provided service of the payment terminal 200 by UWB communication is detected in the search processing in step S302, the processing proceeds to step S304.

On the other hand, if it is not detected, the processing proceeds to step S305.
(Step S304)
If an IC card application capable of executing the provided service of the payment terminal 200 by UWB communication is detected in the search processing in step S302, the processing in step S304 is executed.

In this case, in step S304, the UWB communication data analysis application (intra-SE communication control unit) 123 generates a response packet storing the application ID (AID) acquired in the search processing in step S302, that is, the application ID of the IC card application capable of executing the provided service of the payment terminal 200 by UWB communication, and transmits the response packet to the payment terminal 200.

The response packet generated by the UWB communication data analysis application (intra-SE communication control unit) 123 is configured as, for example, a packet storing the following data described above with reference to FIG. 14.

(Data D1) Presence or absence of an IC card application capable of executing processing corresponding to a provided service of the payment terminal 200 (present=1, absent=0)

(Data D2) Presence or absence of an IC card application capable of executing the provided service of the payment terminal 200 by UWB communication (present=1, absent=0)

(Data D3) Application ID of an IC card application capable of executing the provided service of the payment terminal 200 by UWB communication (Data D4) Balance (optional) corresponding to the provided service of the payment terminal 200

(Data D5) An IC card unique identifier (IDm) (optional) associated with an IC card application capable of executing the provided service of the payment terminal 200 by UWB communication (Step S305)
On the other hand, if no IC card application capable of executing the provided service of the payment terminal 200 by UWB communication is detected in the search processing in step S302, the processing in step S305 is executed.

In this case, in step S305, the UWB communication data analysis application (intra-SE communication control unit) 123 generates a response packet indicating that no IC card application capable of executing the provided service of the payment terminal 200 by UWB communication has been detected, and transmits the response packet to the payment terminal 200.

This response packet is, for example, a packet having the data configuration described above with reference to FIGS. 15 and 16.

When the response packet storing the AID generated in step S304 by the UWB communication data analysis application (intra-SE communication control unit) 123 is transmitted to the payment terminal 200, thereafter, the payment terminal 200 transmits, to the user terminal 100, a select command storing the application ID (AID) stored in the response packet.

The secure element OS (SE-OS) of the user terminal 100 starts an IC card application identified by the application ID (AID) stored in the packet according to the select command. Thereafter, authentication processing and payment processing by UWB communication can be performed between the started IC card application and the payment terminal.

As described above, in the user terminal 100 of the present disclosure, the UWB communication data analysis application (intra-SE communication control unit) 123 notifies the payment terminal 200 of the application ID (AID) of the IC card application capable of executing the provided service of the payment terminal 200 by UWB communication.

The payment terminal 200 designates the AID obtained by this notification, outputs a select command, starts a specific IC card application, that is, an IC card application capable of executing the provided service of the payment terminal 200 by UWB communication, starts communication processing by UWB communication, and can perform authentication processing and payment processing by UWB communication.

With this configuration, the user terminal 100 and the payment terminal 200 can start communication at a distance within several meters at which UWB communication is possible without approaching up to several centimeters at which NFC communication is possible and perform payment processing. For example, the user can perform payment processing and pass through a gate such as a ticket gate without taking out the user terminal 100 such as a smartphone from a bag.

Furthermore, payment processing using a store terminal can also be performed without taking out the user terminal 100 such as a smartphone.

6. (Example 2) Configuration and Processing Example of Communication Processing Device of Example 2 of Present Disclosure Next, the configuration and a processing example of a communication processing device of Example 2 of the present disclosure will be described.

FIG. 24 is a block diagram illustrating a configuration example of a user terminal 300 which is the communication processing device of Example 2 of the present disclosure and a payment terminal 200 which communicates with the user terminal 300.

The user terminal 300 of Example 2 illustrated in FIG. 24 does not include the UWB communication data analysis application (intra-SE communication control unit) 123 in the secure element (SE) 120 of the user terminal 100 illustrated in FIG. 5 described above as Example 1.

In Example 1 described above, the UWB communication data analysis application (intra-SE communication control unit) 123 in the secure element (SE) 120 of the user terminal 100 executes processing of searching for an application ID (AID) of a UWB-compatible IC card application capable of processing the provided service of the payment terminal 200 and notifying the payment terminal 200 of the application ID.

On the other hand, in the user terminal 300 of the present Example 2 illustrated in FIG. 24, a user terminal controller 101 executes processing of searching for an application ID (AID) of a UWB-compatible IC card application capable of processing the provided service of the payment terminal 200 and notifying the payment terminal 200 of the application ID.

First, a configuration of the present Example 2 will be described with reference to FIG. 24.

The payment terminal 200 illustrated in FIG. 24 is, for example, a device including a reader/writer (R/W) installed at a ticket gate of a station or a store, and performs payment processing by executing proximity communication with the user terminal 300 such as a smartphone.

The user terminal 300 such as a smartphone and the payment terminal 200 each include three different communication units. That is, the user terminal 300 illustrated in FIG. 24 includes an NFC communication unit 111, a UWB communication unit 112, and a BLE communication unit 113. Similarly, the payment terminal 200 also includes an NFC communication unit 211, a UWB communication unit 212, and a BLE communication unit 213.

The NFC communication unit 111 of the user terminal 300 and the NFC communication unit 211 of the payment terminal 200 execute wireless communication according to the Type-F standard of the near field communication (NFC) standard, which is one of short-range wireless communication standards as described with reference to FIG. 3.

The UWB communication unit 112 of the user terminal 300 and the UWB communication unit 212 of the payment terminal 200 execute ultra wide band (UWB) communication, which is ultra-wide band wireless communication.

Bluetooth low energy (BLE) communication, which is low power consumption Bluetooth (registered trademark) communication, is performed between the BLE communication unit 113 of the user terminal 300 and the BLE communication unit 213 of the payment terminal 200.

When the user terminal 300 comes to the BLE communicable distance (several tens of meters), the payment terminal 200 can detect the user terminal 300 by BLE communication and establish BLE communication with the user terminal 300.

As illustrated in FIG. 24, the user terminal 300 includes a user terminal controller (device host (DH)) 101 and a secure element 120 in addition to the three communication units of the NFC communication unit 111, the UWB communication unit 112, and the BLE communication unit 113.

The payment terminal 200 includes a payment terminal controller 201 in addition to the three communication units of the NFC communication unit 211, the UWB communication unit 212, and the BLE communication unit 213.

The secure element 120 of the user terminal 300 includes an IC card application group 121 including a plurality of IC card applications and a command analysis unit 122.

The IC card application group 121 includes various IC card applications such as the transportation IC card application and the distribution IC card application described with reference to FIGS. 1 and 2.

NFC communication performed between the NFC communication unit 111 of the user terminal 300 and the NFC communication unit 211 of the payment terminal 200 is similar to the processing described above with reference to FIG. 3.

That is, when the NFC communication unit 111 of the user terminal 300 comes to a predetermined distance, such as several centimeters, from the NFC communication unit 211 of the payment terminal 200, wireless communication according to the NFC standard is started.

The user terminal 300 and the payment terminal 200 illustrated in FIG. 24 include a BLE communication unit and a UWB communication unit other than the NFC communication unit, and when the distance between the user terminal 300 and the payment terminal 200 is within several meters to several tens of meters, communication via these communication units becomes possible.

Using BLE communication, for example, the user terminal 300 achieves processing similar to the IC card application selection processing by the Type-F unique command used in NFC communication described with reference to FIG. 3.

The user terminal controller 101 of the user terminal 300 illustrated in FIG. 24 analyzes BLE communication data transmitted from the payment terminal 200, and executes processing of selecting an IC card application.

The command analysis unit 122 of the secure element 120 illustrated in FIG. 24 analyzes a polling signal including a Type-F unique command received from the payment terminal 200 via the NFC communication unit 111, extracts IC card application designation information of the Type-F unique command, and selects and starts one IC card application from the plurality of IC card applications stored in the secure element 120. This processing is similar to that of the conventional configuration illustrated in FIG. 3.

The user terminal controller 101 of the user terminal 300 illustrated in FIG. 24 further analyzes BLE communication data transmitted from the payment terminal 200, and executes processing of selecting an IC card application.

By performing this processing, it is possible to perform payment processing by UWB communication before NFC communication can be started.

An outline of a communication sequence executed between the user terminal 300 and the payment terminal 200 illustrated in FIG. 24 will be described.

Note that the payment terminal controller 201 of the payment terminal 200 performs communication control of each communication unit of the NFC communication unit 211, the UWB communication unit 212, and the BLE communication unit 213 of the payment terminal 200.

First, the payment terminal controller 201 broadcasts an advertise packet, which is a user terminal detection and BLE communication connection establishment request packet, from the BLE communication unit 213. In the BLE communication standard, an ADV_IND packet (general advertising indication packet) is defined as a broadcast packet for device detection.

When receiving the advertise packet transmitted by the payment terminal 200, the user terminal 300 that has entered the BLE communicable area transmits a response packet including a user terminal identifier to the payment terminal 200. The payment terminal 200 detects the user terminal 300 by acquiring the user terminal identifier from the response packet transmitted from the user terminal 300.

When the user terminal is detected, the payment terminal 200 next starts position identification processing of the user terminal 300.

The payment terminal controller 201 of the payment terminal 200 uses ultra wide band (UWB) communication to perform the position identification processing of the user terminal 300.

As described above, UWB communication defines a "secure ranging" method for analyzing a device position while maintaining security. "Secure ranging" is a technology that enables secure measurement of a distance and an angle between communication devices by transmitting and receiving encrypted data using a common key.

When detecting the user terminal by BLE communication, the payment terminal 200 outputs a UWB communication signal for identifying the position of the detected user terminal 300, establishes communication between the UWB communication unit 212 of the payment terminal 200 and the UWB communication unit 112 of the user terminal 300, and continuously executes position identification processing of the user terminal 300.

Note that the UWB communication unit 212 of the payment terminal 200 performs data analysis of time of arrival (ToA) and angle of arrival (AoA) in secure ranging by UWB communication.

Time of arrival (ToA) corresponds to a transmission/reception time of a UWB signal, and the payment terminal controller 201 of the payment terminal 200 analyzes the distance from the payment terminal 200 to the user terminal 300 on the basis of the time.

Angle of arrival (AoA) is angle information input from a transmission signal of the user terminal 300 to the payment terminal 200. The payment terminal controller 201 of the payment terminal 200 analyzes the direction of the user terminal 300 on the basis of this angle.

The payment terminal controller 201 of the payment terminal 200 identifies the position of the user terminal 300 by analyzing the ToA and the AoA.

Note that the payment terminal controller 201 of the payment terminal 200 continuously executes the user terminal position identification processing after the detection of the user terminal 300 until the payment processing is started or ended, such as until the user passes through the ticket gate where the payment terminal 200 is installed.

In parallel with execution of secure ranging by UWB communication, the payment terminal controller 201 of the payment terminal 200 executes selection of the IC card application and communication with the IC card application by BLE communication and UWB communication to perform payment processing and the like.

An outline of selection of an IC card application by BLE communication and a sequence of communication processing with the IC card application by UWB communication will be described.

The payment terminal 200 first starts BLE communication with the user terminal controller 101 of the user terminal 300.

If the BLE communication with the user terminal controller 101 is successful, thereafter, the payment terminal 200 transmits an inquiry packet of designation information (application ID (AID)) of the IC card application used for payment processing to the user terminal controller 101 of the user terminal 300.

In response to the inquiry packet received from the payment terminal 200, the user terminal controller 101 of the user terminal 300 generates a response packet storing designation information (AID) of the IC card application that can be used for the payment processing with the payment terminal 200, and transmits the response packet to the payment terminal 200.

Next, the payment terminal 200 transmits an IC card application selection command (SELECT command) packet storing the designation information (AID) of the IC card application received from the user terminal to the user terminal 300 by UWB communication.

The user terminal controller 101 of the user terminal 300 acquires the IC card application designation information (AID) from the IC card application selection command (SELECT command) storing the designation information (AID) of the IC card application received from the payment terminal 200.

The user terminal controller 101 of the user terminal 300 passes the IC card application designation information (AID) acquired from the IC card application selection command (SELECT command) to the secure element OS (SE-OS). The secure element OS (SE-OS) selects and starts one IC card application corresponding to the IC card application designation information (AID) received from the user terminal controller 101.

Thereafter, the selected one IC card application executes UWB communication with the payment terminal 200 via the secure element OS (SE-OS) and the UWB communication unit 112, and executes a series of processing required for payment processing such as authentication processing, balance confirmation processing, usage fee withdrawal processing, and balance update processing.

As described above, in the present Example 2, the user terminal controller 101 of the user terminal 300 executes processing of searching for an application ID (AID) of a UWB-compatible IC card application capable of processing the provided service of the payment terminal 200 and notifying the payment terminal 200 of the application ID.

This processing can be achieved, for example, by executing one application program in the user terminal controller 101.

Similarly to the UWB communication data analysis application (intra-SE communication control unit) 123 described in Example 1, this application program has an advantage that it can be installed on, for example, an existing smartphone owned by the user at any time.

As described above, unlike NFC communication in which the communicable distance is several centimeters, UWB communication has a communicable distance of about several tens of meters and enables communication even when the user terminal 300 is not in close contact with the payment terminal 200.

Therefore, by installing the application program for executing the above-described processing on the smartphone (user terminal 300) of the user, the smartphone put in the user's bag can perform payment processing by UWB communication with a payment terminal provided in a ticket gate at a position several meters away from the ticket gate, and the user can pass through the ticket gate by performing the payment processing without taking out the user terminal such as the smartphone put in the bag.

Furthermore, the same applies to a case of payment using a payment terminal of a store or the like, and the user can complete payment processing while approaching and passing through the payment terminal of the store without holding the user terminal such as a smartphone over the payment terminal of the store.

7. Sequence of Processing Executed by Communication Processing Device of Example 2

Next, a sequence of processing executed by the communication processing device of Example 2, that is, the user terminal 300 illustrated in FIG. 24 will be described.

The following processing sequences will be described in order.

(1) Processing sequence of registering UWB-compatible IC card application to user terminal by user (2) Processing sequence of notifying payment terminal of UWB-compatible IC card application by user terminal (3) Processing sequence of payment by UWB communication between UWB-compatible IC card application of user terminal and payment terminal (4) Payment processing sequence for executing communication between UWB-compatible IC card application of user terminal and payment terminal by BLE communication via user terminal controller (7-1) Processing Sequence of Registering UWB-Compatible IC Card Application to User Terminal by User)

First, (1) processing sequence of registering UWB-compatible IC card application to user terminal by user will be described.

This processing is processing of recording one IC card application of the IC card application group 121 in the secure element (SE) 120 in the table described above with reference to FIG. 8, that is, the "UWB-compatible application registration data" table, and making it available as an IC card application capable of payment by UWB communication.

Note that attribute information recording processing of an IC card application for the "UWB-compatible application registration data" may be executed by the user terminal controller (intra-DH communication control unit) 101 itself, or may be executed in response to a user request according to the sequence described with reference to FIG. 25.

Figure 25:
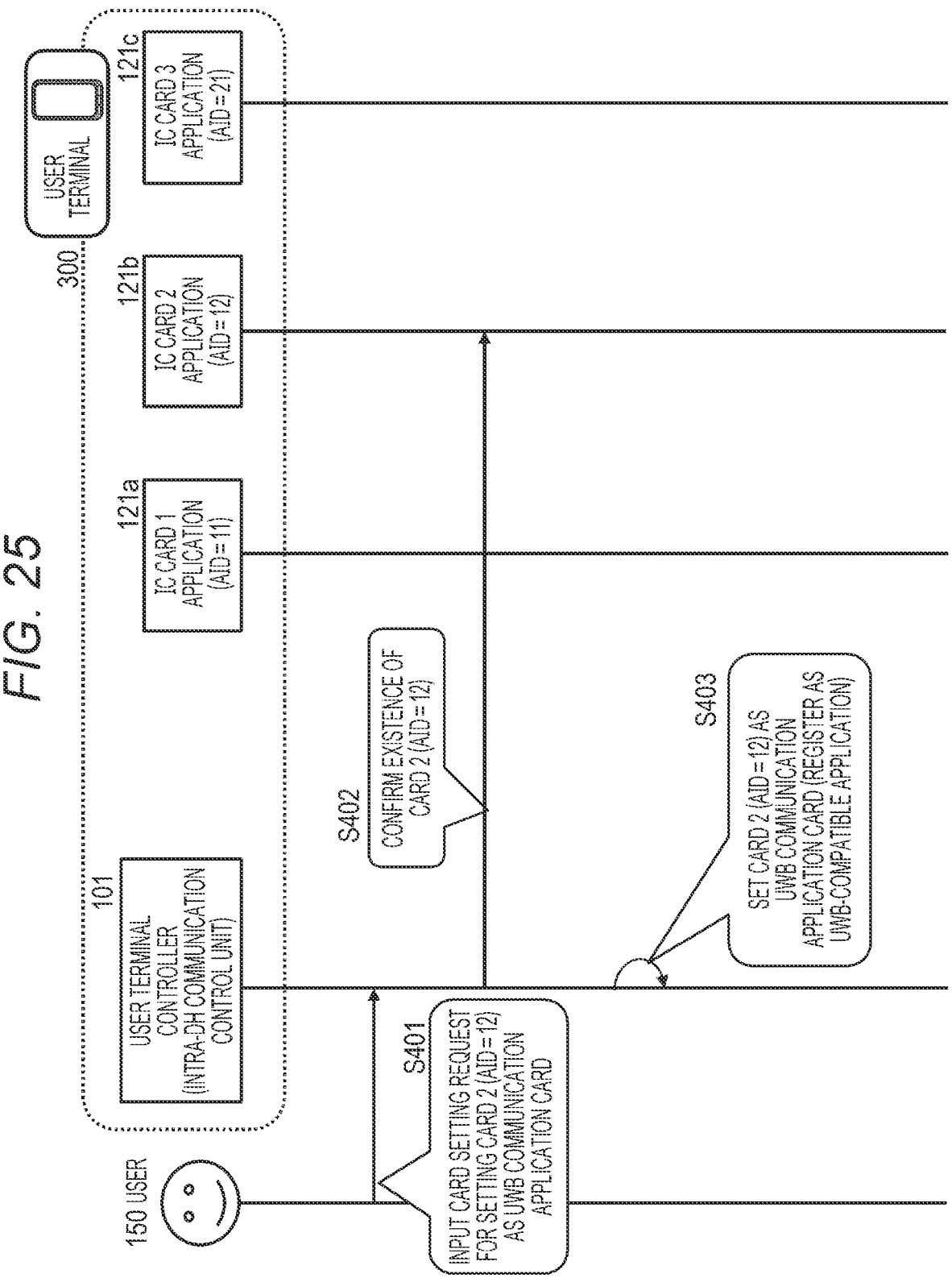
FIG. 25 is a sequence diagram illustrating a processing sequence of processing executed by the user terminal of Example 2 of the present disclosure.

FIG. 25 is a sequence diagram illustrating a processing sequence of registering a UWB-compatible IC card application to the user terminal by the user.

FIG. 25 illustrates a user 150 at a left end and the user terminal 300 on a right side, and illustrates, from the left, as components of the user terminal 300, the user terminal controller (intra-DH communication control unit) 101, an IC card 1 application (AID=11) 121*a*, an IC card 2 application (AID=12) 121*b*, and an IC card 3 application (AID=21) 121*c*.

Details of each processing of steps S401 to S403 illustrated in FIG. 25 will be sequentially described.

(Steps S401 and S402)

First, in step S401, the user 150 inputs designation information of a specific card application to be registered as a UWB-compatible IC card application.

Note that this processing is executed, for example, in a case where the user registers an IC card application newly installed on the user terminal as a UWB-compatible IC card application.

The user displays information of the newly installed IC card application on a display unit of the user terminal 300, and inputs a registration request for registering the displayed IC card application as a "UWB-compatible IC card application" on the user terminal 300.

For example, an icon with a display such as "register as UWB-compatible IC card application" is tapped.

With this tap processing, attribute information of the IC card application being displayed on the display unit of the user terminal 300 is read from the IC card application and input to the user terminal controller (intra-DH communication control unit) 101.

Note that here, as an example, it is assumed that the IC card 2 application (AID=12) 121*b* with the application identifier (AID)=12 is designated as a registration target.

(Step S402)

Next, in step S402, the user terminal controller (intra-DH communication control unit) 101 executes existence confirmation of the IC card 2 application (AID=12) designated by the user.

In step S402, the user terminal controller (intra-DH communication control unit) 101 refers to the IC card application group 121 of the secure element (SE) 120, and checks whether or not the IC card 2 application (AID=12) exists.

If the presence of the IC card 2 application (AID=12) is confirmed, the processing proceeds to step S403.

On the other hand, if the presence of the IC card 2 application (AID=12) is not confirmed, the processing does not proceed to step S403, but an error message is output to the display unit of the user terminal 300, and the processing is terminated.

(Step S403)

If the presence of the IC card 2 application (AID=12) which has been requested by the user to register as the UWB communication application card is confirmed, the processing proceeds to step S403.

In this case, in step S403, the user terminal controller (intra-DH communication control unit) 101 registers the IC card 2 application (AID=12) in the table described above with reference to FIG. 8, that is, the "UWB-compatible application registration data" table.

With this table registration processing, the IC card 2 application (AID=12) is validated as an IC card application capable of payment processing by UWB communication.

(7-(2) Processing Sequence of Notifying Payment Terminal of UWB-Compatible IC Card Application by User Terminal)

Next, (2) processing sequence of notifying payment terminal of UWB-compatible IC card application by user terminal will be described.

A processing sequence of notifying the payment terminal of a UWB-compatible IC card application by the user terminal will be described with reference to FIGS. 26 and 27.

Figure 26:
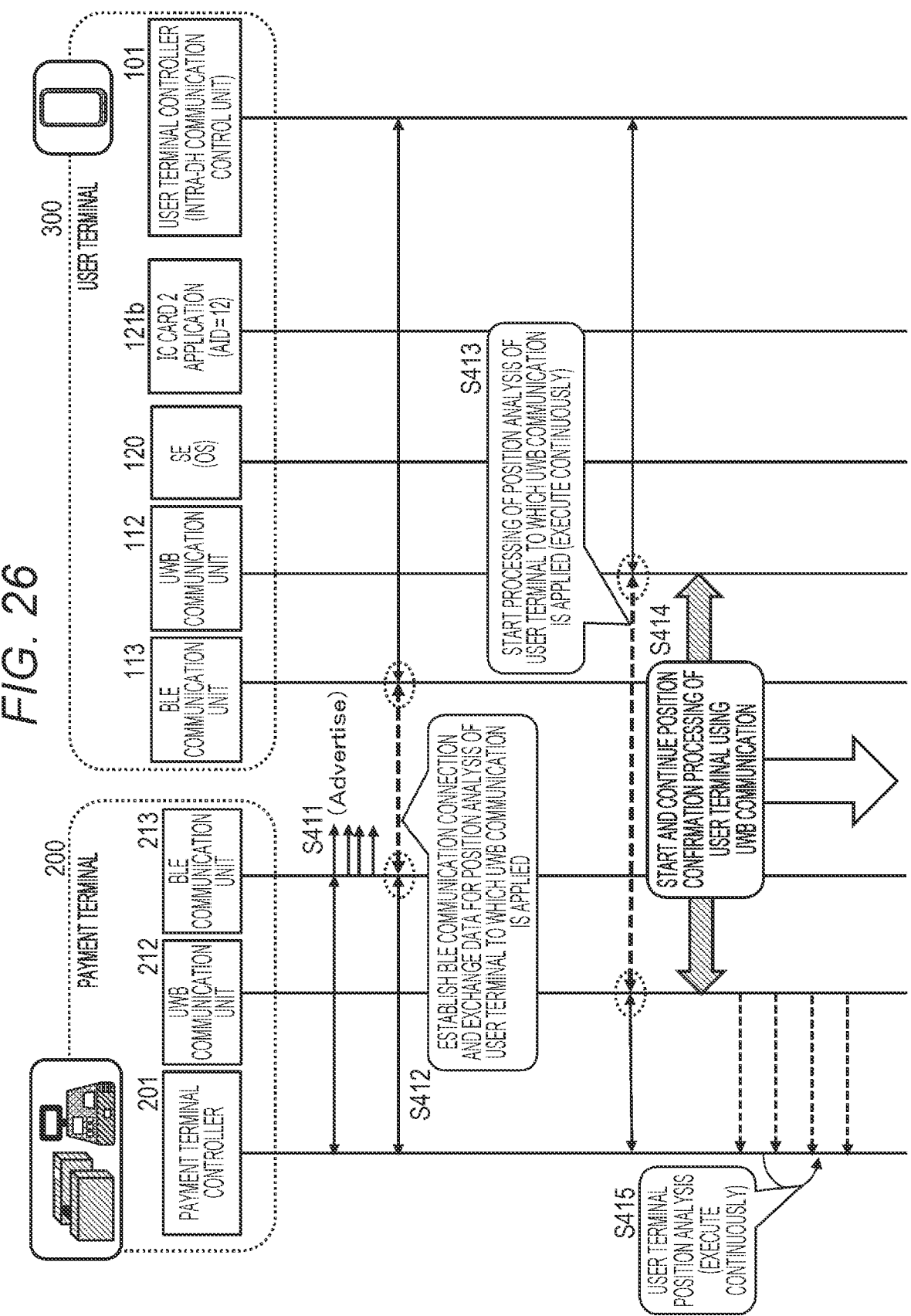
FIG. 26 is a sequence diagram illustrating a processing sequence of processing executed by the user terminal of Example 2 of the present disclosure.
Figure 27:
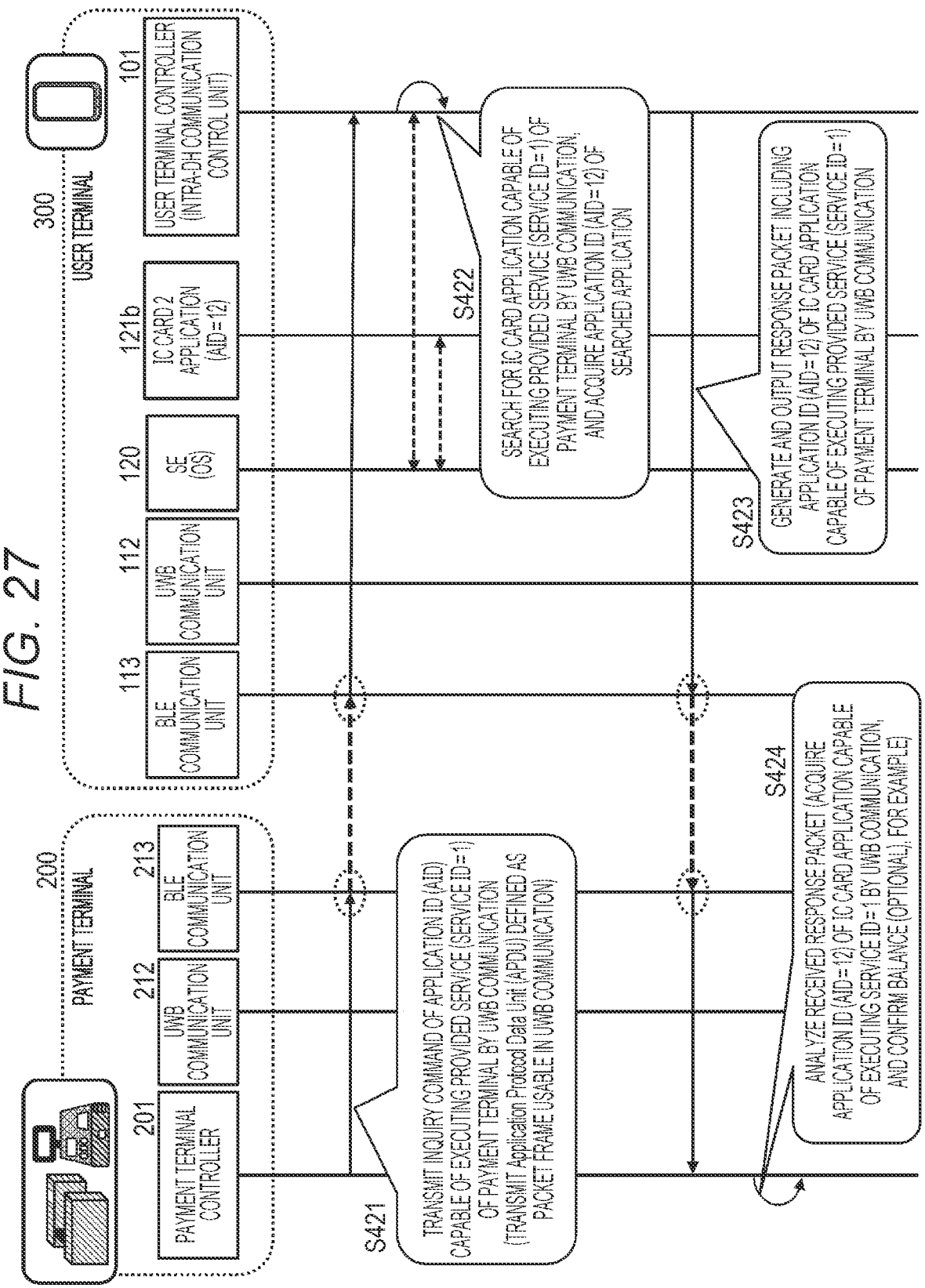
FIG. 27 is a sequence diagram illustrating a processing sequence of processing executed by the user terminal of Example 2 of the present disclosure.

FIGS. 26 and 27 illustrate the payment terminal 200 at the left end and the user terminal 300 on the right side.

As components of the payment terminal 200, from the left, the components of the payment terminal controller 201, the UWB communication unit 212, and the BLE communication unit 213 are illustrated.

On the other hand, as components of the user terminal 300, from the left, the BLE communication unit 113, the UWB communication unit 112, the secure element (SE-OS) 120, the IC card 2 application (AID=12) 121b, and the user terminal controller (intra-DH communication control unit) 101 are illustrated.

Details of the processing of step S411 and subsequent steps illustrated in FIGS. 26 and 27 will be sequentially described.

(Step S411)

First, in step S411, the payment terminal controller 201 of the payment terminal 200 broadcasts an advertise packet, which is a user terminal detection and BLE communication connection establishment request packet, from the BLE communication unit 213.

As described above, in the BLE communication standard, an ADV_IND packet (general advertising indication packet) is defined as a broadcast packet for device detection.

In step S411, the payment terminal 200 broadcasts an advertise packet from the BLE communication unit 213.

(Step S412)

When receiving the advertise packet transmitted by the payment terminal 200, the user terminal 300 that has entered the BLE communicable area (e.g., several tens of meters) transmits a response packet including a user terminal identifier to the payment terminal 200 in step S412. The payment terminal 200 detects the user terminal 300 by acquiring the user terminal identifier from the response packet transmitted from the user terminal 300.

When the user terminal is detected, the payment terminal 200 performs processing of acquiring user terminal position analysis data from the user terminal 300 in order to start position identification processing of the user terminal 300 next.

As described above, the payment terminal controller 201 of the payment terminal 200 uses ultra wide band (UWB) communication to perform the position identification processing of the user terminal 300.

(Steps S413 to S415)

Next, in step S413, the payment terminal controller 201 of the payment terminal 200 starts user terminal position identification processing to which UWB communication is applied with the UWB communication unit 112 of the user terminal 300 via the UWB communication unit 212.

As described above, UWB communication defines a "secure ranging" method for analyzing a device position while maintaining security. "Secure ranging" is a technology that enables secure measurement of a distance and an angle between communication devices by transmitting and receiving encrypted data using a common key.

When detecting the user terminal by BLE communication in steps S411 and S412, the payment terminal 200 outputs a UWB communication signal for identifying the position of the detected user terminal 300 in step S413, establishes communication between the UWB communication unit 212 of the payment terminal 200 and the UWB communication unit 112 of the user terminal 300, starts the position identification processing of the user terminal 300, and then continuously executes the user terminal position identification processing.

Note that, as described above, the UWB communication unit 212 of the payment terminal 200 performs data analysis of time of arrival (ToA) and angle of arrival (AoA) in secure ranging by UWB communication.

Time of arrival (ToA) corresponds to a transmission/reception time of a UWB signal, and the payment terminal controller 201 of the payment terminal 200 analyzes the distance from the payment terminal 200 to the user terminal 300 on the basis of the time.

Angle of arrival (AoA) is angle information input from a transmission signal of the user terminal 300 to the payment terminal 200. The payment terminal controller 201 of the payment terminal 200 analyzes the direction of the user terminal 300 on the basis of this angle.

The payment terminal controller 201 of the payment terminal 200 identifies the position of the user terminal 300 by analyzing the ToA and the AoA.

Note that the payment terminal controller 201 of the payment terminal 200 continuously executes the user terminal position identification processing after the detection of the user terminal 300 until the payment processing is started or ended, such as until the user passes through the ticket gate where the payment terminal 200 is installed.

In parallel with execution of secure ranging by UWB communication, the payment terminal controller 201 of the payment terminal 200 executes selection of the IC card application and communication with the IC card application by BLE communication and UWB communication to perform payment processing and the like.
(Step S421)

Next, processing in step S421 illustrated in FIG. 27 will be described.

In step S421, the payment terminal controller 201 of the payment terminal 200 transmits an inquiry command of an IC card application ID (AID) to the user terminal controller (intra-DH communication control unit) 101 of the user terminal 300 by BLE communication via the BLE communication unit 213.

In other words, a command for inquiring an application ID (AID) capable of executing payment processing corresponding to the provided service (service ID=1) of the payment terminal 200 by UWB communication is transmitted.

Note that the AID inquiry command of the IC card application is transmitted using an application protocol data unit (APDU) defined as a packet frame usable in BLE communication.

The APDU is a packet frame configuration defined in ISO 7816-4, and is a packet frame configuration usable in BLE communication.
(Step S422)

In step S422, the BLE communication unit 113 of the user terminal 300 receives the IC card application ID (AID) inquiry command transmitted by the payment terminal 200, and inputs the received command to the user terminal controller (intra-DH communication control unit) 101.
(Step S423)

The user terminal controller (intra-DH communication control unit) 101 that has received the IC card application ID (AID) inquiry command transmitted by the payment terminal 200 executes the following processing in step S423.

The user terminal controller (intra-DH communication control unit) 101 searches for an IC card application capable of executing the provided service (service ID=1) of the payment terminal 200 by UWB communication, and acquires an application ID (AID=12) of the searched application.

For example, the application ID (AID) of the IC card application capable of executing the provided service (service ID=1) of the payment terminal 200 by UWB communication is searched with reference to the UWB-compatible application registration data described above with reference to FIG. 8.

In the example illustrated in FIG. 8, the application ID (AID) of the IC card application capable of executing the service ID=1 by UWB communication is AID=12, and the user terminal controller (intra-DH communication control unit) 101 acquires this application ID (AID=12).
(Step S424)

Next, in step S424, the user terminal controller (intra-DH communication control unit) 101 generates a response packet storing the application ID (AID=12) acquired in step S423, and transmits the response packet to the payment terminal 200.

The response packet is transmitted from the user terminal controller (intra-DH communication control unit) 101 via the BLE communication unit 113, received by the BLE communication unit 213 of the payment terminal 200, and input to the payment terminal controller 201.

Note that the data configuration of the response packet generated by the user terminal controller (intra-DH communication control unit) 101 of the user terminal 300 in response to the IC card application ID (AID) inquiry command from the payment terminal 200 has a configuration similar to the configuration described above with reference to FIGS. 14 to 16.

That is, as described above with reference to FIG. 14, the response packet is configured as, for example, a packet storing the following data.

(Data D1) Presence or absence of an IC card application capable of executing processing corresponding to the provided service (service ID=1) of the payment terminal 200 (present=1, absent=0)

(Data D2) Presence or absence of an IC card application capable of executing the provided service (service ID=1) of the payment terminal 200 by UWB communication (present=1, absent=0)

(Data D3) An application ID (AID=12) of an IC card application capable of executing the provided service (service ID=1) of the payment terminal 200 by UWB communication.

(Data D4) Balance (optional) corresponding to the provided service (service ID=1) of the payment terminal 200

(Data D5) An IC card unique identifier (IDm) (optional) associated with an IC card application capable of executing the provided service (service ID=1) of the payment terminal 200 by UWB communication In a case where the user terminal 300 has an IC card application capable of executing the provided service (service ID=1) of the payment terminal 200 by UWB communication, the response packet illustrated in FIG. 14 is generated, and in a case where the user terminal 300 does not have such an IC card application, the response packet illustrated in FIG. 15 or 16 is generated and transmitted to the payment terminal 200.
(Step S424)

In step S424, the payment terminal controller 201 of the payment terminal 200 that has received the response packet from the user terminal 300 executes analysis processing of the received response packet. Specifically, processing of acquiring an application ID (AID=12) of an IC card application capable of executing the service ID=1 by UWB communication is executed.

Note that in a case where balance information is recorded in the response packet, balance confirmation processing or the like is also executed.

(7-(3) Processing Sequence of Payment by UWB Communication Between UWB-Compatible IC Card Application of User Terminal and Payment Terminal)

Next, (3) processing sequence of payment by UWB communication between UWB-compatible IC card application of user terminal and payment terminal will be described.

A processing sequence of payment by UWB communication between the UWB-compatible IC card application of the user terminal and the payment terminal will be described with reference to FIGS. 28 and 29.

Figure 28:
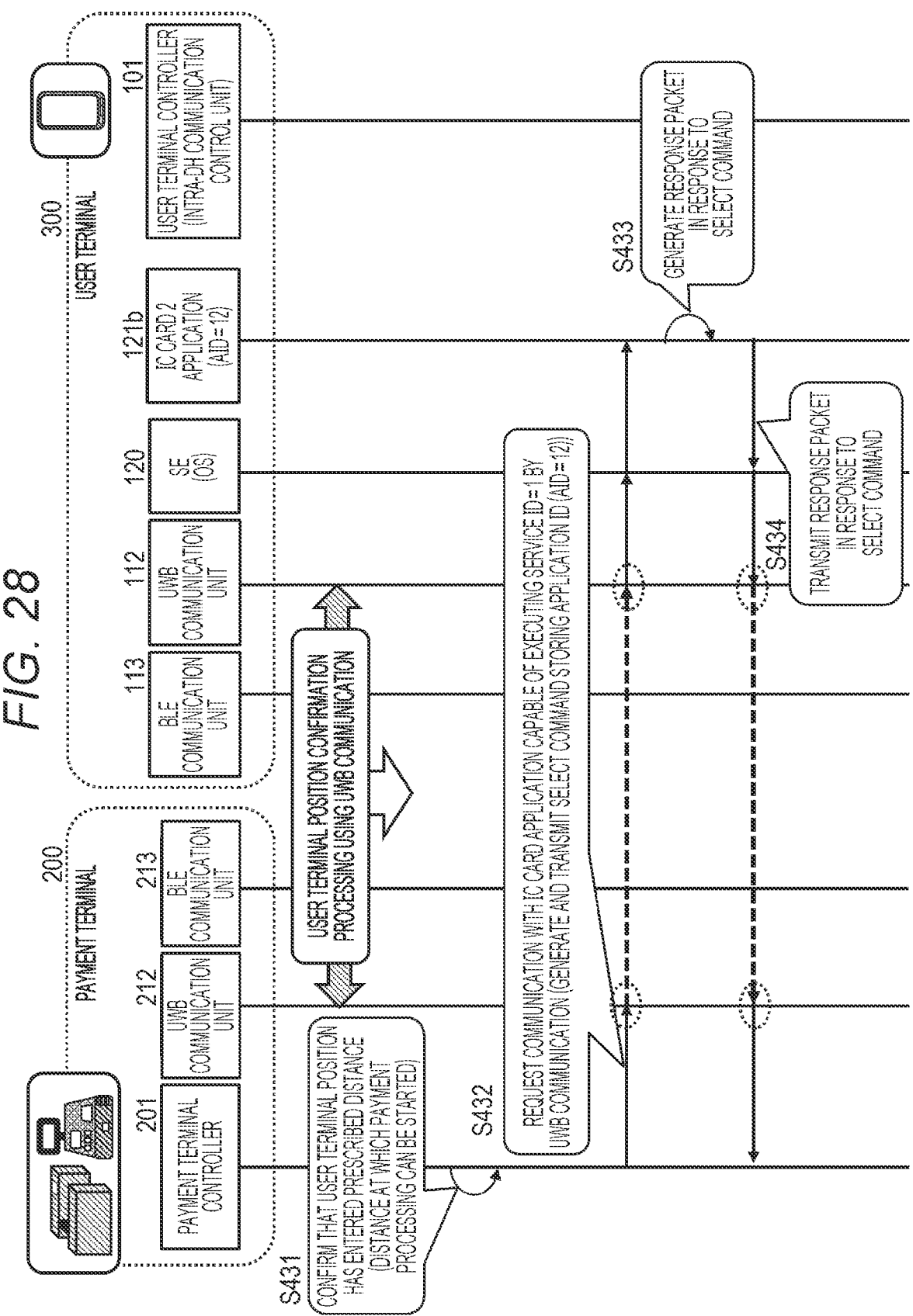
FIG. 28 is a sequence diagram illustrating a processing sequence of processing executed by the user terminal of Example 2 of the present disclosure.
Figure 29:
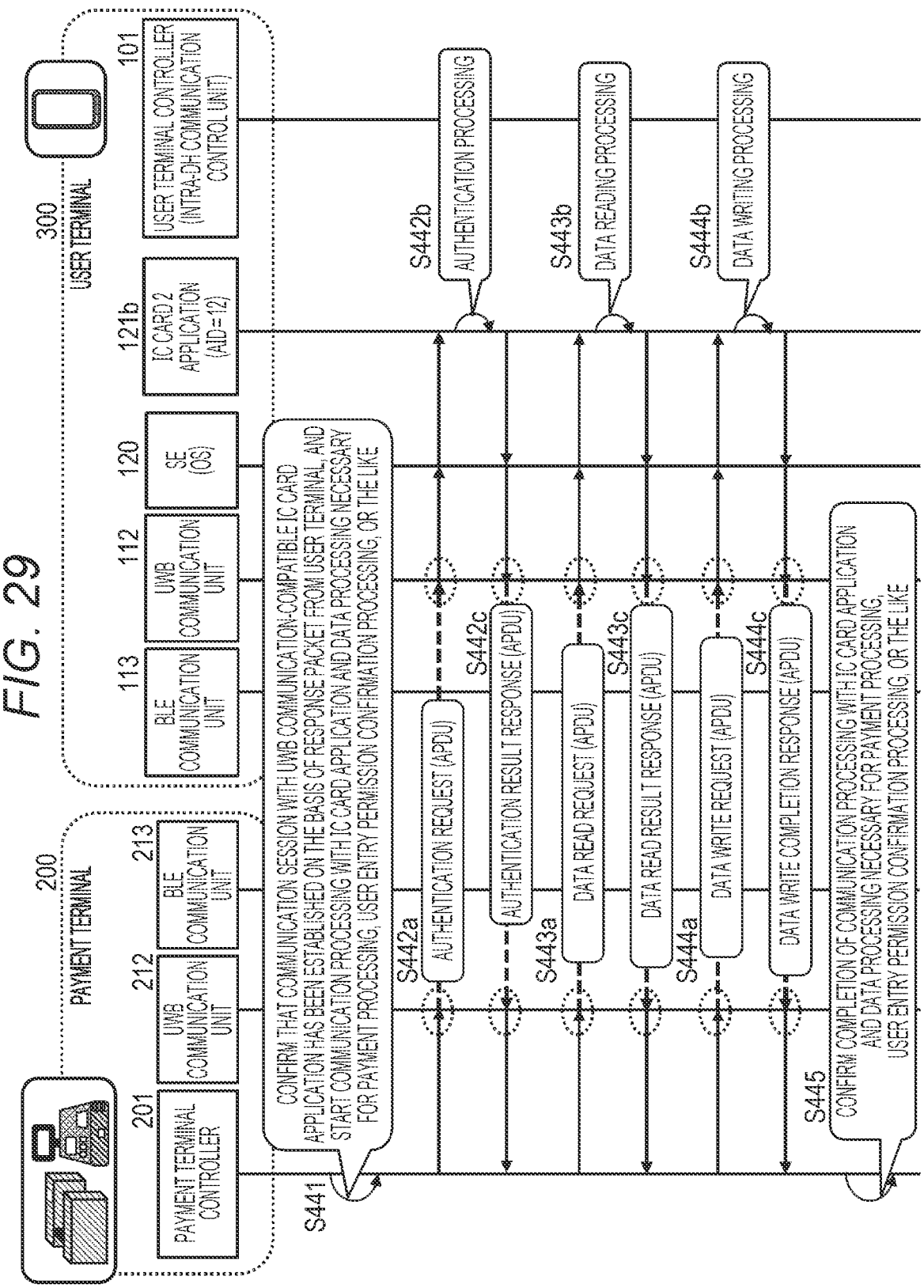
FIG. 29 is a sequence diagram illustrating a processing sequence of processing executed by the user terminal of Example 2 of the present disclosure.

FIGS. 28 and 29 illustrate the payment terminal 200 at the left end and the user terminal 300 on the right side.

As components of the payment terminal 200, from the left, the components of
 the payment terminal controller 201,
 the UWB communication unit 212, and
 the BLE communication unit 213 are illustrated.

On the other hand, as components of the user terminal 300, from the left,
 the BLE communication unit 113,
 the UWB communication unit 112,
 the secure element (SE-OS) 120,
 the IC card 2 application (AID=12) 121b, and the user terminal controller (intra-DH communication control unit) 101 are illustrated.

Details of the processing of step S431 and subsequent steps illustrated in FIGS. 28 and 29 will be sequentially described.

Note that at the start of step S431, the payment terminal 200 and the user terminal 300 have established a UWB communication session, and the payment terminal 200 is continuing the user terminal position confirmation processing to which UWB communication is applied.

(Step S431)

First, in step S431, the payment terminal controller 201 of the payment terminal 200 refers to the result of user terminal position confirmation by UWB communication to confirm whether or not the user terminal 300 has entered a prescribed distance defined in advance, such as the inside of a ticket gate, and upon confirmation, the processing of step S432 and subsequent steps (payment processing) is started.

(Step S432)

When it is confirmed that the user terminal 300 has entered a prescribed distance defined in advance, such as the inside of a ticket gate, in step S432, the payment terminal controller 201 of the payment terminal 200 first transmits a request for communication with the IC card application capable of executing the service ID=1 by UWB communication to the user terminal 300 via the UWB communication unit 212.

Specifically, a SELECT command storing an application ID (AID=12) is generated and transmitted.

(Step S433)

When receiving the SELECT command packet transmitted from the payment terminal 200 in step S432, the UWB communication unit 112 of the user terminal 300 passes the received packet to the secure element (SE-OS) 120.

The secure element (SE-OS) 120 recognizes the SELECT command in the packet and acquires the application ID (AID=12) of the communication request target application stored in the packet.

This AID is the AID of the UWB communication-compatible IC card application acquired by the user terminal controller (intra-DH communication control unit) 101 of the user terminal 300 and of which the payment terminal 200 is notified in steps S422 and S423 described above.

The secure element (SE-OS) 120 selectively starts an application corresponding to the AID=12, that is, the UWB communication-compatible IC card application (IC card 2 application (AID=12) 121b).

(Steps S433 and S434)

The IC card 2 application (AID=12) 121b started by the application selection and start processing by the secure element (SE-OS) 120 in step S432 generates a start response packet indicating that the IC card 2 application itself has been started in step S433, and transmits the start response packet to the payment terminal 200 via the secure element (SE-OS) 120 and the UWB communication unit 112 in step S434.

This transmission data is input to the payment terminal controller 201 via the UWB communication unit 212 of the payment terminal 200, and the payment terminal controller 201 confirms that UWB communication with the IC card 2 application (AID=12) 121b of the user terminal 300 has been enabled.

(Step S441)

In step S441, the payment terminal controller 201 of the payment terminal 200 confirms that a communication session with the UWB communication-compatible IC card application has been established on the basis of the response packet from the user terminal 300, and starts communication processing with the IC card application and data processing necessary for payment processing, user entry permission confirmation processing, or the like.

(Steps S442 to S444)

The processing of steps S442 to S444 is a sequence of authentication and payment processing to which the UWB communication between the payment terminal controller 201 of the payment terminal 200 and the UWB communication-compatible IC card 2 application (AID=12) 121b of the user terminal 300 is applied.

For example, a series of processing of
authentication processing in steps S442a to S442c,
data reading processing from the user terminal 300 in steps S443a to S443c, and
data writing processing to the user terminal 300 in steps S444a to S444c is performed.

Note that the series of processing is executed using UWB communication. For example, transmission is performed using an application protocol data unit (APDU) defined as a packet frame usable in UWB communication. As described above, the APDU is a packet frame configuration defined in ISO 7816-4 and is a packet frame configuration usable in UWB communication.

In the data reading processing from the user terminal 300 in steps S443a to S443c, for example, balance information corresponding to the IC card 2 application (AID=12) 121b is read from the secure memory in the secure element 120 of the user terminal 300.

In the data writing processing to the user terminal 300 in steps S444a to S444c, for example, processing of updating balance information corresponding to the IC card 2 application (AID=12) 121b of the secure memory in the secure element 120 of the user terminal 300, that is, processing of writing an updated amount obtained by subtracting the payment amount is executed.

(Step S445)

When the series of processing in steps S442 to S444 is completed, in step S445, the payment terminal controller 201 of the payment terminal 200 confirms completion of communication processing with the IC card application and data processing necessary for the payment processing, the user entry permission confirmation processing, or the like, and ends the processing.

Note that in the case of a ticket gate, for example, when the series of processing in steps S442 to S444 is completed, processing of opening the door of the gate or the like is executed to allow passage of the user.

Next, a sequence of processing executed by the user terminal controller (intra-DH communication control unit) 101 of the user terminal 300 in response to an inquiry about the application ID (AID) of the UWB communication-compatible IC card application from the payment terminal 200 will be described with reference to a flowchart illustrated in FIG. 30.

Figure 30:
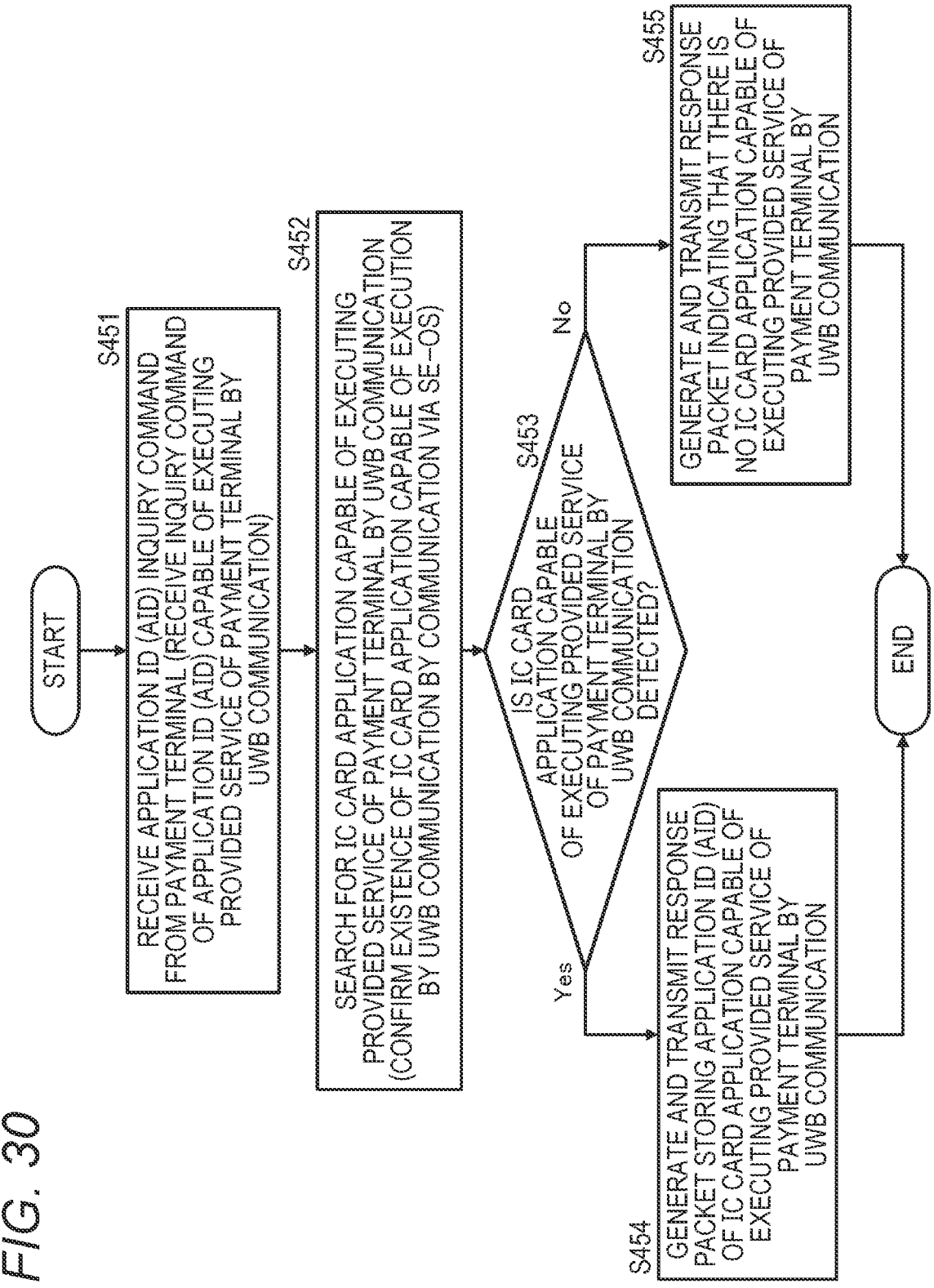
FIG. 30 is a flowchart illustrating a processing sequence of processing executed by the user terminal of Example 2 of the present disclosure.

That is, the flowchart illustrated in FIG. 30 is a detailed sequence of processing executed in steps S421 to S423 illustrated in FIG. 27.

The processing of each step of the flowchart illustrated in FIG. 30 will be sequentially described.

(Step S451)

First, in step S451, the user terminal controller (intra-DH communication control unit) 101 of the user terminal 300 receives the IC card application ID (AID) inquiry command transmitted by the payment terminal 200.

Note that the IC card application ID (AID) inquiry command transmitted by the payment terminal 200 is input to the user terminal controller (intra-DH communication control unit) 101 via the BLE communication unit 113 of the user terminal 300.

(Step S452)

In step S452, the user terminal controller (intra-DH communication control unit) 101 that has received the IC card application ID (AID) inquiry command transmitted by the payment terminal 200 searches for an IC card application capable of executing the provided service of the payment terminal 200 by UWB communication.

For example, the application ID (AID) of the IC card application capable of executing the provided service of the payment terminal 200 by UWB communication is searched with reference to the UWB-compatible application registration data described above with reference to FIG. 8.

(Step S453)

Step S453 is a determination step.

If an IC card application capable of executing the provided service of the payment terminal 200 by UWB communication is detected in the search processing in step S452, the processing proceeds to step S454.

On the other hand, if it is not detected, the processing proceeds to step S455.

(Step S454)

If an IC card application capable of executing the provided service of the payment terminal 200 by UWB communication is detected in the search processing in step S452, the processing in step S454 is executed.

In this case, in step S454, the user terminal controller (intra-DH communication control unit) 101 generates a response packet storing the application ID (AID) acquired in the search processing in step S452, that is, the application ID of the IC card application capable of executing the provided service of the payment terminal 200 by UWB communication, and transmits the response packet to the payment terminal 200.

The response packet generated by the user terminal controller (intra-DH communication control unit) 101 is configured as, for example, a packet storing the following data described above with reference to FIG. 14.

(Data D1) Presence or absence of an IC card application capable of executing processing corresponding to the provided service of the payment terminal 200 (present=1, absent=0)

(Data D2) Presence or absence of an IC card application capable of executing the provided service of the payment terminal 200 by UWB communication (present=1, absent=0)

(Data D3) Application ID of an IC card application capable of executing the provided service of the payment terminal 200 by UWB communication (Data D4) Balance (optional) corresponding to the provided service of the payment terminal 200

(Data D5) An IC card unique identifier (IDm) (optional) associated with an IC card application capable of executing the provided service of the payment terminal 200 by UWB communication (Step S455)

On the other hand, if no IC card application capable of executing the provided service of the payment terminal 200 by UWB communication is detected in the search processing in step S452, the processing in step S455 is executed.

In this case, in step S455, the user terminal controller (intra-DH communication control unit) 101 generates a response packet indicating that no IC card application capable of executing the provided service of the payment terminal 200 by UWB communication has been detected, and transmits the response packet to the payment terminal 200.

This response packet is, for example, a packet having the data configuration described above with reference to FIGS. 15 and 16.

When the response packet storing the AID generated in step S454 by the user terminal controller (intra-DH communication control unit) 101 is transmitted to the payment terminal 200, thereafter, the payment terminal 200 transmits, to the user terminal 300, a select command storing the application ID (AID) stored in the response packet.

The secure element OS (SE-OS) of the user terminal 300 starts an IC card application identified by the application ID (AID) stored in the packet according to the select command. Thereafter, authentication processing and payment processing by UWB communication can be performed between the started IC card application and the payment terminal.

As described above, in the user terminal 300 of the present example, the user terminal controller (intra-DH communication control unit) 101 notifies the payment terminal 200 of the application ID (AID) of the IC card application capable of executing the provided service of the payment terminal 200 by UWB communication.

The payment terminal 200 designates the AID obtained by this notification, outputs a select command, starts a specific IC card application, that is, an IC card application capable of executing the provided service of the payment terminal 200 by UWB communication, starts communication processing by UWB communication, and can perform authentication processing and payment processing by UWB communication.

With this configuration, the user terminal 300 and the payment terminal 200 can start communication at a distance within several meters at which UWB communication is possible without approaching up to several centimeters at which NFC communication is possible and perform payment processing. For example, the user can perform payment processing and pass through a gate such as a ticket gate without taking out the user terminal 300 such as a smartphone from a bag.

Furthermore, payment processing using a store terminal can also be performed without taking out the user terminal 300 such as a smartphone.

(7-(4) Payment Processing Sequence for Executing Communication Between UWB-Compatible IC Card Application of User Terminal and Payment Terminal by BLE Communication Via User Terminal Controller)

Next, (4) payment processing sequence for executing communication between UWB-compatible IC card application of user terminal and payment terminal by BLE communication via user terminal controller will be described.

The processing described above with reference to FIGS. 28 and 29 is a sequence in which the UWB-compatible IC card application of the user terminal and the payment terminal execute UWB communication to perform payment processing.

The sequence described below is processing that can be executed in place of the processing described with reference to FIGS. 28 and 29.

That is, this is a payment processing sequence for executing communication between the UWB-compatible IC card application of the user terminal and the payment terminal by BLE communication via the user terminal controller.

Hereinafter, this processing sequence will be described with reference to FIGS. 31 and 32.

Figure 31:
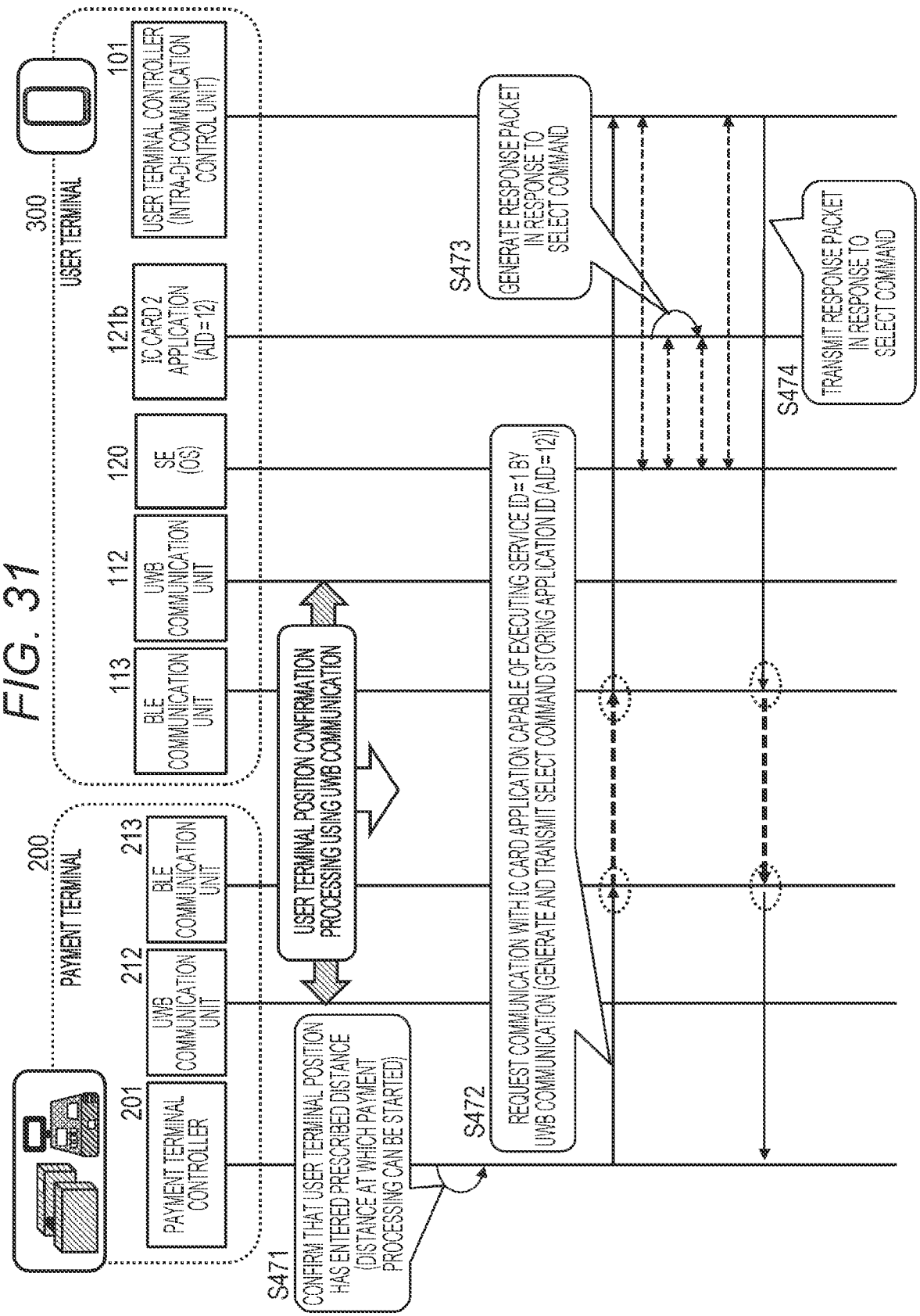
FIG. 31 is a sequence diagram illustrating a processing sequence of processing executed by the user terminal of Example 2 of the present disclosure.
Figure 32:
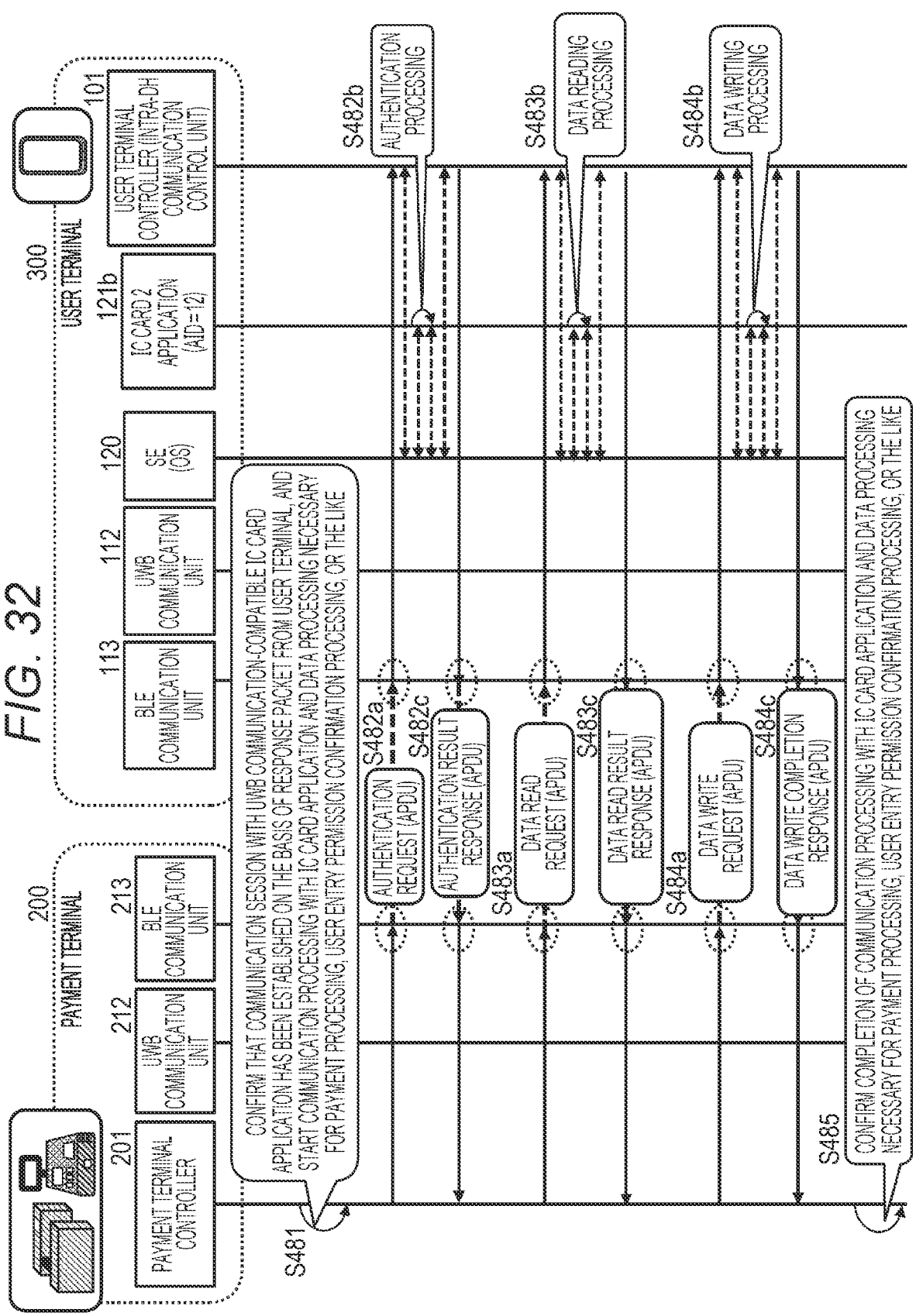
FIG. 32 is a sequence diagram illustrating a processing sequence of processing executed by the user terminal of Example 2 of the present disclosure.

Note that it is assumed that processing according to the sequence illustrated in FIGS. 25 to 27 is executed before the processing sequence illustrated in FIGS. 31 and 32.

FIGS. 31 to 32 illustrate the payment terminal 200 at the left end and the user terminal 300 on the right side.

As components of the payment terminal 200, from the left, the components of the payment terminal controller 201,
the UWB communication unit 212, and
the BLE communication unit 213 are illustrated.

On the other hand, as components of the user terminal 300, from the left, the BLE communication unit 113,
the UWB communication unit 112,
the secure element (SE-OS) 120,
the IC card 2 application (AID=12) 121b, and
the user terminal controller (intra-DH communication control unit) 101 are illustrated.

Details of the processing of step S471 and subsequent steps illustrated in FIGS. 31 and 32 will be sequentially described.

Note that at the start of step S471, the payment terminal 200 and the user terminal 300 have established a UWB communication session, and the payment terminal 200 is continuing the user terminal position confirmation processing to which UWB communication is applied.

(Step S471)

First, in step S471, the payment terminal controller 201 of the payment terminal 200 refers to the result of user terminal position confirmation by UWB communication to confirm whether or not the user terminal 300 has entered a prescribed distance defined in advance, such as the inside of a ticket gate, and upon confirmation, the processing of step S472 and subsequent steps (payment processing) is started.

(Step S472)

When it is confirmed that the user terminal 300 has entered a prescribed distance defined in advance, such as the inside of a ticket gate, in step S472, the payment terminal controller 201 of the payment terminal 200 first transmits a request for communication with the IC card application capable of executing the service ID=1 by UWB communication to the user terminal 300 via the BLE communication unit 213.

Specifically, a SELECT command storing an application ID (AID=12) is generated and transmitted.

(Step S473)

When receiving the SELECT command packet transmitted from the payment terminal 200 in step S472, the BLE communication unit 113 of the user terminal 300 passes the received packet to the user terminal controller (intra-DH communication control unit) 101.

The user terminal controller (intra-DH communication control unit) 101 transfers the received packet to the secure element (SE-OS) 120. The secure element (SE-OS) 120 recognizes the SELECT command in the packet and acquires the application ID (AID=12) of the communication request target application stored in the packet.

This AID is the AID of the UWB communication-compatible IC card application acquired by the user terminal controller (intra-DH communication control unit) 101 of the user terminal 300 and of which the payment terminal 200 is notified in steps S422 and S423 described above with reference to FIG. 27.

The secure element (SE-OS) 120 selectively starts an application corresponding to the AID=12, that is, the UWB communication-compatible IC card application (IC card 2 application (AID=12) 121b).

(Steps S473 and S474)

The IC card 2 application (AID=12) 121b started by the application selection and start processing by the secure element (SE-OS) 120 in step S472 generates a start response packet indicating that the IC card 2 application itself has been started in step S473, and transmits the start response packet to the payment terminal 200 via the secure element (SE-OS) 120, the user terminal controller (intra-DH communication control unit) 101, and the BLE communication unit 113 in step S474.

This transmission data is input to the payment terminal controller 201 via the BLE communication unit 213 of the payment terminal 200, and the payment terminal controller 201 confirms that communication with the IC card 2 application (AID=12) 121b of the user terminal 300 has been enabled.

(Step S481)

In step S481, the payment terminal controller 201 of the payment terminal 200 confirms that a communication session with the UWB communication-compatible IC card application has been established on the basis of the response packet from the user terminal 300, and starts communication processing with the IC card application and data processing necessary for payment processing, user entry permission confirmation processing, or the like.

(Steps S482 to S484)

The processing of steps S482 to S484 is a sequence of authentication and payment processing of executing communication between the payment terminal controller 201 of the payment terminal 200 and the IC card 2 application (AID=12) 121b corresponding to UWB communication of the user terminal 300 via the user terminal controller (intra-DH communication control unit) 101.

For example, a series of processing of authentication processing in steps S482a to S48$^2$c,
data reading processing from the user terminal 300 in steps S483a to S483c, and
data writing processing to the user terminal 300 in steps S484a to S484c is performed.

Note that the series of processing is executed by BLE communication via the user terminal controller (intra-DH communication control unit) 101.

For example, transmission is performed using an application protocol data unit (APDU) defined as a packet frame usable in BLE communication. As described above, the APDU is a packet frame configuration defined in ISO 7816-4 and is a packet frame configuration usable in BLE communication.

In the data reading processing from the user terminal 300 in steps S483a to S483c, for example, balance information corresponding to the IC card 2 application (AID=12) 121b is read from the secure memory in the secure element 120 of the user terminal 300.

In the data writing processing to the user terminal 300 in steps S484a to S484c, for example, processing of updating balance information corresponding to the IC card 2 application (AID=12) 121b of the secure memory in the secure element 120 of the user terminal 300, that is, processing of writing an updated amount obtained by subtracting the payment amount is executed.

(Step S485)

When the series of processing in steps S482 to S484 is completed, in step S485, the payment terminal controller 201 of the payment terminal 200 confirms completion of communication processing with the IC card application and data processing necessary for the payment processing, the user entry permission confirmation processing, or the like, and ends the processing.

Note that in the case of a ticket gate, for example, when the series of processing in steps S482 to S484 is completed, processing of opening the door of the gate or the like is executed to allow passage of the user.

8. (Example 3) Configuration and Processing Example of Communication Processing Device of Example 3 of Present Disclosure Next, the configuration and a processing example of a communication processing device of Example 3 of the present disclosure will be described.

Figure 33:
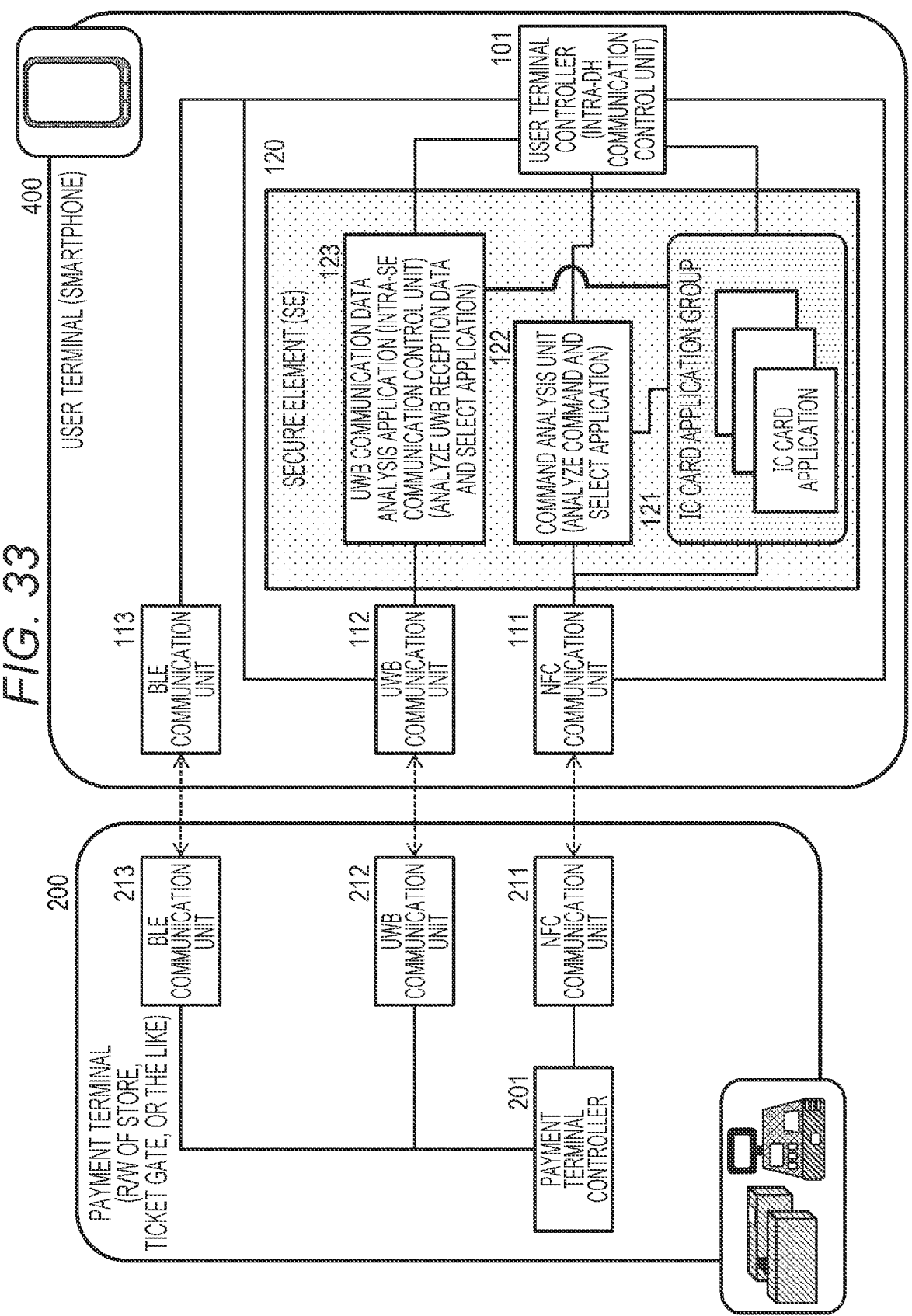
FIG. 33 is a diagram illustrating a configuration example of a user terminal and a payment terminal of Example 3 of the present disclosure.

FIG. 33 is a block diagram illustrating a configuration example of a user terminal 400 which is the communication processing device of Example 3 of the present disclosure and a payment terminal 200 which communicates with the user terminal 400.

The user terminal 400 of Example 3 illustrated in FIG. 33 is different from the user terminal 100 illustrated in FIG. 5 described above as Example 1, and has a configuration in which IC card applications in an IC card application group 121 in a secure element (SE) 120 of the user terminal 400 cannot directly communicate with the payment terminal 200 via a UWB communication unit 112.

The IC card applications in the IC card application group 121 in the secure element (SE) 120 of the user terminal 400 perform UWB communication via a UWB communication data analysis application (intra-SE communication control unit) 123 or a user terminal controller 101.

Other configurations are similar to the configuration described above with reference to FIG. 5.

A sequence of processing executed by the communication processing device of Example 3, that is, the user terminal 400 illustrated in FIG. 33 will be described with reference to FIG. 34 and subsequent drawings.

The following processing sequences will be described in order.
(1) Processing sequence of registering UWB-compatible IC card application to user terminal by user
(2) Processing sequence of notifying payment terminal of UWB-compatible IC card application by user terminal
(3) Processing sequence of payment by UWB communication between UWB-compatible IC card application of user terminal and payment terminal (8-(1) Processing Sequence of Registering UWB-Compatible IC Card Application to User Terminal by User)

First, (1) processing sequence of registering UWB-compatible IC card application to user terminal by user will be described.

This processing is processing of recording one IC card application of the IC card application group 121 in the secure element (SE) 120 in the table described above with reference to FIG. 8, that is, the "UWB-compatible application registration data" table, and making it available as an IC card application capable of payment by UWB communication.

Note that the attribute information recording processing of the IC card application for the "UWB-compatible application registration data" may be executed by the UWB communication data analysis application (intra-SE communication control unit) 123 itself, or may be executed in response to a user request according to the sequence described with reference to FIG. 34.

Figure 34:
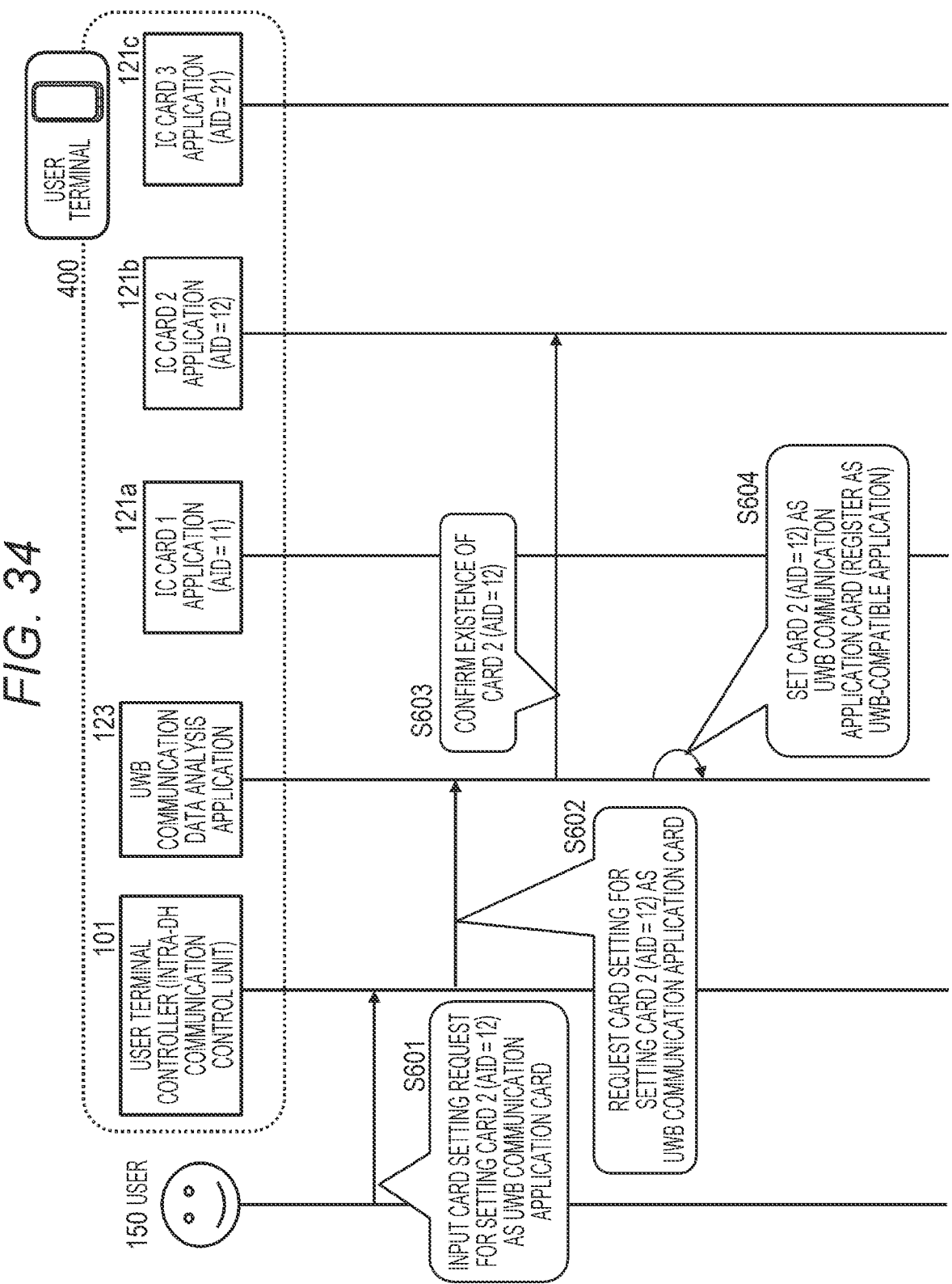
FIG. 34 is a sequence diagram illustrating a processing sequence of processing executed by the user terminal of Example 3 of the present disclosure.

FIG. 34 is a sequence diagram illustrating a processing sequence of registering a UWB-compatible IC card application to the user terminal by the user.

FIG. 34 illustrates a user 150 at the left end and the user terminal 400 on the right side, and illustrates, from the left, as components of the user terminal 400,
the user terminal controller (intra-DH communication control unit) 101,
the UWB communication data analysis application (intra-SE communication control unit) 123,
an IC card 1 application (AID=11) 121a,
an IC card 2 application (AID=12) 121b, and
an IC card 3 application (AID=21) 121c.

Details of each processing of steps S601 to S604 illustrated in FIG. 34 will be sequentially described.
(Steps S601 and S602)
First, in step S601, the user 150 inputs designation information of a specific card application to be registered as a UWB-compatible IC card application.

Note that this processing is executed, for example, in a case where the user registers an IC card application newly installed on the user terminal as a UWB-compatible IC card application.

The user displays information of the newly installed IC card application on a display unit of the user terminal 400, and inputs a registration request for registering the displayed IC card application as a "UWB-compatible IC card application" on the user terminal 400.

For example, an icon with a display such as "register as UWB-compatible IC card application" is tapped.

With this tap processing, attribute information of the IC card application being displayed on the display unit of the user terminal 400 is read from the IC card application, and is input to the UWB communication data analysis application (intra-SE communication control unit) 123 via the user terminal controller (intra-DH communication control unit) 101 in step 3602.

Note that here, as an example, it is assumed that the IC card 2 application (AID=12) 121b with the application identifier (AID)=12 is designated as a registration target.
(Step S603)
Next, in step S603, the UWB communication data analysis application (intra-SE communication control unit) 123 executes existence confirmation of the IC card 2 application (AID=12) designated by the user.

In step S603, the UWB communication data analysis application (intra-SE communication control unit) 123 refers to the IC card application group 121 of the secure element (SE) 120, and checks whether or not the IC card 2 application (AID=12) exists.

If the presence of the IC card 2 application (AID=12) is confirmed, the processing proceeds to step S604.

On the other hand, if the presence of the IC card 2 application (AID=12) is not confirmed, the processing does not proceed to step S604, but an error message is output to the display unit of the user terminal 400, and the processing is terminated.
(Step S604)
If the presence of the IC card 2 application (AID=12) which has been requested by the user to register as the UWB communication application card is confirmed, the processing proceeds to step S604.

In this case, in step S604, the UWB communication data analysis application (intra-SE communication control unit) 123 registers the IC card 2 application (AID=12) in the table described above with reference to FIG. 8, that is, the "UWB-compatible application registration data" table.

With this table registration processing, the IC card 2 application (AID=12) is validated as an IC card application capable of payment processing by UWB communication.

(8-(2) Processing Sequence of Notifying Payment Terminal of UWB-Compatible IC Card Application by User Terminal)

Next, (2) processing sequence of notifying payment terminal of UWB-compatible IC card application by user terminal will be described.

A processing sequence of notifying the payment terminal of a UWB-compatible IC card application by the user terminal will be described with reference to FIGS. 35 to 37.

Figure 35:
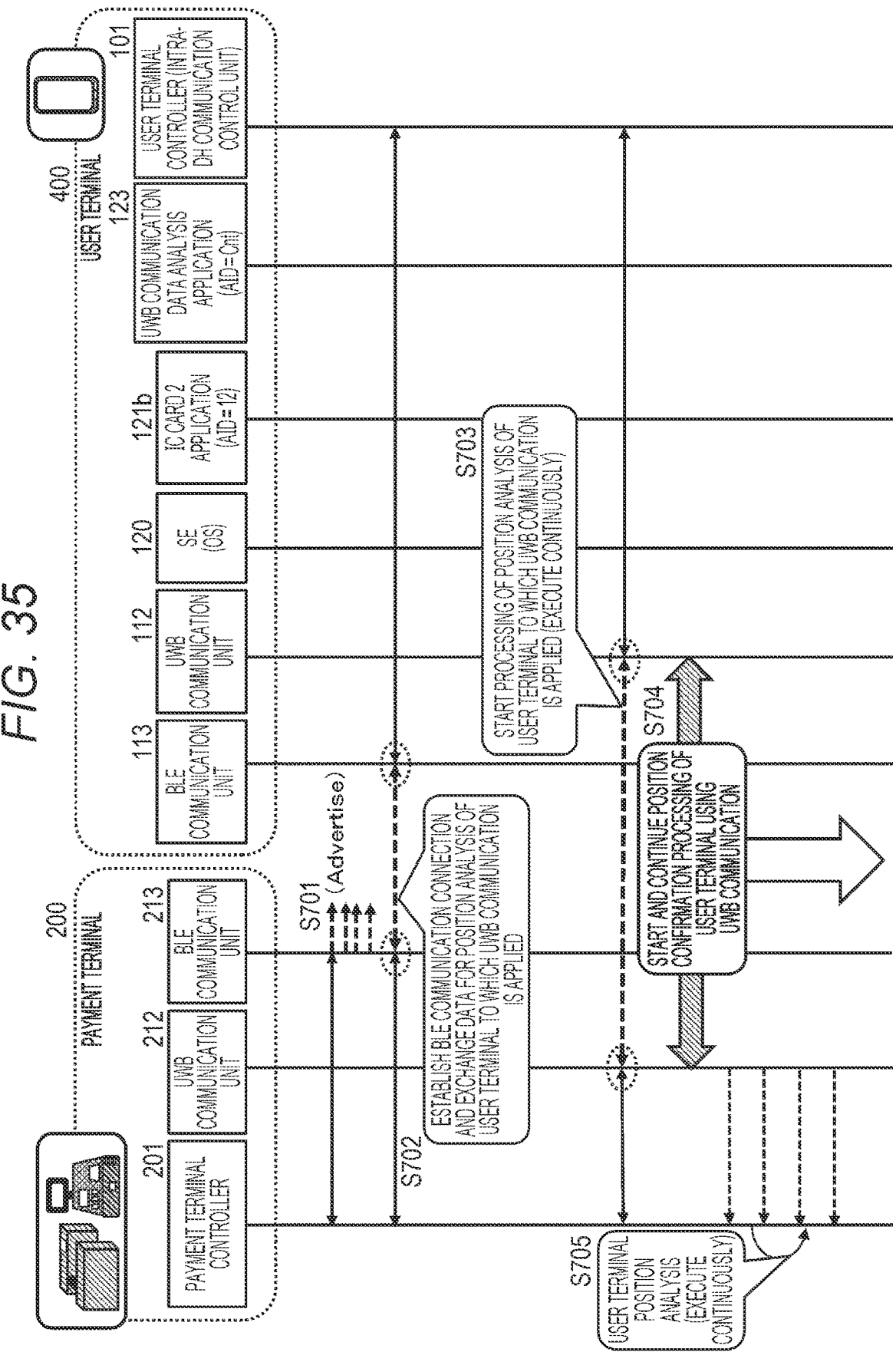
FIG. 35 is a sequence diagram illustrating a processing sequence of processing executed by the user terminal of Example 3 of the present disclosure.
Figure 36:
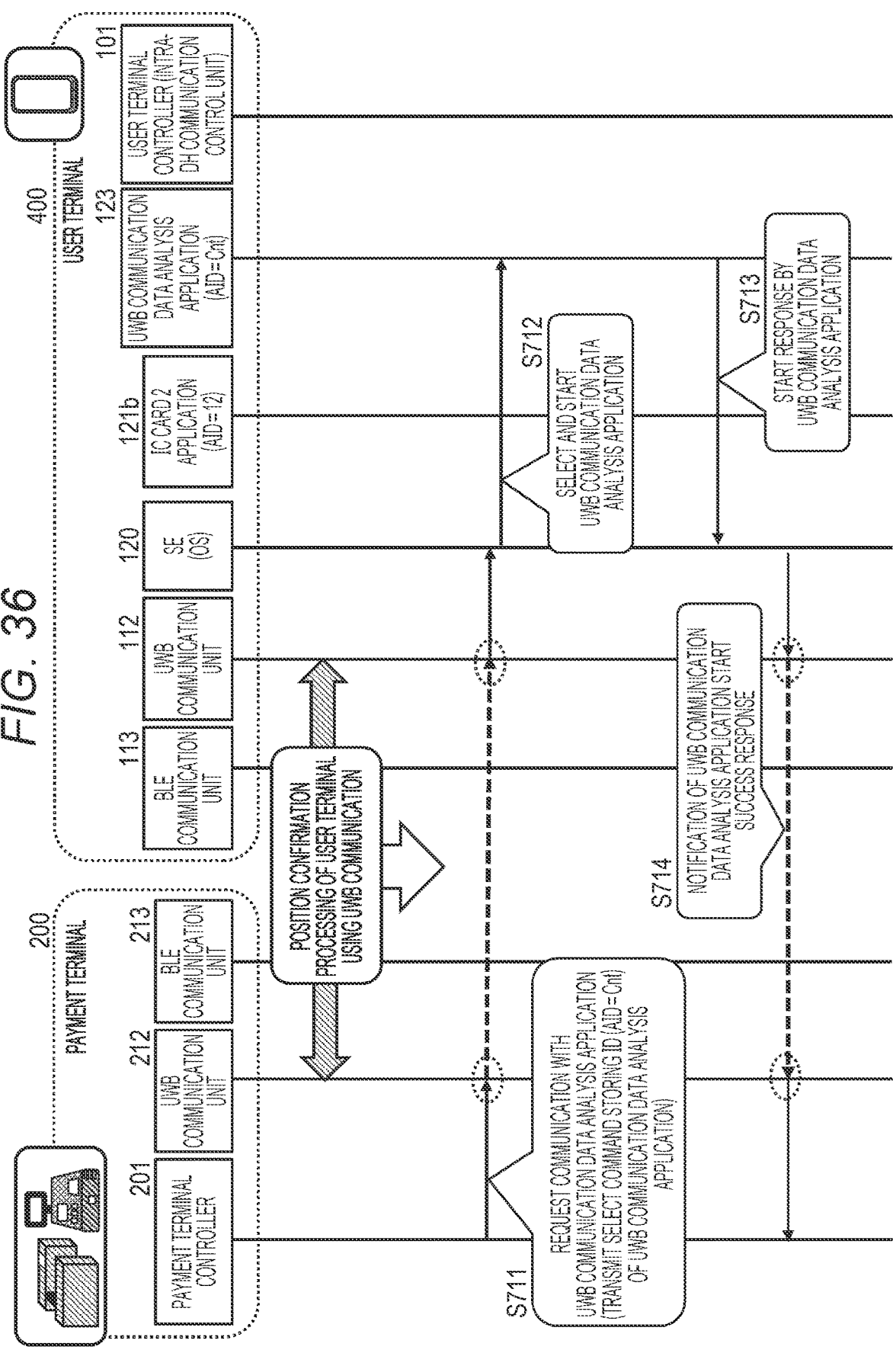
FIG. 36 is a sequence diagram illustrating a processing sequence of processing executed by the user terminal of Example 3 of the present disclosure.
Figure 37:
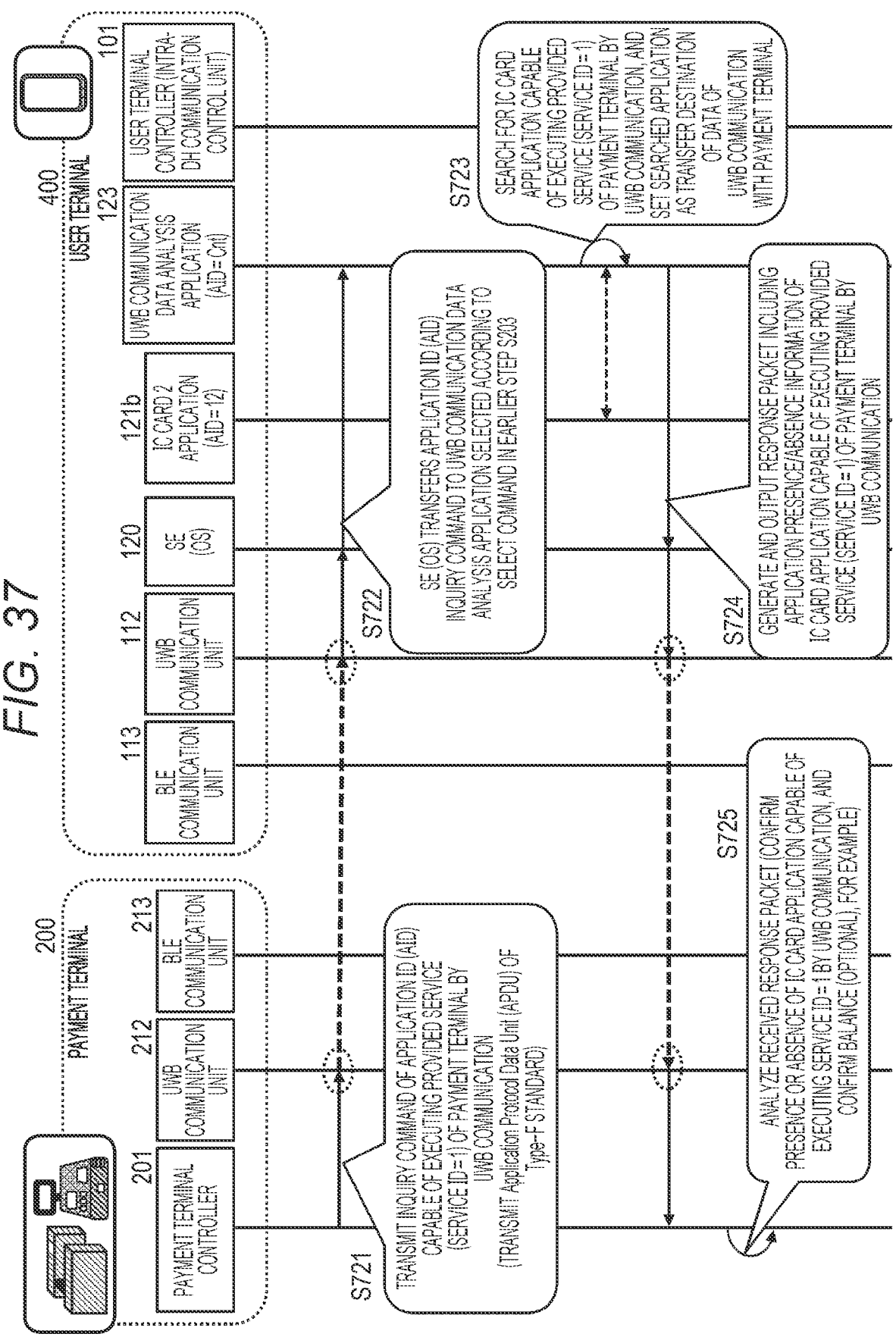
FIG. 37 is a sequence diagram illustrating a processing sequence of processing executed by the user terminal of Example 3 of the present disclosure.

FIGS. 35 to 37 illustrate the payment terminal 200 at the left end and the user terminal 400 on the right side.

As components of the payment terminal 200, from the left, the components of a payment terminal controller 201,
a UWB communication unit 212, and
a BLE communication unit 213 are illustrated.

On the other hand, as components of the user terminal 400, from the left, a BLE communication unit 113,
the UWB communication unit 112,
the secure element (SE-OS) 120,
the IC card 2 application (AID=12) 121b,
the UWB communication data analysis application (intra-SE communication control unit) 123, and
the user terminal controller (intra-DH communication control unit) 101 are illustrated.

Details of the processing of step S701 and subsequent steps illustrated in FIGS. 35 to 37 will be sequentially described.

(Step S701)

First, in step S701, the payment terminal controller 201 of the payment terminal 200 broadcasts an advertise packet, which is a user terminal detection and BLE communication connection establishment request packet, from the BLE communication unit 213.

As described above, in the BLE communication standard, an ADV_IND packet (general advertising indication packet) is defined as a broadcast packet for device detection.

In step S701, the payment terminal 200 broadcasts an advertise packet from the BLE communication unit 213.

(Step S702)

When receiving the advertise packet transmitted by the payment terminal 200, the user terminal 400 that has entered the BLE communicable area (e.g., several tens of meters) transmits a response packet including a user terminal identifier to the payment terminal 200 in step S702. The payment terminal 200 detects the user terminal 400 by acquiring the user terminal identifier from the response packet transmitted from the user terminal 400.

When the user terminal is detected, the payment terminal 200 performs processing of acquiring user terminal position analysis data from the user terminal 400 in order to start position identification processing of the user terminal 400 next.

As described above, the payment terminal controller 201 of the payment terminal 200 uses ultra wide band (UWB) communication to perform the position identification processing of the user terminal 400.

(Steps S703 to S705)

Next, in step S703, the payment terminal controller 201 of the payment terminal 200 starts user terminal position identification processing to which UWB communication is applied with the UWB communication unit 112 of the user terminal 400 via the UWB communication unit 212.

As described above, UWB communication defines a "secure ranging" method for analyzing a device position while maintaining security. "Secure ranging" is a technology that enables secure measurement of a distance and an angle between communication devices by transmitting and receiving encrypted data using a common key.

When detecting the user terminal by BLE communication in steps S701 and S702, the payment terminal 200 outputs a UWB communication signal for identifying the position of the detected user terminal 400 in step S703, establishes communication between the UWB communication unit 212 of the payment terminal 200 and the UWB communication unit 112 of the user terminal 400, starts the position identification processing of the user terminal 400, and then continuously executes the user terminal position identification processing.

Note that, as described above, the UWB communication unit 212 of the payment terminal 200 performs data analysis of time of arrival (ToA) and angle of arrival (AoA) in secure ranging by UWB communication.

Time of arrival (ToA) corresponds to a transmission/reception time of a UWB signal, and the payment terminal controller 201 of the payment terminal 200 analyzes the distance from the payment terminal 200 to the user terminal 400 on the basis of the time.

Angle of arrival (AoA) is angle information input from a transmission signal of the user terminal 400 to the payment terminal 200. The payment terminal controller 201 of the payment terminal 200 analyzes the direction of the user terminal 400 on the basis of this angle.

The payment terminal controller 201 of the payment terminal 200 identifies the position of the user terminal 400 by analyzing the ToA and the AoA.

Note that the payment terminal controller 201 of the payment terminal 200 continuously executes the user terminal position identification processing after the detection of the user terminal 400 until the payment processing is started or ended, such as until the user passes through the ticket gate where the payment terminal 200 is installed.

In parallel with execution of secure ranging by UWB communication, the payment terminal controller 201 of the payment terminal 200 executes selection of the IC card application and communication with the IC card application by UWB communication to perform payment processing and the like.

(Step S711)

Next, processing in step S711 illustrated in FIG. 36 will be described.

In step S711, the payment terminal controller 201 of the payment terminal 200 outputs a communication request packet to communicate with the UWB communication data analysis application (intra-SE communication control unit) 123 of the user terminal 400 by UWB communication via the UWB communication unit 212.

This communication request packet is a UWB communication packet storing a SELECT command in which the application ID (AID=Cnt) of the UWB communication data analysis application (intra-SE communication control unit) 123 is recorded. Note that a SELECT command is a command defined by ISO 7816-4, and is a command that stores an application ID (AID) of a communication request target application in a packet and requests a designated application as a communication partner.

(Step S712)

When receiving the SELECT command packet transmitted from the payment terminal 200 in step S711, the UWB communication unit 112 of the user terminal 400 passes the received packet to the secure element (SE-OS) 120.

The secure element (SE-OS) 120 recognizes the SELECT command in the packet and acquires the application ID (AID=Cnt) of the communication request target application stored in the packet.

The AID is an application ID (AID=Cnt) of the UWB communication data analysis application (intra-SE communication control unit) 123.

The secure element (SE-OS) 120 selects and starts an application corresponding to the AID=Cnt, that is, the UWB communication data analysis application (intra-SE communication control unit) 123.

(Step S713)

The UWB communication data analysis application (intra-SE communication control unit) 123 started by the application selection and start processing by the secure element (SE-OS) 120 in step S712 outputs a start response indicating the start to the secure element (SE-OS) 120 in step S713.

(Step S714)

In step S714, the secure element (SE-OS) 120 that has received the start response from the UWB communication data analysis application (intra-SE communication control unit) 123 notifies the payment terminal 200 via the UWB communication unit 112 that the start processing of the UWB communication data analysis application (intra-SE communication control unit) 123 has succeeded.

This notification data is input to the payment terminal controller 201 via the UWB communication unit 212 of the payment terminal 200, and the payment terminal controller 201 confirms that UWB communication with the UWB communication data analysis application (intra-SE communication control unit) 123 of the user terminal 400 is enabled.

(Step 3721)

When the payment terminal controller 201 confirms that UWB communication with the UWB communication data analysis application (intra-SE communication control unit) 123 of the user terminal 400 has been enabled, the payment terminal controller 201 performs the following processing in step 3721.

The payment terminal controller 201 transmits an inquiry command of the IC card application ID (AID) to the user terminal 400 via the UWB communication unit 212.

In other words, a command for inquiring an application ID (AID) capable of executing payment processing corresponding to the provided service (service ID=1) of the payment terminal 200 by UWB communication is transmitted.

Note that the AID inquiry command of the IC card application is transmitted using an application protocol data unit (APDU) defined as a packet frame usable in UWB communication.

The APDU is a packet frame configuration defined in ISO 7816-4, and is a packet frame configuration usable in UWB communication.

(Step S722)

In step S722, the UWB communication unit 112 of the user terminal 400 receives the IC card application ID (AID) inquiry command transmitted by the payment terminal 200, and inputs the received command to the UWB communication data analysis application (intra-SE communication control unit) 123 via the secure element OS (SE-OS) 120.

The secure element OS (SE-OS) 120 inputs an IC card application ID (AID) inquiry command to the started UWB communication data analysis application (intra-SE communication control unit) 123 according to the application ID (AID=Cnt) in the SELECT command received from the payment terminal 200 in step S711.

(Step S723)

The UWB communication data analysis application (intra-SE communication control unit) 123 that has received the IC card application ID (AID) inquiry command transmitted by the payment terminal 200 executes the following processing in step S723.

The UWB communication data analysis application (intra-SE communication control unit) 123 searches for an IC card application capable of executing a provided service (service ID=1) of the payment terminal 200 by UWB communication, and sets the searched application as a transfer destination of data of UWB communication with the payment terminal 200.

For example, the IC card application capable of executing the provided service (service ID=1) of the payment terminal 200 by UWB communication is searched with reference to the IC card application registration data described above with reference to FIGS. 8 and 21.

In the example illustrated in FIG. 8, the application ID (AID) of the IC card application capable of executing the service ID=1 by UWB communication is AID=12, and the UWB communication data analysis application (intra-SE communication control unit) 123 sets this IC card application (IC card 2 application (AID=12) 121b) as the transfer destination of data of UWB communication with the payment terminal 200.

(Step S724)

Next, in step S724, the UWB communication data analysis application (intra-SE communication control unit) 123 generates a response packet storing search result information (application presence/absence information) of an IC card application capable of executing service ID=1 searched in step S723 by UWB communication, and transmits the response packet to the payment terminal 200.

The response packet is transmitted from the UWB communication data analysis application (intra-SE communication control unit) 123 via the secure element OS (SE-OS) 120 and the UWB communication unit 112, received by the UWB communication unit 212 of the payment terminal 200, and input to the payment terminal controller 201.

Figure 38:
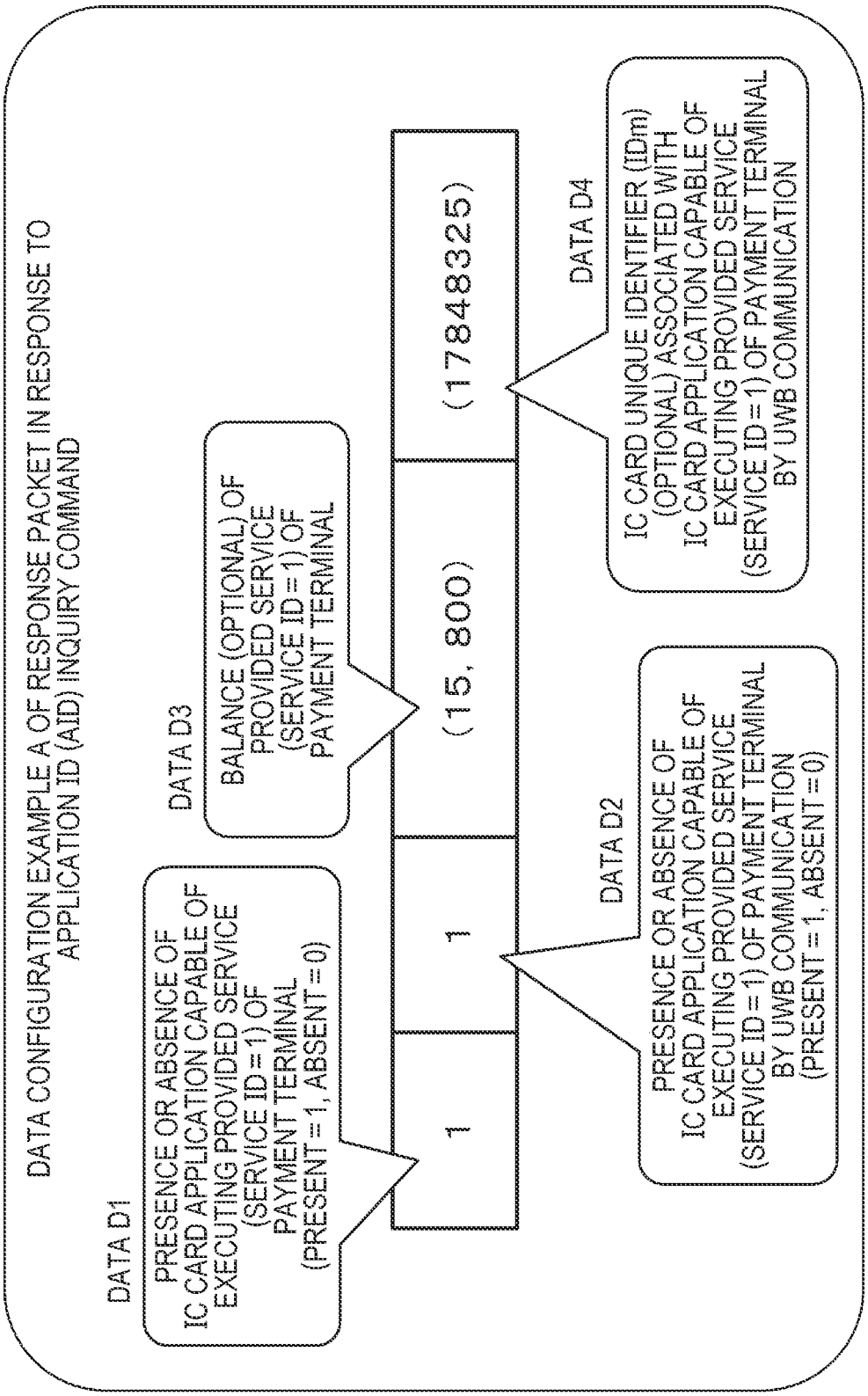
FIG. 38 is a diagram illustrating a data configuration example of a packet transmitted from the user terminal to the payment terminal of Example 3 of the present disclosure.

FIG. 38 illustrates an example of a data configuration of a response packet generated by the UWB communication data analysis application (intra-SE communication control unit) 123 of the user terminal 400 in response to an IC card application ID (AID) inquiry command from the payment terminal 200.

As illustrated in FIG. 38, the response packet is configured as, for example, a packet storing the following data.

(Data D1) Presence or absence of an IC card application capable of executing processing corresponding to the provided service (service ID=1) of the payment terminal 200 (present=1, absent=0)

(Data D2) Presence or absence of an IC card application capable of executing the provided service (service ID=1) of the payment terminal 200 by UWB communication (present=1, absent=0)

(Data D3) Balance (optional) corresponding to the provided service (service ID=1) of the payment terminal 200

(Data D4) An IC card unique identifier (IDm) (optional) associated with an IC card application capable of executing the provided service (service ID=1) of the payment terminal 200 by UWB communication.

(Data D1) is data indicating the presence or absence of an IC card application capable of executing processing corresponding to the provided service (service ID=1) of the payment terminal 200 regardless of whether it is executed by UWB communication, and one of values of present=1 and absent=0 is set.

(Data D2) is data indicating the presence or absence of an IC card application capable of executing the provided service (service ID=1) of the payment terminal 200 by UWB communication, and one of values of present=1 and absent=0 is set.

(Data D3) and (Data D4) are optional data and are not essential.

(Data D3) is the balance corresponding to the provided service (service ID=1) of the payment terminal 200.

(Data D4) is an IC card unique identifier (IDm) associated with an IC card application capable of executing the provided service (service ID=1) of the payment terminal 200 by UWB communication.

Note that an IC card unique identifier (IDm) is a unique identifier of the IC card application installed in the user terminal 400, and is an identifier different for each user terminal even for applications of the same type.

On the other hand, an application ID (AID) is an ID set according to the type of application, and the same ID (AID) is set for the same application even if the user terminals 400 are different.

Balance information of (Data D3), that is, the balance corresponding to the provided service (service ID=1) of the payment terminal 200 is recorded in the secure memory in the secure element (SE) 200, and the UWB communication data analysis application (intra-SE communication control unit) 123 reads the balance from the secure memory and records the balance in a response packet.

As the IC card unique identifier (IDm) of (Data D4), that is, the IC card unique identifier (IDm) associated with the IC card application capable of executing the provided service (service ID=1) of the payment terminal 200 by UWB communication, the UWB communication data analysis application (intra-SE communication control unit) 123 reads attribute information of the IC card application of AID=12 in the IC card application group 121 of the secure memory 200 and records the attribute information in a response packet.

Note that the data example of a response packet illustrated in FIG. 38 is an example of a response packet in a case where the user terminal 400 has an IC card application capable of executing the provided service (service ID=1) of the payment terminal 200 by UWB communication.

A response packet in a case where the user terminal 400 does not have an IC card application capable of executing the provided service (service ID=1) of the payment terminal 200 by UWB communication has a data configuration in which all of Data D1 to D4 illustrated in FIG. 38 is set to 0, for example.

As described above, in step S724, the UWB communication data analysis application (intra-SE communication control unit) 123 generates a response packet storing search result information (application presence/absence information) of an IC card application capable of executing service ID=1 searched in step S723 by UWB communication, and transmits the response packet to the payment terminal 200.

(Step S725)

In step S725, the payment terminal controller 201 of the payment terminal 200 that has received the response packet from the user terminal 400 executes analysis processing of the received response packet. Specifically, presence or absence of an IC card application capable of executing service ID=1 by UWB communication is confirmed.

Note that in a case where balance information is recorded in the response packet, balance confirmation processing or the like is also executed.

(8-(3) Processing Sequence of Payment by UWB Communication Between UWB-Compatible IC Card Application of User Terminal and Payment Terminal)

Next, (3) processing sequence of payment by UWB communication between UWB-compatible IC card application of user terminal and payment terminal will be described.

A processing sequence of payment by UWB communication between a UWB-compatible IC card application of the user terminal and the payment terminal will be described with reference to FIGS. 39 and 40.

Figure 39:
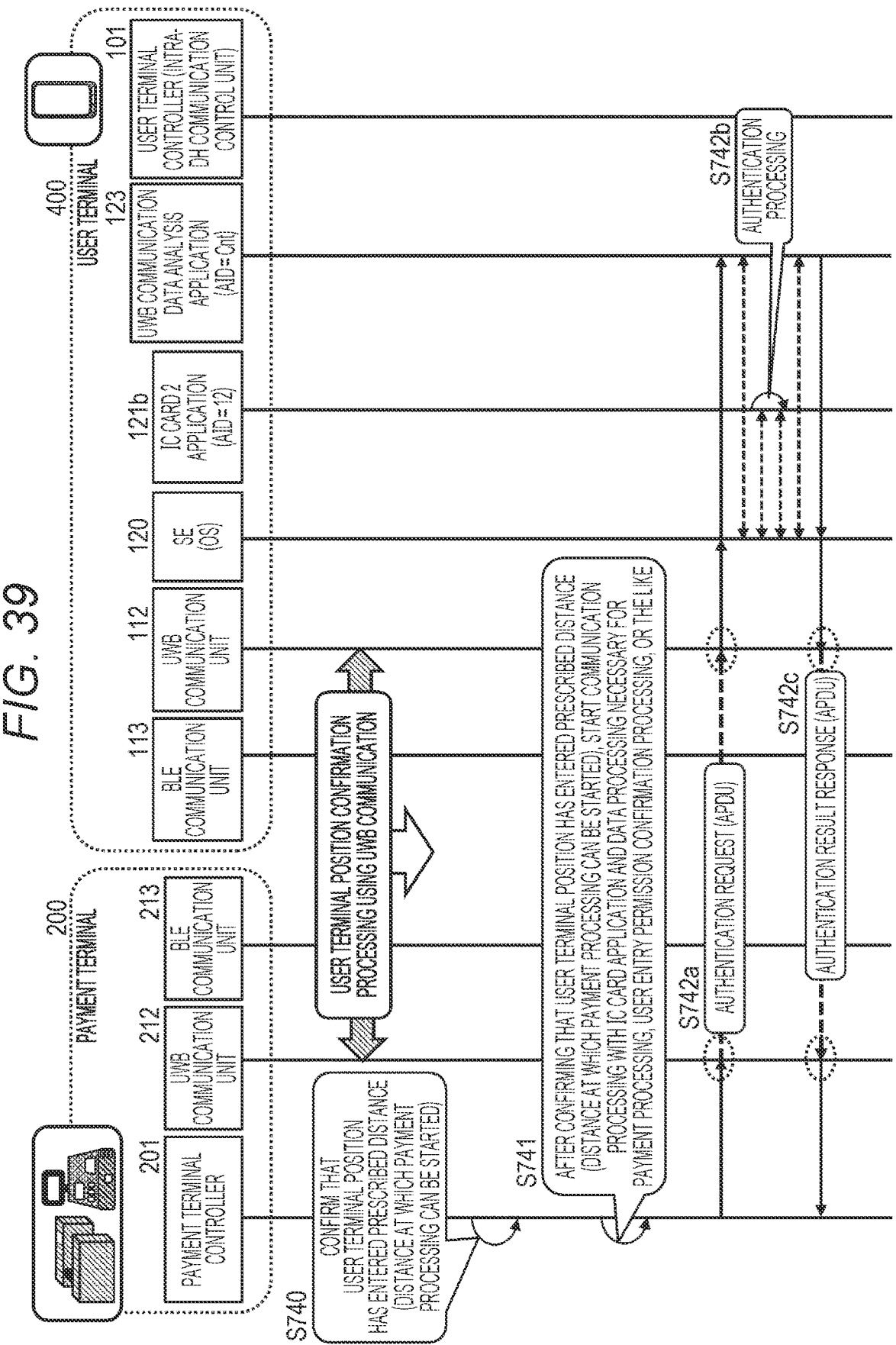
FIG. 39 is a sequence diagram illustrating a processing sequence of processing executed by the user terminal of Example 3 of the present disclosure.
Figure 40:
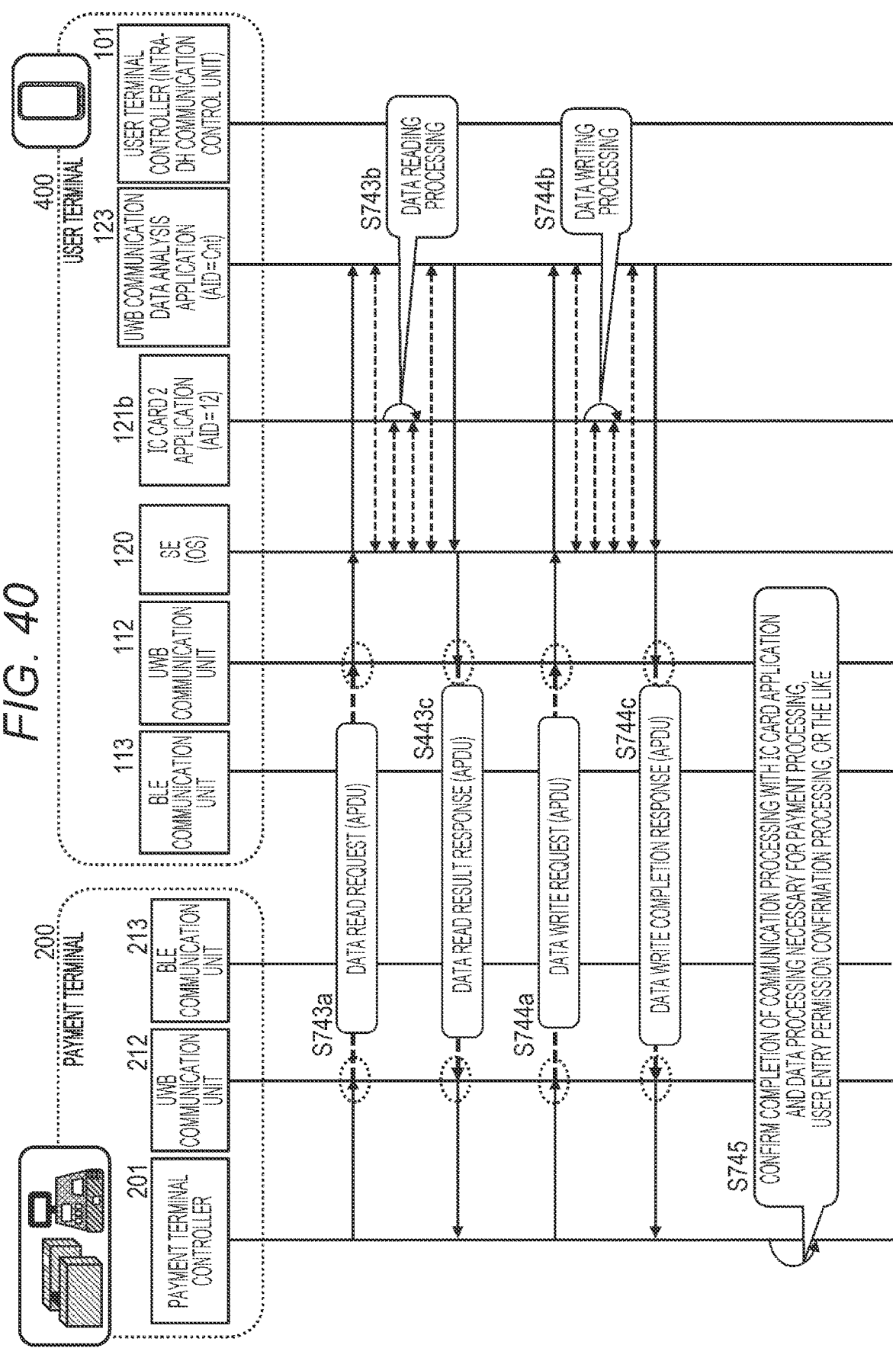
FIG. 40 is a sequence diagram illustrating a processing sequence of processing executed by the user terminal of Example 3 of the present disclosure.

FIGS. 39 and 40 illustrate the payment terminal 200 at the left end and the user terminal 400 on the right side.

As components of the payment terminal 200, from the left, the components of the payment terminal controller 201,
the UWB communication unit 212, and
the BLE communication unit 213 are illustrated.

On the other hand, as components of the user terminal 400, from the left, the BLE communication unit 113,
the UWB communication unit 112,
the secure element (SE-OS) 120,
the IC card 2 application (AID=12) 121b,
the UWB communication data analysis application (intra-SE communication control unit) 123, and
the user terminal controller (intra-DH communication control unit) 101 are illustrated.

Details of the processing of step S740 and subsequent steps illustrated in FIGS. 39 and 40 will be sequentially described.

Note that at the start of step S731, the payment terminal 200 and the user terminal 400 have established a UWB communication session, and the payment terminal 200 is continuing the user terminal position confirmation processing to which UWB communication is applied.

(Step S740)

First, in step S740, the payment terminal controller 201 of the payment terminal 200 refers to the result of user terminal position confirmation by UWB communication to confirm whether or not the user terminal 400 has entered a prescribed distance defined in advance, such as the inside of a ticket gate, and upon confirmation, the processing of step S741 and subsequent steps (payment processing) is started.

(Step S741)

After confirming that the user terminal 400 has entered the prescribed distance, the payment terminal controller 201 of the payment terminal 200 starts, in step S741, communication processing with the IC card application and data processing necessary for the payment processing, the user entry permission confirmation processing, or the like.

(Steps S742 to S744)

The processing of steps S742 to S744 is a sequence of authentication and payment processing of executing communication between the payment terminal controller 201 of the payment terminal 200 and the IC card 2 application (AID=12) 121b corresponding to UWB communication of the user terminal 400 via the UWB communication data analysis application (intra-SE communication control unit) 123 of the user terminal 400.

For example, a series of processing of
authentication processing in steps S742a to S742c,
data reading processing from the user terminal 400 in steps S743a to S743c, and
data writing processing to the user terminal 400 in steps S744a to S744c is performed.

Note that the series of processing is executed using UWB communication. For example, transmission is performed using an application protocol data unit (APDU) defined as a packet frame usable in UWB communication. As described above, the APDU is a packet frame configuration defined in ISO 7816-4 and is a packet frame configuration usable in UWB communication.

In the data reading processing from the user terminal 400 in steps S743a to S743c, for example, balance information corresponding to the IC card 2 application (AID=12) 121b is read from the secure memory in the secure element 120 of the user terminal 400.

In the data writing processing to the user terminal 400 in steps S744a to S744c, for example, processing of updating balance information corresponding to the IC card 2 application (AID=12) 121b of the secure memory in the secure element 120 of the user terminal 400, that is, processing of writing an updated amount obtained by subtracting the payment amount is executed.

(Step S745)

When the series of processing in steps S742 to S744 is completed, in step S745, the payment terminal controller 201 of the payment terminal 200 confirms completion of communication processing with the IC card application and data processing necessary for the payment processing, the user entry permission confirmation processing, or the like, and ends the processing.

Note that in the case of a ticket gate, for example, when the series of processing in steps S742 to S744 is completed, processing of opening the door of the gate or the like is executed to allow passage of the user.

Next, a sequence of processing executed by the UWB communication data analysis application of the user terminal 400 in response to an inquiry about the application ID (AID) of the UWB communication-compatible IC card application from the payment terminal 200 will be described with reference to a flowchart illustrated in FIG. 41.

Figure 41:
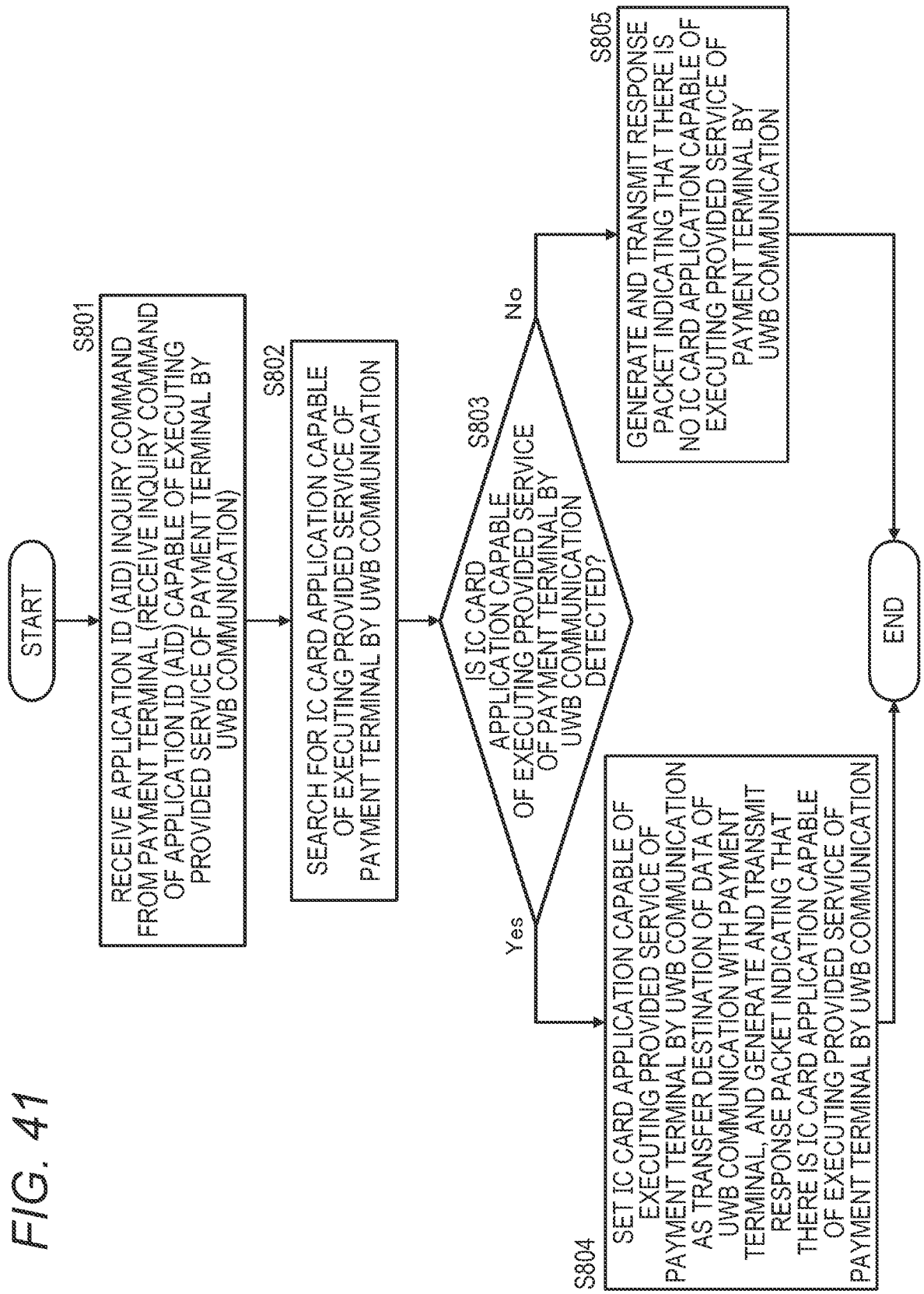
FIG. 41 is a flowchart illustrating a processing sequence of processing executed by the user terminal of Example 3 of the present disclosure.

That is, the flowchart illustrated in FIG. 41 is a detailed sequence of processing executed in steps S722 to S724 illustrated in FIG. 37.

The processing of each step of the flowchart illustrated in FIG. 41 will be sequentially described.

(Step S801)

First, in step S801, the UWB communication data analysis application (intra-SE communication control unit) 123 of the user terminal 400 receives an IC card application ID (AID) inquiry command transmitted by the payment terminal 200.

Note that the IC card application ID (AID) inquiry command transmitted by the payment terminal 200 is input to the UWB communication data analysis application (intra-SE communication control unit) 123 via the UWB communication unit 112 and the secure element OS (SE-OS) 120 of the user terminal 400.

(Step S802)

In step S802, the UWB communication data analysis application (intra-SE communication control unit) 123 that has received the IC card application ID (AID) inquiry command transmitted by the payment terminal 200 searches for an IC card application capable of executing the provided service of the payment terminal 200 by UWB communication.

For example, the application ID (AID) of the IC card application capable of executing the provided service of the payment terminal 200 by UWB communication is searched with reference to the UWB-compatible application registration data described above with reference to FIG. 8.

(Step S803)

Step S803 is a determination step.

If an IC card application capable of executing the provided service of the payment terminal 200 by UWB communication is detected in the search processing in step S802, the processing proceeds to step S804.

On the other hand, if it is not detected, the processing proceeds to step S805.

(Step S804)

If an IC card application capable of executing the provided service of the payment terminal 200 by UWB communication is detected in the search processing in step S802, the processing in step S804 is executed.

In this case, in step S804, the UWB communication data analysis application (intra-SE communication control unit) 123 sets the application searched in the search processing in step S802 as the transfer destination of data of UWB communication with the payment terminal 200. Moreover, a response packet indicating that there is an IC card application capable of executing the provided service of the payment terminal 200 by UWB communication is generated and transmitted to the payment terminal 200.

The response packet generated by the UWB communication data analysis application (intra-SE communication control unit) 123 is configured as, for example, a packet storing the following data described above with reference to FIG. 38.

(Data D1) Presence or absence of an IC card application capable of executing processing corresponding to the provided service of the payment terminal 200 (present=1, absent=0)

(Data D2) Presence or absence of an IC card application capable of executing the provided service of the payment terminal 200 by UWB communication (present=1, absent=0)

(Data D3) Balance (optional) corresponding to the provided service of the payment terminal 200

(Data D4) An IC card unique identifier (IDm) (optional) associated with an IC card application capable of executing the provided service of the payment terminal 200 by UWB communication (Step S805)

On the other hand, if no IC card application capable of executing the provided service of the payment terminal 200 by UWB communication is detected in the search processing in step S802, the processing in step S805 is executed.

In this case, in step S805, the UWB communication data analysis application (intra-SE communication control unit) 123 generates a response packet indicating that no IC card application capable of executing the provided service of the payment terminal 200 by UWB communication has been detected, and transmits the response packet to the payment terminal 200.

When the UWB communication data analysis application (intra-SE communication control unit) 123 generates a response packet indicating that there is an IC card application capable of executing the provided service of the payment terminal 200 by UWB communication and transmits the response packet to the payment terminal 200 in step S804, thereafter, the payment terminal 200 starts the payment processing by UWB communication.

Note that in this example, the payment terminal 200 performs UWB communication with the UWB communication data analysis application (intra-SE communication control unit) 123 of the user terminal 400.

As described above, in the present example, the UWB communication data analysis application (intra-SE communication control unit) 123 notifies the payment terminal 200 of presence/absence information of an IC card application capable of executing the provided service of the payment terminal 200 by UWB communication instead of notifying the payment terminal 200 of the application ID (AID) of an IC card application capable of executing the provided service of the payment terminal 200 by UWB communication.

Thereafter, the payment terminal 200 executes communication with the IC card application capable of executing the provided service of the payment terminal 200 by UWB communication via the UWB communication data analysis application (intra-SE communication control unit) 123 of the user terminal 400, and performs authentication processing and payment processing by UWB communication.

With this configuration, the user terminal 400 and the payment terminal 200 can start communication at a distance within several meters at which UWB communication is possible without approaching up to several centimeters at which NFC communication is possible and perform payment processing. For example, the user can perform payment processing and pass through a gate such as a ticket gate without taking out the user terminal 400 such as a smartphone from a bag.

Furthermore, payment processing using a store terminal can also be performed without taking out the user terminal 400 such as a smartphone.

9. Hardware Configuration Example of Communication Processing Device

Next, a hardware configuration example of a communication processing device forming a user terminal or a payment terminal of the present disclosure will be described.

FIG. 42 is a diagram illustrating a configuration example of hardware of a communication processing device forming a user terminal or a payment terminal of the present disclosure.

The hardware configuration illustrated in FIG. 42 will be described.

A central processing unit (CPU) 501 functions as a control unit or a data processing unit that performs various processing according to a program stored in a read only memory (ROM) 502 or a storage unit 508. For example, the processing according to the sequences described in the above examples are executed. A random access memory (RAM) 503 stores programs and data executed by the CPU 501, for example. The CPU 501, the ROM 502, and the RAM 503 are mutually connected by a bus 504.

The CPU 501 is connected to an input/output interface 505 via the bus 504. The input/output interface 505 is connected to an input unit 506 including various switches, a UI, a keyboard, a mouse, a microphone, and a camera, and an output unit 507 including a display and a speaker. The CPU 501 executes various processing in response to commands input from the input unit 506, and outputs the processing results to the output unit 507, for example.

The storage unit 508 connected to the input/output interface 505 includes, for example, a flash memory, a hard disk, or the like, and stores programs and various data executed by the CPU 501. The communication unit 509 functions as a transmission/reception unit for Wi-Fi communication, Bluetooth (registered trademark) (BT) communication, UWB communication, and other data communication via a network such as the Internet or a local area network, and communicates with an external device.

A drive 510 connected to the input/output interface 505 drives a removable medium 511 such as a magnetic disk, an optical disk, a magneto-optical disk, or a semiconductor memory such as a memory card, and records or reads data.

10. Summary of Configuration of Present Disclosure

As described above, the examples of the present disclosure have been described in detail with reference to the specific examples. However, it is self-evident a person skilled in the art can modify or substitute the examples without departing from the gist of the present disclosure. That is, the present invention has been disclosed in the form of an example, and should not be construed in a limited manner. In order to determine the gist of the present disclosure, the column of claims should be taken into consideration.

Note that the technology disclosed in the present specification can have the following configurations.

(1) A communication processing device including a communication control unit that executes search processing as to whether or not the own device has a specific communication scheme-compatible IC card application capable of executing data processing accompanied by communication according to a specific communication scheme on the basis of received data from an external device, notifies the external device of a search processing result in a case where a specific communication scheme-compatible IC card application is detected as a result of the search processing, and causes the external device and the detected specific communication scheme-compatible IC card application to execute data processing accompanied by communication according to the specific communication scheme.

(2) The communication processing device according to (1), in which the communication control unit notifies the external device of an application ID (AID) of a detected specific communication scheme-compatible IC card application in a case where the specific communication scheme-compatible IC card application is detected as a result of the search processing.

(3) The communication processing device according to (2), in which the communication control unit receives, from the external device, a select command storing the application ID (AID) of the specific communication scheme-compatible IC card application, and executes processing of determining an IC card application to be started according to the application ID (AID) stored in the received select command.

(4) The communication processing device according to (3), in which the IC card application includes an IC card application stored in a secure memory, and the communication control unit outputs the application ID (AID) acquired from the select command to a secure memory OS that executes start control of the IC card application stored in the secure memory.

(5) The communication processing device according to (4), in which
the secure memory OS
executes start processing of an IC card application corresponding to the application ID (AID) input from the communication control unit.

(6) The communication processing device according to any one of (1) to (5), in which
the communication control unit
causes execution of communication processing between the external device and the specific communication scheme-compatible IC card application without executing relay processing of communication data between the external device and the specific communication scheme-compatible IC card application, after start of the specific communication scheme-compatible IC card application.

(7) The communication processing device according to any one of (1) to (6), in which
the communication control unit
executes relay processing of communication data between the external device and the specific communication scheme-compatible IC card application, after start of the specific communication scheme-compatible IC card application.

(8) The communication processing device according to (7), in which
communication data between the external device and the specific communication scheme-compatible IC card application
includes communication data according to an ultra wide band (UWB) communication scheme or a Bluetooth low energy (BLE) communication scheme, and
the communication control unit
executes relay processing of communication data according to the UWB communication scheme or the BLE communication scheme.

(9) The communication processing device according to any one of (1) to (8), in which
the communication control unit
sets a detected specific communication scheme-compatible IC card application as a communication counterpart of the external device according to the specific communication scheme in a case where the specific communication scheme-compatible IC card application is detected as a result of the search processing.

(10) The communication processing device according to any one of (1) to (9), in which
the communication control unit
notifies the external device of application existence information indicating that a specific communication scheme-compatible IC card application is present in a case where the specific communication scheme-compatible IC card application is detected as a result of the search processing.

(11) The communication processing device according to any one of (1) to (10), in which
the specific communication scheme includes an ultra wide band (UWB) communication scheme, and
the communication control unit
executes search processing for a UWB communication scheme-compatible IC card application.

(12) The communication processing device according to any one of (1) to (11), in which
the IC card application
includes an IC card application stored in a secure memory, and
the communication control unit
includes a communication control unit formed in the secure memory.

(13) The communication processing device according to any one of (1) to (12), in which
the IC card application
includes an IC card application stored in a secure memory, and
the communication control unit
includes a communication control unit formed outside the secure memory.

(14) The communication processing device according to any one of (1) to (13) further including
a memory that stores application registration data in which the specific communication scheme-compatible IC card application is registered, in which
the communication control unit
executes search processing as to whether or not a specific communication scheme-compatible IC card application is present by referring to the application registration data.

(15) The communication processing device according to any one of (1) to (14), in which
the external device includes a payment terminal, and
the communication processing device executes payment processing by communication with the payment terminal.

(16) A communication processing system including a user terminal and a payment terminal, in which:
the user terminal
executes search processing as to whether or not the own device has a specific communication scheme-compatible IC card application capable of executing data processing accompanied by communication according to a specific communication scheme on the basis of received data from the payment terminal, and
transmits a search processing result to the payment terminal in a case where a specific communication scheme-compatible IC card application is detected as a result of the search processing;
the payment terminal
transmits a data processing request designating a specific communication scheme-compatible IC card application as a communication partner to the user terminal after receiving the search processing result; and
the user terminal
executes data processing using communication data according to the specific communication scheme between the payment terminal and the specific communication scheme-compatible IC card application in response to the data processing request from the payment terminal.

(17) The communication processing system according to (16), in which
the user terminal
transmits an application ID (AID) of a detected specific communication scheme-compatible IC card application to the payment terminal in a case where the specific communication scheme-compatible IC card application is detected as a result of the search processing, the payment terminal transmits a select command storing the application ID (AID) of the specific communication scheme-compatible IC card application to the user terminal, and the user terminal determines and starts an IC card application to be started according to the application ID (AID) stored in the select command received from the payment terminal.

(18) A communication control method executed in a communication processing device, the communication control method including a communication control unit executing search processing as to whether or not the own device has a specific communication scheme-compatible IC card application capable of executing data processing accompanied by communication according to a specific communication scheme on the basis of received data from an external device, notifying the external device of a search processing result in a case where a specific communication scheme-compatible IC card application is detected as a result of the search processing, and causing the external device and the detected specific communication scheme-compatible IC card application to execute data processing accompanied by communication according to the specific communication scheme.

(19) A communication control method executed in a communication processing system including a user terminal and a payment terminal, the communication control method including:

the user terminal executing search processing as to whether or not the own device has a specific communication scheme-compatible IC card application capable of executing data processing accompanied by communication according to a specific communication scheme on the basis of received data from the payment terminal, and transmitting a search processing result to the payment terminal in a case where a specific communication scheme-compatible IC card application is detected as a result of the search processing;

the payment terminal transmitting a data processing request designating a specific communication scheme-compatible IC card application as a communication partner to the user terminal after receiving the search processing result; and the user terminal executing data processing using communication data according to the specific communication scheme between the payment terminal and the specific communication scheme-compatible IC card application in response to the data processing request from the payment terminal.

(20) A program for causing a communication processing device to execute information processing, the program causing a communication control unit to execute search processing as to whether or not the own device has a specific communication scheme-compatible IC card application capable of executing data processing accompanied by communication according to a specific communication scheme on the basis of received data from an external device, processing of notifying the external device of a search processing result in a case where a specific communication scheme-compatible IC card application is detected as a result of the search processing, and data processing accompanied by communication according to the specific communication scheme executed between the external device and the detected specific communication scheme-compatible IC card application.

Furthermore, the series of processing described in the specification can be executed by hardware, software, or a combined configuration of both. In the case of executing processing by software, a program in which a processing sequence is recorded can be installed and executed in a memory of a computer incorporated in dedicated hardware, or the program can be installed and executed by a general-purpose computer that can execute various processing. For example, the program can be pre-recorded on a recording medium. In addition to installing on a computer from a recording medium, the program can be received through a network such as a local area network (LAN) and the Internet and be installed on a recording medium such as a built-in hard disk.

Note that the various processing described in the specification is not only performed in chronological order according to the description, but may also be performed in parallel or individually according to the processing capacity of the device that performs the processing or as necessary. Additionally, in the present specification, a system is a logical set configuration of a plurality of devices, and the devices having the configurations do not necessarily have to be in the same housing.

INDUSTRIAL APPLICABILITY

As described above, according to the configuration of an example of the present disclosure, in a case where a user terminal such as a smartphone having a plurality of IC card applications performs payment processing using communication data of UWB communication or the like other than NFC communication with a payment device such as a ticket gate or a store terminal, a configuration is implemented in which the user terminal selects an IC card application corresponding to the payment device to be used for the payment processing.

Specifically, for example, the user terminal receives data from the payment device such as a ticket gate or a store terminal, performs search processing as to whether or not the own device has a specific communication scheme-compatible IC card application capable of processing communication data according to a specific communication scheme such as UWB communication on the basis of the received data, acquires an identifier (AID) of the detected application, and transmits the acquired identifier to the payment device. The payment device transmits a select command storing the AID received from the user terminal to the user terminal, and the user terminal starts the IC card application according to the select command.

In a case where a user terminal such as a smartphone having a plurality of IC card applications performs payment processing using communication data of UWB communication or the like other than NFC communication with a payment device such as a ticket gate or a store terminal, the user terminal selects an IC card application corresponding to the payment device used for the payment processing.

With this configuration, in a case where a user terminal such as a smartphone having a plurality of IC card applications performs payment processing using communication data of UWB communication or the like other than NFC communication with a payment device such as a ticket gate or a store terminal, a configuration in which the user terminal selects an IC card application corresponding to the payment device used for the payment processing is implemented.

REFERENCE SIGNS LIST

10 User terminal
11 IC card application
20 Secure Element (SE)
22 Secure memory
31 NFC communication unit
32 Command analysis unit
33 IC card application group
50 Payment terminal
51 Payment terminal controller
52 NFC communication unit
100, 300, 400 User terminal
101 User terminal controller (intra-DH communication control unit)
111 NFC communication unit
112 UWB communication unit
113 BLE communication unit
120 Secure element
121 IC card application group
122 Command analysis unit
123 UWB communication data analysis application (intra-SE communication control unit)
200 Payment terminal
201 Payment terminal controller
211 NFC communication unit
212 UWB communication unit
213 BLE communication unit
501 CPU
502 ROM
503 RAM
504 Bus
505 Input/output interface
506 Input unit
507 Output unit
508 Storage unit
509 Communication unit
510 Drive
511 Removable medium

The invention claimed is:

1. A communication processing device comprising:
circuitry configured to
execute search processing as to whether or not the communication processing device has a specific communication scheme-compatible IC card application capable of executing data processing accompanied by communication according to a specific communication scheme based on received data from an external device,
notify the external device of a search processing result in a case where a specific communication scheme-compatible IC card application is detected as a result of the search processing, and
cause the external device and the detected specific communication scheme-compatible IC card application to execute data processing accompanied by communication according to the specific communication scheme,
wherein the specific communication scheme-compatible IC card application directly communicates with the external device to execute the search processing.

2. The communication processing device according to claim 1,
wherein the circuitry notifies the external device of an application ID (AID) of a detected specific communication scheme-compatible IC card application in a case where the specific communication scheme-compatible IC card application is detected as a result of the search processing.

3. The communication processing device according to claim 2,
wherein the circuitry is further configured to
receive, from the external device, a select command storing the application ID (AID) of the specific communication scheme-compatible IC card application, and
execute processing of determining an IC card application to be started according to the application ID (AID) stored in the received select command.

4. The communication processing device according to claim 3,
wherein the IC card application includes an IC card application stored in a secure memory, and
wherein the circuitry is further configured to store the application ID (AID) acquired from the select command to a secure memory OS that executes start control of the IC card application stored in the secure memory.

5. The communication processing device according to claim 4,
wherein the secure memory OS executes start processing of the IC card application stored in the secure memory corresponding to the application ID (AID) input from the circuitry.

6. The communication processing device according to claim 1,
wherein the circuitry causes execution of communication processing between the external device and the specific communication scheme-compatible IC card application without executing relay processing of communication data between the external device and the specific communication scheme-compatible IC card application, after start of the specific communication scheme-compatible IC card application.

7. The communication processing device according to claim 1,
wherein the circuitry is further configured to execute relay processing of communication data between the external device and the specific communication scheme-compatible IC card application, after start of the specific communication scheme-compatible IC card application.

8. The communication processing device according to claim 7,
wherein communication data between the external device and the specific communication scheme-compatible IC card application includes communication data according to an ultra wide band (UWB) communication scheme or a Bluetooth low energy (BLE) communication scheme, and
wherein the circuitry executes relay processing of communication data according to the UWB communication scheme or the BLE communication scheme.

9. The communication processing device according to claim 1,
wherein the circuitry is further configured to set a detected specific communication scheme-compatible IC card application as a communication counterpart of the external device according to the specific communication scheme in a case where the specific communication scheme-compatible IC card application is detected as a result of the search processing.

10. The communication processing device according to claim 1,
wherein the circuitry notifies the external device of application existence information indicating that a specific communication scheme-compatible IC card application is present in a case where the specific communication scheme-compatible IC card application is detected as a result of the search processing.

11. The communication processing device according to claim 1,
wherein the specific communication scheme includes an ultra wide band (UWB) communication scheme, and
wherein the circuitry executes search processing for a UWB communication scheme-compatible IC card application.

12. The communication processing device according to claim 1,
wherein the IC card application includes an IC card application stored in a secure memory, and
wherein the circuitry includes a communication control unit formed in the secure memory.

13. The communication processing device according to claim 1,
wherein the IC card application includes an IC card application stored in a secure memory, and
wherein the circuitry includes a communication control unit formed outside the secure memory.

14. The communication processing device according to claim 1 further comprising:
a memory configured to store application registration data in which the specific communication scheme-compatible IC card application is registered,
wherein the memory is implemented via at least one non-transitory computer-readable storage medium, and
wherein the circuitry executes search processing as to whether or not a specific communication scheme-compatible IC card application is present by referring to the application registration data stored in the memory.

15. The communication processing device according to claim 1,
wherein the external device includes a payment terminal, and
wherein the circuitry of the communication processing device is further configured to execute payment processing by communication with the payment terminal using the detected specific communication scheme-compatible IC card application.

16. A communication processing system comprising:
a user terminal; and
a payment terminal,
wherein the user terminal is configured to
execute search processing as to whether or not the user terminal has a specific communication scheme-compatible IC card application capable of executing data processing accompanied by communication according to a specific communication scheme based on received data from the payment terminal, and
transmit a search processing result to the payment terminal in a case where a specific communication scheme-compatible IC card application is detected as a result of the search processing
wherein the payment terminal is configured to transmit a data processing request designating a specific communication scheme-compatible IC card application as a communication partner to the user terminal after receiving the search processing result,
wherein the user terminal is configured to execute data processing using communication data according to the specific communication scheme between the payment terminal and the specific communication scheme-compatible IC card application in response to the data processing request from the payment terminal, and
wherein the specific communication scheme-compatible IC card application directly communicates with the payment terminal to execute the search processing.

17. The communication processing system according to claim 16,
wherein the user terminal is further configured to transmit an application ID (AID) of a detected specific communication scheme-compatible IC card application to the payment terminal in a case where the specific communication scheme-compatible IC card application is detected as a result of the search processing,
wherein the payment terminal is further configured to transmit a select command storing the application ID (AID) of the specific communication scheme-compatible IC card application to the user terminal, and
wherein the user terminal is further configured to determine and start an IC card application to be started according to the application ID (AID) stored in the select command received from the payment terminal.

18. A communication control method executed in a communication processing device, the communication control method comprising:
executing search processing as to whether or not the communication processing device has a specific communication scheme-compatible IC card application capable of executing data processing accompanied by communication according to a specific communication scheme based on received data from an external device,
notifying the external device of a search processing result in a case where a specific communication scheme-compatible IC card application is detected as a result of the search processing, and
causing the external device and the detected specific communication scheme-compatible IC card application to execute data processing accompanied by communication according to the specific communication scheme,
wherein the specific communication scheme-compatible IC card application directly communicates with the external device to execute the search processing.

19. A communication control method executed in a communication processing system including a user terminal and a payment terminal, the communication control method comprising:
executing, by the user terminal, search processing as to whether or not the user terminal has a specific communication scheme-compatible IC card application capable of executing data processing accompanied by communication according to a specific communication scheme based on received data from the payment terminal;
transmitting, by the user terminal, a search processing result to the payment terminal in a case where a specific communication scheme-compatible IC card application is detected as a result of the search processing;
transmitting, by the payment terminal, a data processing request designating a specific communication scheme-compatible IC card application as a communication partner to the user terminal after receiving the search processing result; and executing, by the user terminal, data processing using communication data according to the specific communication scheme between the payment terminal and the specific communication scheme-compatible IC card application in response to the data processing request from the payment terminal, wherein the specific communication scheme-compatible IC card application directly communicates with the payment terminal to execute the search processing.

20. A non-transitory computer-readable storage medium having embodied thereon a program, which when executed by a computer causes a communication processing device of the computer to execute an information processing method, the method comprising:

executing search processing as to whether or not the communication processing device has a specific communication scheme-compatible IC card application capable of executing data processing accompanied by communication according to a specific communication scheme based on received data from an external device;

executing processing of notifying the external device of a search processing result in a case where a specific communication scheme-compatible IC card application is detected as a result of the search processing; and executing data processing accompanied by communication according to the specific communication scheme executed between the external device and the detected specific communication scheme-compatible IC card application, wherein the specific communication scheme-compatible IC card application directly communicates with the external device to execute the search processing.

* * * * *